United States Patent
Rowe et al.

(10) Patent No.: US 8,708,828 B2
(45) Date of Patent: Apr. 29, 2014

(54) PLUGGABLE MODULAR GAMING MODIFIERS AND CONFIGURATION TEMPLATES FOR GAMING ENVIRONMENTS

(75) Inventors: Richard E. Rowe, Las Vegas, NV (US); Timothy W. Moser, Las Vegas, NV (US); Craig Michael Schaefer, Las Vegas, NV (US); Cara Iddings, Henderson, NV (US); Dwayne R. Nelson, Las Vegas, NV (US)

(73) Assignee: IGT, Reno, NV (US)

( * ) Notice: Subject to any disclaimer, the term of this patent is extended or adjusted under 35 U.S.C. 154(b) by 771 days.

(21) Appl. No.: 11/966,682

(22) Filed: Dec. 28, 2007

(65) Prior Publication Data

US 2008/0102919 A1 May 1, 2008

Related U.S. Application Data

(63) Continuation-in-part of application No. 10/040,239, filed on Jan. 3, 2002, now Pat. No. 7,931,533, and a continuation-in-part of application No. 11/542,361, filed on Oct. 2, 2006, now Pat. No. 7,399,229, which is a continuation of application No. 10/241,398, filed on Sep. 10, 2002, now Pat. No. 7,131,909.

(60) Provisional application No. 60/325,965, filed on Sep. 28, 2001.

(51) Int. Cl.
*A63F 13/00* (2006.01)

(52) U.S. Cl.
USPC .................. 463/42; 463/40; 463/41; 715/744

(58) Field of Classification Search
USPC ............... 463/29–30, 33–35, 40–43; 715/744
See application file for complete search history.

(56) References Cited

U.S. PATENT DOCUMENTS

| 2,235,642 A | 3/1941 | Lintern et al. |
| 3,825,905 A | 7/1974 | Allen, Jr. |

(Continued)

FOREIGN PATENT DOCUMENTS

| AU | 2001-255294 | 11/2001 |
| AU | 2002327737 | 8/2009 |

(Continued)

OTHER PUBLICATIONS

Answer and Counterclaims to Second Amended Complaint filed in connection with Civil Action No. CV-S-01-1498, pp. 1-26 and certificate of service page.

(Continued)

*Primary Examiner* — Ronald Laneau
*Assistant Examiner* — Ross Wiliams
(74) *Attorney, Agent, or Firm* — Foley & Lardner LLP

(57) ABSTRACT

Frameworks for providing modular computer program code and automated configuration of server-based gaming environments are disclosed. One or more "pluggable" modular gaming modifier can be provided for the modular computer program code without requiring the replacement of the entire computer program code for the game. Typically, the pluggable" modular gaming modifier can be added to or can replace one or more gaming modules or sub-modules, thereby requiring less time and effort for effectively modifying game presentation. In addition, configuration data can be generated and stored as configurations templates which can be used to configure one or more gaming machines in an automated manner. The configuration templates can be generated based on gaming modules and/or sub-modules provided for modular computer program code. As such, a content-based configuration template can effectively include and/or identify one or more modules, sub-modules and/or pluggable modular or sub-modular gaming modifiers associated with a modular computer program code. The configuration modules can be combined together for form configuration modules that effectively incorporate the features of two or more existing configurations.

36 Claims, 16 Drawing Sheets

(56) References Cited

U.S. PATENT DOCUMENTS

| | | |
|---|---|---|
| 3,838,264 A | 9/1974 | Maker |
| 3,931,504 A | 1/1976 | Jacoby |
| 4,072,930 A | 2/1978 | Lucero et al. |
| 4,099,722 A | 7/1978 | Rodesch et al. |
| 4,193,131 A | 3/1980 | Lennon et al. |
| 4,200,770 A | 4/1980 | Hellman et al. |
| 4,218,582 A | 8/1980 | Hellman et al. |
| 4,238,127 A | 12/1980 | Lucero et al. |
| 4,250,563 A | 2/1981 | Struger |
| 4,293,928 A | 10/1981 | Baun |
| 4,335,809 A | 6/1982 | Wain |
| 4,354,251 A | 10/1982 | Hellwig et al. |
| 4,355,390 A | 10/1982 | Hellwig et al. |
| 4,378,940 A | 4/1983 | Gluz et al. |
| 4,405,829 A | 9/1983 | Rivest et al. |
| 4,430,728 A | 2/1984 | Beitel et al. |
| 4,454,594 A | 6/1984 | Heffron et al. |
| 4,458,315 A | 7/1984 | Uchenick |
| 4,462,076 A | 7/1984 | Smith, III |
| 4,467,424 A | 8/1984 | Hedges et al. |
| 4,485,457 A | 11/1984 | Balaska et al. |
| 4,494,114 A | 1/1985 | Kaish et al. |
| 4,500,933 A | 2/1985 | Chan |
| 4,519,077 A | 5/1985 | Amin |
| 4,525,599 A | 6/1985 | Curran et al. |
| 4,527,798 A | 7/1985 | Siekierski et al. |
| 4,582,324 A | 4/1986 | Koza et al. |
| 4,607,844 A | 8/1986 | Fullerton |
| 4,652,998 A | 3/1987 | Koza et al. |
| 4,658,093 A | 4/1987 | Hellman |
| 4,683,550 A | 7/1987 | Jindrick et al. |
| 4,727,544 A | 2/1988 | Brunner et al. |
| 4,752,068 A | 6/1988 | Endo |
| 4,757,505 A | 7/1988 | Marrington et al. |
| 4,759,064 A | 7/1988 | Chaum |
| 4,817,140 A | 3/1989 | Chandra et al. |
| 4,837,728 A | 6/1989 | Barrie et al. |
| 4,845,715 A | 7/1989 | Francisco |
| 4,848,744 A | 7/1989 | Steininger et al. |
| 4,856,787 A | 8/1989 | Itkis |
| 4,862,355 A | 8/1989 | Newman et al. |
| 4,865,321 A | 9/1989 | Nakagawa et al. |
| 4,911,449 A | 3/1990 | Dickinson et al. |
| 4,930,073 A | 5/1990 | Cina, Jr. |
| 4,944,008 A | 7/1990 | Piosenka et al. |
| 4,951,149 A | 8/1990 | Faroudja |
| 4,972,470 A | 11/1990 | Farago |
| 5,004,232 A | 4/1991 | Wong et al. |
| 5,021,772 A | 6/1991 | King et al. |
| 5,050,212 A | 9/1991 | Dyson |
| 5,054,787 A | 10/1991 | Richardson et al. |
| 5,103,081 A | 4/1992 | Fisher et al. |
| 5,109,152 A | 4/1992 | Takagi et al. |
| 5,136,644 A | 8/1992 | Audebert et al. |
| 5,146,575 A | 9/1992 | Nolan |
| 5,149,104 A | 9/1992 | Edelstein |
| 5,155,680 A | 10/1992 | Wiedener |
| 5,155,768 A | 10/1992 | Matsuhara |
| 5,155,837 A | 10/1992 | Liu et al. |
| 5,155,856 A | 10/1992 | Bock et al. |
| 5,161,193 A | 11/1992 | Lampson et al. |
| 5,173,873 A | 12/1992 | Wu et al. |
| 5,179,517 A | 1/1993 | Sarbin |
| 5,224,160 A | 6/1993 | Paulini et al. |
| 5,224,707 A | 7/1993 | Martin |
| 5,235,642 A | 8/1993 | Wobber et al. |
| 5,259,613 A | 11/1993 | Marnell |
| 5,264,958 A | 11/1993 | Johnson |
| 5,277,424 A | 1/1994 | Wilms |
| 5,283,734 A | 2/1994 | Von Kohorn |
| 5,288,978 A | 2/1994 | Iijima |
| 5,291,585 A | 3/1994 | Sato et al. |
| 5,297,205 A | 3/1994 | Audebert et al. |
| 5,326,104 A | 7/1994 | Pease et al. |
| 5,342,047 A | 8/1994 | Heidel et al. |
| 5,343,527 A | 8/1994 | Moore |
| 5,353,411 A | 10/1994 | Nakaosa et al. |
| 5,357,604 A | 10/1994 | San et al. |
| 5,375,241 A | 12/1994 | Walsh |
| 5,379,431 A | 1/1995 | Lemon et al. |
| 5,388,841 A | 2/1995 | San et al. |
| 5,394,547 A | 2/1995 | Correnti et al. |
| 5,398,799 A | 3/1995 | Ranon et al. |
| 5,398,932 A | 3/1995 | Eberhardt et al. |
| 5,400,246 A | 3/1995 | Wilson et al. |
| 5,410,703 A | 4/1995 | Nilsson et al. |
| 5,421,006 A | 5/1995 | Jablon et al. |
| 5,421,009 A | 5/1995 | Platt |
| 5,421,017 A | 5/1995 | Scholz et al. |
| 5,428,525 A | 6/1995 | Cappelaere et al. |
| 5,429,361 A | 7/1995 | Raven et al. |
| 5,442,568 A | 8/1995 | Ostendorf et al. |
| 5,444,642 A | 8/1995 | Montgomery et al. |
| 5,465,364 A | 11/1995 | Lathrop et al. |
| 5,469,571 A | 11/1995 | Bunnell |
| 5,473,765 A | 12/1995 | Gibbons et al. |
| 5,473,772 A | 12/1995 | Halliwell et al. |
| 5,473,785 A | 12/1995 | Lager et al. |
| 5,488,702 A | 1/1996 | Byers et al. |
| 5,489,095 A | 2/1996 | Goudard et al. |
| 5,497,490 A | 3/1996 | Harada et al. |
| 5,498,003 A | 3/1996 | Gechter |
| 5,507,489 A | 4/1996 | Reibel et al. |
| 5,508,689 A | 4/1996 | Rado et al. |
| 5,531,309 A | 7/1996 | Kloss et al. |
| 5,542,669 A | 8/1996 | Charron et al. |
| 5,548,782 A | 8/1996 | Michael et al. |
| 5,553,290 A | 9/1996 | Calvert et al. |
| 5,555,418 A | 9/1996 | Nilsson et al. |
| 5,559,794 A | 9/1996 | Willis et al. |
| 5,568,602 A | 10/1996 | Callahan et al. |
| 5,575,717 A | 11/1996 | Houriet, Jr. et al. |
| 5,586,766 A | 12/1996 | Forte et al. |
| 5,586,937 A | 12/1996 | Menashe |
| 5,594,903 A | 1/1997 | Bunnell et al. |
| 5,604,801 A | 2/1997 | Dolan et al. |
| 5,611,730 A | 3/1997 | Weiss |
| 5,634,058 A | 5/1997 | Allen et al. |
| 5,640,343 A | 6/1997 | Gallagher et al. |
| 5,643,086 A | 7/1997 | Alcorn et al. |
| 5,644,704 A | 7/1997 | Pease et al. |
| 5,654,746 A | 8/1997 | McMullan, Jr. et al. |
| 5,655,961 A | 8/1997 | Acres et al. |
| 5,655,965 A | 8/1997 | Takemoto et al. |
| 5,664,187 A | 9/1997 | Burkes et al. |
| 5,668,945 A | 9/1997 | Ohba et al. |
| 5,671,351 A | 9/1997 | Wild et al. |
| 5,682,533 A | 10/1997 | Siljestroemer |
| 5,688,174 A | 11/1997 | Kennedy |
| 5,702,303 A | 12/1997 | Takemoto et al. |
| 5,702,304 A | 12/1997 | Acres et al. |
| 5,704,835 A | 1/1998 | Dietz, II |
| 5,707,286 A | 1/1998 | Carlson |
| 5,715,462 A | 2/1998 | Iwamoto et al. |
| 5,725,428 A | 3/1998 | Achmuller |
| 5,737,418 A | 4/1998 | Saffari et al. |
| 5,738,583 A | 4/1998 | Comas et al. |
| 5,741,183 A | 4/1998 | Acres et al. |
| 5,742,616 A | 4/1998 | Torreiter et al. |
| 5,742,825 A | 4/1998 | Mathur et al. |
| 5,752,882 A | 5/1998 | Acres et al. |
| 5,758,875 A | 6/1998 | Giacalone, Jr. |
| 5,759,102 A | 6/1998 | Pease et al. |
| 5,761,647 A | 6/1998 | Boushy |
| 5,762,552 A | 6/1998 | Vuong et al. |
| 5,768,382 A | 6/1998 | Schneier et al. |
| 5,770,533 A | 6/1998 | Franchi |
| 5,778,226 A | 7/1998 | Adams et al. |
| 5,778,228 A | 7/1998 | Wei |
| 5,800,268 A | 9/1998 | Molnick |
| 5,809,329 A | 9/1998 | Litchman et al. |
| 5,820,459 A | 10/1998 | Acres et al. |
| 5,823,874 A | 10/1998 | Adams |
| 5,833,540 A | 11/1998 | Miodunski et al. |

(56) References Cited

U.S. PATENT DOCUMENTS

| | | | |
|---|---|---|---|
| 5,836,817 | A | 11/1998 | Acres et al. |
| 5,845,077 | A | 12/1998 | Fawcett |
| 5,845,090 | A | 12/1998 | Collins, III et al. |
| 5,848,064 | A | 12/1998 | Cowan |
| 5,848,250 | A | 12/1998 | Smith et al. |
| 5,848,932 | A | 12/1998 | Adams |
| 5,851,149 | A | 12/1998 | Xidos et al. |
| 5,863,041 | A | 1/1999 | Boylan et al. |
| 5,870,587 | A | 2/1999 | Danforth et al. |
| 5,870,723 | A | 2/1999 | Pare, Jr. et al. |
| 5,871,400 | A | 2/1999 | Yfantis |
| 5,872,973 | A | 2/1999 | Mitchell et al. |
| 5,879,234 | A | 3/1999 | Mengual |
| 5,885,158 | A | 3/1999 | Torango et al. |
| 5,889,933 | A | 3/1999 | Smith |
| 5,889,990 | A | 3/1999 | Coleman et al. |
| 5,893,121 | A | 4/1999 | Ebrahim et al. |
| 5,896,566 | A | 4/1999 | Averbuch et al. |
| 5,901,319 | A | 5/1999 | Hirst |
| 5,905,492 | A * | 5/1999 | Straub et al. ............... 715/744 |
| 5,905,523 | A | 5/1999 | Woodfield et al. |
| 5,934,672 | A | 8/1999 | Sines et al. |
| 5,935,224 | A | 8/1999 | Svancarek et al. |
| 5,944,821 | A | 8/1999 | Angelo |
| 5,946,227 | A | 8/1999 | Naji |
| 5,954,583 | A | 9/1999 | Green |
| 5,970,143 | A | 10/1999 | Schneier et al. |
| 5,971,849 | A | 10/1999 | Falciglia |
| 5,971,851 | A | 10/1999 | Pascal et al. |
| 5,980,384 | A | 11/1999 | Barrie |
| 5,984,786 | A | 11/1999 | Ehrman |
| 5,989,234 | A | 11/1999 | Valerio et al. |
| 5,991,399 | A | 11/1999 | Graunke et al. |
| 5,991,546 | A | 11/1999 | Chan et al. |
| 5,995,745 | A | 11/1999 | Yodaiken |
| 5,999,990 | A | 12/1999 | Sharrit et al. |
| 6,003,038 | A | 12/1999 | Chen |
| 6,006,034 | A | 12/1999 | Heath et al. |
| 6,006,279 | A | 12/1999 | Hayes |
| 6,008,279 | A | 12/1999 | Shimizu et al. |
| 6,014,714 | A | 1/2000 | Plyler et al. |
| 6,015,344 | A | 1/2000 | Kelly et al. |
| 6,021,414 | A | 2/2000 | Fuller |
| 6,022,274 | A | 2/2000 | Takeda et al. |
| 6,026,238 | A | 2/2000 | Bond et al. |
| 6,029,046 | A | 2/2000 | Khan et al. |
| 6,035,321 | A | 3/2000 | Mays |
| 6,039,645 | A | 3/2000 | Mazur |
| 6,039,648 | A | 3/2000 | Guinn et al. |
| 6,044,428 | A | 3/2000 | Rayabhari |
| 6,044,471 | A | 3/2000 | Colvin |
| 6,047,128 | A | 4/2000 | Zander |
| 6,052,778 | A | 4/2000 | Hagy et al. |
| 6,071,190 | A | 6/2000 | Weiss et al. |
| 6,073,124 | A | 6/2000 | Krishnan et al. |
| 6,075,939 | A | 6/2000 | Bunnell et al. |
| 6,089,975 | A | 7/2000 | Dunn |
| 6,091,930 | A | 7/2000 | Mortimer et al. |
| 6,099,408 | A | 8/2000 | Schneier et al. |
| 6,102,796 | A | 8/2000 | Pajitnov et al. |
| 6,104,815 | A | 8/2000 | Alcorn et al. |
| 6,104,859 | A | 8/2000 | Yoshida et al. |
| 6,106,396 | A | 8/2000 | Alcorn et al. |
| 6,115,601 | A | 9/2000 | Ferreira |
| 6,117,010 | A | 9/2000 | Canterbury et al. |
| 6,126,548 | A | 10/2000 | Jacobs et al. |
| 6,134,677 | A | 10/2000 | Lindsay |
| 6,135,884 | A | 10/2000 | Hedrick et al. |
| 6,135,887 | A | 10/2000 | Pease et al. |
| 6,139,433 | A | 10/2000 | Miyamoto |
| 6,142,873 | A | 11/2000 | Weiss et al. |
| 6,149,522 | A | 11/2000 | Alcorn et al. |
| 6,154,878 | A | 11/2000 | Saboff |
| 6,162,122 | A | 12/2000 | Acres et al. |
| 6,164,971 | A | 12/2000 | Figart |
| 6,165,072 | A | 12/2000 | Davis et al. |
| 6,181,336 | B1 | 1/2001 | Chiu et al. |
| 6,185,678 | B1 | 2/2001 | Arbaugh et al. |
| 6,190,257 | B1 | 2/2001 | Takeda et al. |
| 6,193,606 | B1 | 2/2001 | Walker et al. |
| 6,195,587 | B1 | 2/2001 | Hruska et al. |
| 6,203,010 | B1 | 3/2001 | Jorasch et al. |
| 6,203,427 | B1 | 3/2001 | Walker et al. |
| 6,210,274 | B1 | 4/2001 | Carlson |
| 6,214,495 | B1 | 4/2001 | Segawa et al. |
| 6,215,495 | B1 | 4/2001 | Grantham et al. |
| 6,219,836 | B1 | 4/2001 | Wells et al. |
| 6,222,448 | B1 | 4/2001 | Beck et al. |
| 6,222,529 | B1 | 4/2001 | Ouatu-Lascar et al. |
| 6,224,482 | B1 | 5/2001 | Bennett |
| 6,243,692 | B1 | 6/2001 | Floyd et al. |
| 6,251,014 | B1 | 6/2001 | Stockdale et al. |
| 6,253,374 | B1 | 6/2001 | Dresevic et al. |
| 6,263,392 | B1 | 7/2001 | McCauley |
| 6,264,557 | B1 | 7/2001 | Schneier et al. |
| 6,264,561 | B1 | 7/2001 | Saffari et al. |
| 6,269,474 | B1 | 7/2001 | Price |
| 6,279,124 | B1 | 8/2001 | Brouwer et al. |
| 6,290,602 | B1 | 9/2001 | Kawano |
| 6,315,666 | B1 | 11/2001 | Mastera et al. |
| 6,317,827 | B1 | 11/2001 | Cooper |
| 6,319,125 | B1 | 11/2001 | Acres |
| 6,322,445 | B1 | 11/2001 | Miller |
| 6,324,605 | B1 | 11/2001 | Rafferty et al. |
| 6,327,605 | B2 | 12/2001 | Arakawa et al. |
| 6,331,146 | B1 | 12/2001 | Miyamoto et al. |
| 6,364,768 | B1 | 4/2002 | Acres et al. |
| 6,364,769 | B1 | 4/2002 | Weiss et al. |
| 6,368,219 | B1 | 4/2002 | Szrek et al. |
| 6,379,246 | B1 | 4/2002 | Dabrowski |
| 6,394,907 | B1 | 5/2002 | Rowe |
| 6,401,198 | B1 | 6/2002 | Harmer et al. |
| 6,401,208 | B2 | 6/2002 | Davis et al. |
| 6,409,602 | B1 | 6/2002 | Wiltshire et al. |
| 6,446,211 | B1 | 9/2002 | Colvin |
| 6,446,257 | B1 | 9/2002 | Pradhan et al. |
| 6,449,687 | B1 | 9/2002 | Moriya |
| 6,453,319 | B1 | 9/2002 | Mattis et al. |
| 6,454,648 | B1 | 9/2002 | Kelly et al. |
| 6,460,142 | B1 | 10/2002 | Colvin |
| 6,462,983 | B2 | 10/2002 | Katti et al. |
| 6,484,264 | B1 | 11/2002 | Colvin |
| 6,496,808 | B1 | 12/2002 | Aiello et al. |
| 6,502,195 | B1 | 12/2002 | Colvin |
| 6,503,147 | B1 | 1/2003 | Stockdale et al. |
| 6,505,087 | B1 | 1/2003 | Lucas et al. |
| 6,510,521 | B1 | 1/2003 | Albrecht et al. |
| 6,511,377 | B1 | 1/2003 | Weiss |
| 6,527,638 | B1 | 3/2003 | Walker et al. |
| 6,575,833 | B1 | 6/2003 | Stockdale et al. |
| 6,577,733 | B1 | 6/2003 | Charrin |
| 6,595,856 | B1 | 7/2003 | Ginsburg et al. |
| 6,620,047 | B1 | 9/2003 | Alcorn et al. |
| 6,625,730 | B1 | 9/2003 | Angelo et al. |
| 6,645,077 | B2 | 11/2003 | Rowe |
| 6,646,948 | B1 | 11/2003 | Stence et al. |
| 6,671,745 | B1 | 12/2003 | Mathur et al. |
| 6,682,423 | B2 | 1/2004 | Brosnan |
| 6,722,986 | B1 | 4/2004 | Lyons et al. |
| 6,734,862 | B1 | 5/2004 | Chapple et al. |
| 6,744,662 | B2 | 6/2004 | Freitag |
| 6,775,778 | B1 | 8/2004 | Laczko et al. |
| 6,785,825 | B2 | 8/2004 | Colvin |
| 6,792,548 | B2 | 9/2004 | Colvin |
| 6,792,549 | B2 | 9/2004 | Colvin |
| 6,795,925 | B2 | 9/2004 | Colvin |
| 6,795,928 | B2 | 9/2004 | Bradley et al. |
| 6,798,599 | B2 | 9/2004 | Dykes et al. |
| 6,799,277 | B2 | 9/2004 | Colvin |
| 6,804,763 | B1 | 10/2004 | Stockdale et al. |
| 6,805,634 | B1 | 10/2004 | Wells et al. |
| 6,813,717 | B2 | 11/2004 | Colvin |
| 6,813,718 | B2 | 11/2004 | Colvin |
| 6,851,607 | B2 | 2/2005 | Orus et al. |

(56) References Cited

U.S. PATENT DOCUMENTS

| | | | |
|---|---|---|---|
| 6,857,078 B2 | 2/2005 | Colvin |
| 6,866,581 B2 | 3/2005 | Martinek et al. |
| 6,890,259 B2 | 5/2005 | Breckner et al. |
| 6,902,481 B2 | 6/2005 | Breckner et al. |
| 6,907,522 B2 | 6/2005 | Morais et al. |
| 6,908,391 B2 | 6/2005 | Gatto et al. |
| 6,935,946 B2 | 8/2005 | Yoseloff |
| 6,962,530 B2 | 11/2005 | Jackson |
| 6,978,465 B2 | 12/2005 | Williams |
| 6,988,267 B2 | 1/2006 | Harris et al. |
| 7,043,641 B1 | 5/2006 | Martinek et al. |
| 7,063,615 B2 | 6/2006 | Alcorn et al. |
| 7,107,378 B1 | 9/2006 | Brewer et al. |
| 7,116,782 B2 | 10/2006 | Jackson et al. |
| 7,131,909 B2 | 11/2006 | Rowe |
| 7,155,590 B2 | 12/2006 | Mathis |
| 7,203,841 B2 | 4/2007 | Jackson et al. |
| 7,269,685 B2 | 9/2007 | Swanson |
| 7,278,068 B1 | 10/2007 | Crowder |
| 7,338,372 B2 | 3/2008 | Morrow et al. |
| 7,363,443 B2 | 4/2008 | Rubin |
| 7,367,889 B2 | 5/2008 | Canterbury |
| 7,399,229 B2 | 7/2008 | Rowe et al. |
| 7,470,182 B2 | 12/2008 | Martinek et al. |
| 7,491,122 B2 | 2/2009 | Ryan |
| 7,516,291 B2 | 4/2009 | van Riel et al. |
| 7,618,317 B2 | 11/2009 | Jackson |
| 7,837,556 B2 | 11/2010 | Breckner et al. |
| 7,931,533 B2 | 4/2011 | LeMay et al. |
| 7,988,554 B2 | 8/2011 | LeMay et al. |
| 8,079,909 B2 | 12/2011 | Rowe |
| 8,251,807 B2 | 8/2012 | LeMay et al. |
| 2001/0000118 A1 | 4/2001 | Sines et al. |
| 2001/0003709 A1 | 6/2001 | Adams |
| 2001/0006195 A1 | 7/2001 | Sukeda et al. |
| 2001/0010046 A1 | 7/2001 | Muyres et al. |
| 2001/0044339 A1 | 11/2001 | Cordero et al. |
| 2001/0053712 A1 | 12/2001 | Yoseloff et al. |
| 2002/0032051 A1 | 3/2002 | Stockdale et al. |
| 2002/0049909 A1 | 4/2002 | Jackson et al. |
| 2002/0052230 A1 | 5/2002 | Martinek et al. |
| 2002/0071557 A1 | 6/2002 | Nguyen et al. |
| 2002/0078142 A1 | 6/2002 | Moore et al. |
| 2002/0082084 A1 | 6/2002 | Snow et al. |
| 2002/0107067 A1 | 8/2002 | McGlone |
| 2002/0107072 A1* | 8/2002 | Giobbi ............... 463/42 |
| 2002/0116284 A1 | 8/2002 | Steelman et al. |
| 2002/0137217 A1 | 9/2002 | Rowe |
| 2002/0151363 A1 | 10/2002 | Letovsky et al. |
| 2002/0155887 A1 | 10/2002 | Criss-Puszkiewicz et al. |
| 2002/0187826 A1 | 12/2002 | Seymour et al. |
| 2003/0014639 A1 | 1/2003 | Jackson et al. |
| 2003/0064771 A1 | 4/2003 | Morrow et al. |
| 2003/0064801 A1 | 4/2003 | Breckner et al. |
| 2003/0069074 A1* | 4/2003 | Jackson ............... 463/43 |
| 2003/0078103 A1 | 4/2003 | LeMay et al. |
| 2003/0100373 A1 | 5/2003 | Fujimoto et al. |
| 2003/0148807 A1 | 8/2003 | Acres |
| 2003/0181242 A1 | 9/2003 | Lee et al. |
| 2003/0188306 A1 | 10/2003 | Harris et al. |
| 2003/0195033 A1 | 10/2003 | Gazdic et al. |
| 2003/0203755 A1 | 10/2003 | Jackson |
| 2003/0203756 A1 | 10/2003 | Jackson |
| 2003/0224858 A1 | 12/2003 | Yoseloff et al. |
| 2003/0228912 A1* | 12/2003 | Wells et al. ............... 463/43 |
| 2003/0229777 A1 | 12/2003 | Morais et al. |
| 2004/0002381 A1 | 1/2004 | Alcorn et al. |
| 2004/0038740 A1 | 2/2004 | Muir |
| 2004/0042112 A1 | 3/2004 | Stence et al. |
| 2004/0043814 A1 | 3/2004 | Angell et al. |
| 2004/0044849 A1 | 3/2004 | Stence et al. |
| 2004/0048667 A1 | 3/2004 | Rowe |
| 2004/0064647 A1 | 4/2004 | DeWhitt et al. |
| 2004/0072611 A1 | 4/2004 | Wolf et al. |
| 2004/0106452 A1 | 6/2004 | Nguyen et al. |
| 2004/0111332 A1 | 6/2004 | Baar et al. |
| 2004/0166940 A1* | 8/2004 | Rothschild ............... 463/42 |
| 2004/0198479 A1 | 10/2004 | Martinek et al. |
| 2004/0198494 A1 | 10/2004 | Nguyen et al. |
| 2005/0010738 A1 | 1/2005 | Stockdale et al. |
| 2005/0049037 A1* | 3/2005 | Anderson et al. ............... 463/25 |
| 2005/0192092 A1 | 9/2005 | Breckner et al. |
| 2006/0123391 A1 | 6/2006 | Lai |
| 2006/0142977 A1 | 6/2006 | Oh et al. |
| 2006/0171196 A1 | 8/2006 | Freitag et al. |
| 2006/0205515 A1 | 9/2006 | Cockerille et al. |
| 2006/0287098 A1 | 12/2006 | Morrow et al. |
| 2007/0004510 A1* | 1/2007 | Underdahl et al. ............... 463/29 |
| 2007/0015590 A1 | 1/2007 | Martinek et al. |
| 2007/0026938 A1 | 2/2007 | Rowe |
| 2007/0243928 A1* | 10/2007 | Iddings ............... 463/26 |
| 2007/0270212 A1 | 11/2007 | Cockerille et al. |
| 2008/0032763 A1* | 2/2008 | Giobbi ............... 463/16 |
| 2008/0058055 A1 | 3/2008 | LeMay et al. |
| 2008/0058097 A1 | 3/2008 | Martinek et al. |
| 2008/0076576 A1 | 3/2008 | Graham et al. |
| 2008/0077871 A1 | 3/2008 | Baar et al. |
| 2008/0085772 A1 | 4/2008 | Iddings et al. |
| 2008/0096656 A1 | 4/2008 | LeMay et al. |
| 2008/0102919 A1 | 5/2008 | Rowe et al. |
| 2008/0248880 A1 | 10/2008 | Rowe et al. |

FOREIGN PATENT DOCUMENTS

| | | |
|---|---|---|
| AU | 2002331912 | 9/2009 |
| AU | 2003262957 | 3/2010 |
| AU | 2009200411 | 11/2010 |
| AU | 2009200160 | 12/2010 |
| CA | 2388765 | 3/2001 |
| DE | 37 00 861 | 7/1888 |
| DE | 40 14 477 | 7/1991 |
| EP | 0 317 477 | 5/1989 |
| EP | 0 689 325 | 6/1995 |
| EP | 0 685 246 | 12/1995 |
| EP | 0 706 275 | 4/1996 |
| EP | 0 762 302 | 3/1997 |
| EP | 0 798 634 | 10/1997 |
| EP | 0841 615 | 5/1998 |
| EP | 0 996 058 | 10/1998 |
| EP | 0 905 614 | 3/1999 |
| EP | 0 950 998 | 10/1999 |
| EP | 0 953 930 | 11/1999 |
| EP | 1 004 970 | 5/2000 |
| EP | 1 035 658 | 9/2000 |
| EP | 1 255 234 | 11/2002 |
| EP | 1429852 | 6/2004 |
| EP | 1432487 | 6/2004 |
| EP | 1561188 | 8/2005 |
| EP | 1546915 | 6/2008 |
| GB | 2 072 395 A | 9/1981 |
| GB | 2 121 569 | 12/1983 |
| GB | 2 134 297 | 8/1984 |
| GB | 2 147 773 | 5/1985 |
| GB | 2 151 054 | 7/1985 |
| GB | 2 201 821 | 9/1988 |
| GB | 2 202 984 | 10/1988 |
| GB | 2 253 325 A | 9/1992 |
| GB | 2 282 690 A | 4/1995 |
| RU | 2 102 790 C1 | 7/1995 |
| RU | 2 099 782 C1 | 12/1997 |
| RU | 2 101 065 C1 | 1/1998 |
| RU | 2 174 258 C2 | 9/2001 |
| RU | 2363988 | 3/2006 |
| RU | 2327210 | 6/2008 |
| SU | 1815666 A1 | 3/1993 |
| WO | WO 94/19784 | 9/1994 |
| WO | WO 96/00939 | 1/1996 |
| WO | WO 96/00950 | 1/1996 |
| WO | WO 96/14614 | 5/1996 |
| WO | WO 98/00207 | 1/1998 |
| WO | WO 98/20417 | 5/1998 |
| WO | WO 99/09474 | 2/1999 |
| WO | WO 99/49394 | 9/1999 |
| WO | WO 99/65579 | 12/1999 |

(56) References Cited

FOREIGN PATENT DOCUMENTS

| | | |
|---|---|---|
| WO | WO 00/33196 | 6/2000 |
| WO | WO 01/20424 | 3/2001 |
| WO | WO 01/22267 | 3/2001 |
| WO | WO 01/72064 | 9/2001 |
| WO | WO 01/72064 A1 | 9/2001 |
| WO | WO 02/05229 | 1/2002 |
| WO | WO 02/32526 | 4/2002 |
| WO | WO02-45808 | 6/2002 |
| WO | WO 02/053245 | 7/2002 |
| WO | WO 02/073501 | 9/2002 |
| WO | WO03-013677 | 2/2003 |
| WO | WO 03/019486 | 3/2003 |
| WO | WO03-023647 | 3/2003 |
| WO | WO 03/028827 | 4/2003 |
| WO | WO 03/028828 | 4/2003 |
| WO | WO 2004/004280 | 1/2004 |
| WO | WO 2004/025497 | 3/2004 |
| WO | WO 2004/025595 | 3/2004 |
| WO | WO 2004/051588 | 6/2004 |
| WO | WO 2006/002084 | 1/2006 |
| WO | WO 2006/098932 | 9/2006 |
| WO | WO 2009/086183 | 7/2009 |

OTHER PUBLICATIONS

Answer and Counterclaims to Second Amended Complaint filed in connection with Civil Action No. CV-S-01-1498, (pp. 1-3, 50-68 and 85-86).
Defendants', Supplemental Response to Plaintiffs' First Set of Interrogatories filed in connection with Civil Action No. CV-S-10-1498, pp. 1-3, 50-68 and 85-86.
Davida, G. et al., "Defending Systems Against Viruses through Cryptographic Authentication," Proceedings of the Symposium on Security and Privacy, IEEE Comp. Soc. Press, pp. 312-318 (May 1, 1989).
Document entitled "Fact Sheet on Digital Signature Standard" dated May 1994, 6 pages.
Federal Information Processing Standard (FIPS) Publication 180-1 entitled "Secure Hash Standard" dated Apr. 17, 1995, 2 title pages, abstract page and pp. 1-21.
Federal Information Processing Standard (FIPS) Publication 180 entitled "Secure Hash Standard" dated May 11, 1993, title page, abstract page and pp. 1-20.
Federal Information Processing Standards (FIPS) Publication 186 entitled "Digital Signature (DSS)" dated May 19, 1994, 17 pages.
Hellman, Martin E., "The Mathematics Public-Key Cryptography, Scientific American," vol. 241, No. 8, Aug. 1979, pp. 146-152 and 154-157.
Rivest, et al., "A Method for Obtaining Digital Signatures and Public-Key Cryptosytems," Communications of the ACM, vol. 21, No. 2, Feb. 1978, pp. 120-126.
Bauspiess, et al., "Requirements for Cryptographic Hash Functions," *Computers and Security*, 5:427-437 (Sep. 11, 1992).
Complaint for Patent Infringement filed by Aristocrat Technologies, et al., dated Jan. 22, 2002, Civil Action No. CV-S-02-0091.
Bakhtiari et al., Cryptographic Hash Functions: A Survey, 1995, Centre for Computer Security Research, pp. 1-26.
Schneier B., "Applied Cryptography, Second Edition. Protocols, Algorithms, and Source Code in C" 1996, John Wiley & Sons, Inc. USA, XP002344241, pp. 446-449; pp. 458-459.
Menezes A., Van Oorschot P., Vanstone S.: "Handbook of Applied Cryptography" 1996, CRC Press, USA, xp002344242, pp. 365-366.
DeLourna, "Game Programming Gems", Charles River Media, ISBN: 1-58450-049-2, 2000 (12 pgs.).
DirectX Media: Multimedia Services for Microsoft Internet Explorer and Microsoft Windows, MSDN Library, http://msdn.microsoft.com, Oct. 1998 (10 pgs.).
Levinthal, Adam and Barnett, Michael, "The Silicon Gaming Odyssey Slot Machine," Feb. 1997, *COMPCON'97 Proceedings, IEEE San Jose*, CA; *IEEE Comput. Soc.*, pp. 296-301.
Bernardi, Favrice et al., "Model Design Using Hierarchical Web-Based Libraries", Jun. 10-14, 2002, Annual ACM IEEE Design Automation Conference, New Orleans, Louisiana, pp. 14-17.
David A. Rusling, "The Linux Kernel," http://tldp.org/LDP/tlk/tlk-title.html, copyright 1996-1999, downloaded Feb. 21, 2006.
"Linux Kernel Glossary," entry for ZFOD (zero-fill-on-demand), http;//www.kernelnewbies.org/glossary, downloaded Feb. 22, 2006.
"Linux Kernel Glossary," entry for ZFOD (zero-fill-on-demand), http;//www.kernelnewbies.org/KernelGlossary, downloaded Jul. 7, 2007 (14 pgs.).
Retro Fitting a Low-Boy Arcade Machine with a Pentium-Powered M.A.M.E. Setup, Oct. 1996, www.Cygnus.uwa.eud.au/~jaycole/jaw/arcade/html (5 pages).
Object-Oriented Programming Concepts, Sun Microsystems, Inc. (2002) 16 pages.
Terry Monlick, What is Object-Oriented Software, Software Design Consultants, LLC (1999), 5 pages.
OnCore Systems, http://www.oncoresystems.com (1999) 8 pages.
Encyclopedia, http://www.eetnetwork.com/encyclopedia, (2002) 7 pages.
Michael Tiemann, "Why Embedded Linux" http://linuxdevices.com/articles/AT8926600504.html (Oct. 28, 1999), 6 pages.
Rick Lehrbaum, "Why Linux" http://linuxdevices.com/articles/AT9663974466.html (Jan. 31, 2000) pp. 1-2.
Rick Lehrbaum, "Why Linux" http://linuxdevices.com/articles/AT3611822672.html (Feb. 19, 2000) pp. 1-5.
RTD USA, www.rtdusa.com (1998), downloaded from the Internet on Mar. 20, 2003, pp. 1-49.
Mardsen et al., Development of a PC-Windows Based Universal Control Systems, 5th Intl. Conf. on FACTORY 2000, Apr. 2-4, 1997, Conf. Pub. No. 435, pp. 284-287.
Paul Virgo, Embedded PC's for the Industrial Marketplace: An Analysis of the STD Bus, WESCON/'93. Conference Record, Sep. 28-30, 1993, pp. 621-623.
Jahn Luke et al., A commercial off-the-shelf based replacement strategy for aging avionics computers, Aerospace and Electronics Conference, 1998. NAECON 1998, Proceedings of the IEEE 1998 National, Jul. 13-17, 1998, pp. 177-181.
Get Control, Inc., PC-104 DIG-10-48 Plus, http://www.getcontrol.com downloaded from the interenet on Mar. 20, 2003, p. 1.
D. Powell et al. GUARDS: a generic upgradeable architecture for real-time dependable systems, Parallel and Distributed Systems, IEEE Transactions on, vol. 10, Issue: 6, Jun. 1999, pp. 580-599.
Robert A. Burckle, PC/104 Embedded Modules: The New Systems Components, http://www.winsystems.com/papers/sys_components.pdf downloaded form the internet on Mar. 20, 2003, pp. 1-3.
WinSystems, http://www.webarchive.org/web/19881212034126/http://winsystems.com (Dec. 12, 1998), downloaded from the internet on Oct. 27, 2003, all pages.
RTD USA, http://www.webarchive.org.web/1990422091026/-http://rtdusa.com/ (Apr. 22, 1999), downloaded from the internet on Oct, 27, 2003, all pages.
WinSystems, www.wingsystems.com downloaded form the internet on Apr. 2, 2003, pp. 1-25.
Jim Blazer, PC/104 Intelligent Data Acquisition, PC Embedded Solutions (Spring 1998), pp. 1-2.
Robert A. Burckle, STD Bus: Performance without Complexity, http://www.winsystems.com/papers/stdperformance.pdf (Aug. 1, 2001), pp. 1-3.
Craig Matasumoto, Intel starts preaching about security, EE Times http://eetimes.com/story/OEG1990121s0014 (Jan. 21, 1999), pp. 1-4.
Bovet, D.P. et al., "Understanding the Linux Kernel" Jan. 2001, pp. 1-34, XP002332389.
History of GSA, Web page [online]. Gaming Standards Association, 1997 [retrieved on Aug. 7, 2007] Retrieved from the Internet: <URL:http://www.gamingstandards.com/index.php?page=what_is_gsa/history_of_gsa>, 1 pg.
Value Proposition, Web page [online]. Gaming Standards Association, 1997 [retrieved on Aug. 7, 2007] Retrieved from the Internet: <URL:http://www.gamingstandards.com/index.php?page=what_is_gsa/value_proposition>, 2 pgs.

(56) References Cited

OTHER PUBLICATIONS

"Architecture for a Video Arcade Game Network," IBM Technical Disclosure Bulletin, Apr. 1, 1991, vol. 33, No. 11, pp. 138-141, NN9104138.

Chatley, Robert et al., "MagicBeans: a Platform for Deploying Plugin Components," Component Deployment, Lecture Notes in Computer Science LNCS, Springer Verlag, Berlin/Heidelberg vol. 3083, May 1, 2004, pp. 97-112. Retrieved form the Internet, URL: http://pubs.doc.ic.ac.uk/MagicBeans/MagicBeans.pdf.

Brown, Brian, Hardware Systems, Part 2a: Buses and Interfaces, 2000, pp. 2,4, and 6.

Intel Corporation, Pentium III Processors for Applied Computing, 2001, Intel Corporation, Product Brief, pp. 1-2.

Freescale Semiconductor, Inc., 256K × 16 Bit 3.3-V Asynchronous Magnetoresistive RAM, Jul. 2004, Freescale Semiconductor, Inc., MR@A16A Rev. 0.1, pp. 3, 7-14.

Hiroaki Higaki, 8 page document entitled "Group Communication Algorithmfor Dynamically Updating in Distributed Systems" Copyright 1994 IEEE International Conference on Parallel and Distributed Systems (pp. 56-62) 08-8186-655-6/94, higakisdesun.slab.ntt.in.

Steffen Hauptmarm, et al., 12 page document entitled "On-line Maintenance With On-The-Fly Software Replacement" Copyright 1996 IEEE Proceedings, Third International Conference on Configurable Distributed Systems, (pp. 70-80) 0-8186-7395-8/96.

Hiroaki Higaki, 9 page document entitled "Extended Group Communication Algorithm for Updating Distributed Programs" Copyright 1996, IEEE, International Conference on Parallel and Distributed Systems, 0-8186-7267 Jun. 1996, higQtakilab.k.dendai.as.ip.

U.S. Office Action dated Mar. 23, 2005 from U.S. Appl. No. 10/040,239.
U.S. Office Action dated Jun. 29, 2006 from U.S. Appl. No. 10/040,239.
U.S. Office Action dated Apr. 16, 2007 from U.S. Appl. No. 10/040,239.
U.S. Office Action dated Jan. 24, 2008 from U.S. Appl. No. 10/040,239.
Notice of Allowance dated Aug. 4, 2008 from U.S. Appl. No. 10/040,239.
Notice of Allowance dated Jan. 14, 2009 from U.S. Appl. No. 10/040,239.
U.S. Office Action dated Jan. 24, 2008 from U.S. Appl. No. 11/933,057.
U.S. Notice of Allowance dated Aug. 1, 2008 from U.S. Appl. No. 11/933,057.
U.S. Notice of Allowance dated Jan. 9, 2009 from U.S. Appl. No. 11/933,057.
U.S.Office Action dated Jul. 2, 2004 from related U.S. Appl. No. 10/041,212, 12 pgs.
U.S. Notice of Allowance dated Jan. 26, 2005 from U.S. Appl. No. 10/041,212.
Allowed Claims for U.S. Appl. No. 10/041,212.
U.S. Office Action dated Apr. 27, 2009 for U.S. Appl. No. 11/120,908.
U.S. Office Action dated Dec. 23, 2005 from U.S. Appl. No. 10/308,845.
U.S. Final Office Action dated Jun. 2, 2006 from related U.S. Appl. No. 10/308,845.
U.S. Office Action dated Dec. 13, 2006 from U.S. Appl. No. 10/308,845.
Office Action from U.S. Appl. No. 11/077,526 dated Oct. 15, 2007.
Office Action from U.S. Appl. No. 11/077,526 dated May 22, 2008.
Final Office Action from U.S. Appl. No. 11/077,526 dated Nov. 25, 2008.
Notice of Allowance from U.S. Appl. No. 11/077,526 dated Sep. 24, 2009.
Examiner Interview Summary from U.S. Appl. No. 11/077,526 dated Sep. 24, 2009.
US Office Action from U.S. Appl. No. 10/241,398 dated Nov. 24, 2003.
US Final Office Action from U.S. Appl. No. 10/241,398 dated May 27, 2004.
US Final Office Action from U.S. Appl. No. 10/241,398 dated Dec. 13, 2004.
US Office Action from U.S. Appl. No. 10/241,398 dated Aug. 2, 2005.
Notice of Allowance from U.S. Appl. No. 10/241,398 dated Jun. 28, 2006.
Allowed Claims for U.S. Appl. No. 10/241,398.
US Office Action from U.S. Appl. No. 11/542,361 dated Sep. 26, 2007.
Notice of Allowance from U.S. Appl. No. 11/542,361 dated Nov. 8, 2007.
Notice of Allowance from U.S. Appl. No. 11/542,361 dated Mar. 11, 2008.
Allowed Claims for U.S. Appl. No. 11/542,361.
U.S. Office Action dated Jun. 15, 2004 from related U.S. Appl. No. 10/134,657 11 pages.
U.S. Final Office Action dated Jan. 30, 2007 from related U.S. Appl. No. 10/134,657, 11 pages.
U.S. Office Action dated Jul. 31, 2007 from related U.S. Appl. No. 10/134,657, 10 pages.
U.S. Final Office Action dated Aug. 13, 2008 from related U.S. Appl. No. 10/134,657, 9 pgs.
U.S. Office Action dated Jan. 22, 2009 from related U.S. Appl. No. 10/134,657, 19 pgs.
U.S. Office Action mailed Dec. 4, 2000 from U.S. Appl. No. 09/405,921.
U.S. Office Action mailed Apr. 20, 2001 from U.S. Appl. No. 09/405,921.
U.S. Office Action mailed Sep. 24, 2001 from U.S. Appl. No. 09/405,921.
U.S. Office Action mailed Jun. 14, 2002 from U.S. Appl. No. 09/405,921.
U.S. Office Action mailed Apr. 2, 2003 from U.S. Appl. No. 09/405,921.
U.S. Office Action mailed Oct. 3, 2003 from U.S. Appl. No. 09/405,921.
U.S. Office Action mailed Jun. 10, 2004 from U.S. Appl. No. 09/405,921.
Notice of Allowance mailed Dec. 3, 2004 from U.S. Appl. No. 09/405,921.
U.S. Office Action mailed Apr. 14, 2003 from U.S. Appl. No. 09/847,051.
U.S. Office Action mailed Nov. 4, 2003 from U.S. Appl. No. 09/847,051.
U.S. Final Office Action mailed May 6, 2004 from U.S. Appl. No. 09/847,051.
U.S. Notice of Allowance mailed Nov. 4, 2004 from U.S. Appl. No. 09/847,051.
U.S. Office Action mailed Aug. 29, 2001 from U.S. Appl. No. 09/520,405.
U.S. Office Action mailed Aug. 2, 2002 from U.S. Appl. No. 09/520,405.
U.S. Office Action mailed Mar. 20, 2003 from U.S. Appl. No. 09/520,405.
U.S. Office Action mailed Sep. 8, 2003 from U.S. Appl. No. 09/520,405.
U.S. Office Action mailed Sep. 3, 2004 from U.S. Appl. No. 09/520,405.
U.S. Office Action mailed Dec. 20, 2005 from U.S. Appl. No. 09/520,405.
U.S. Office Action mailed Jul. 14, 2006 from U.S. Appl. No. 09/520,405.
U.S. Office Action mailed Mar. 7, 2007 from U.S. Appl. No. 09/520,405.
U.S. Office Action mailed Sep. 13, 2007 from U.S. Appl. No. 09/520,405.
U.S. Office Action mailed Jul. 8, 2008 from U.S. Appl. No. 09/520,405.
U.S. Office Action mailed Mar. 18, 2009 from U.S. Appl. No. 09/520,405.

(56) References Cited

OTHER PUBLICATIONS

U.S. Office Action mailed Nov. 10, 2004 from U.S. Appl. No. 10/827,042, 12 pgs.
U.S. Office Action mailed Jan. 19, 2006 U.S. Appl. No. 10/827,042, 12 pgs.
U.S. Office Action mailed Feb. 12, 2007 from U.S. Appl. No. 10/827,042.
U.S. Notice of Allowance mailed Aug. 23, 2007 from U.S. Appl. No. 10/827,042.
U.S. Allowed claims from U.S. Appl. No. 10/827,042.
U.S. Supplemental Notice of Allowance mailed May 5, 2008 from U.S. Appl. No. 10/827,042.
U.S. Office Action dated Nov. 22, 2005 from related U.S. Appl. No. 10/182,469.
U.S. Final Office Action dated Feb. 7, 2007 from related U.S. Appl. No. 10/182,469.
U.S. Office Action dated Aug. 14, 2007 from related U.S. Appl. No. 10/182,469.
U.S. Final Office Action dated Aug. 13, 2008 from related U.S. Appl. No. 10/182,469.
U.S. Office Action dated Apr. 28, 2009 from related U.S. Appl. No. 10/182,469.
U.S. Office Action dated Jun. 17, 2005 from related U.S. Appl. No. 10/241,804.
U.S. Final Office Action dated Mar. 9, 2006 from related U.S. Appl. No. 10/241,804.
U.S. Office Action dated May 31, 2007 from related U.S. Appl. No. 10/241,804.
U.S. Office Action dated Feb. 25, 2008 from related U.S. Appl. No. 10/241,804.
U.S. Office Action mailed Dec. 22, 2008 from U.S. Appl. No. 10/241,804.
AU Office Action dated Sep. 5, 2007 from AU Application No. 2002331912, 3 pgs.
EP Office Action dated Dec. 8, 2005 from related EP Application No. 02768907.4, 4 pgs.
International Search Report for PCT Application No. PCT/US02/30782 dated Jun. 5, 2003.
Written Opinion for PCT Application No. PCT/US02/30782 dated Jul. 15, 2003.
International Search Report and Written Opinion for PCT Application No. PCT/US08/087809 dated Feb. 24, 2009.
AU Examiner's First Report dated Sep. 7, 2007 from Application No. 2002327737.
EPO Examination Report dated Nov. 19, 2007 from related EP Application No. 02763743.8.
International Search Report dated Jun. 10, 2003 from PCT Application No. PCT/US02/30610, 7 pgs.
PCT Written Opinion dated Jul. 15, 2003 from PCT Application No. PCT/US02/30610, 2 pgs.
CN Office Action dated Mar. 27, 2009 for Patent Application No. 200680015915.3.
EP Communication dated Apr. 15, 2008 from EP Application No. 06 721 157.3.
Notification Concerning Transmittal of International Preliminary Report on Patentability dated Sep. 20, 2007 from PCT Application No. PCT/US2006/007951, 7 pages.
Australian Office Action, dated Jan. 28, 2009, from corresponding AU Application No. 2003262957.
Supplementary European Search Report dated Jan. 7, 2008 from corresponding European Patent Application No. 03795637.2.
European Office Action, dated Jan. 9, 2009, from corresponding EP Application No. 03795637.2.
International Search Report dated Jan. 14, 2004 for PCT Application No. PCT/US2003/026984.
Australian Office Action dated Dec. 12, 2005, from corresponding Australian Application No. 20021245518, 2 pages.
Canadian Office Action mailed Nov. 6, 2008 in Application No. 2,402,351.
European Search Report dated Sep. 28, 2005 from corresponding EP Application No. 01918440.7, 3 pages.
International Search Report dated May 31, 2001 from related PCT Application No. PCT/US01/07381 1pg.
Australian Examination Report dated Jul. 10, 2007 from AU Application No. 2001245529.
Canadian Office Action mailed Dec. 30, 2008 in Application No. 2,402,389.
EP Supplementary Partial Search Report dated Apr. 17, 2007 from EP Application No. 01918453.0-2221.
Oral Proceedings Mailed Sep. 15, 2008 in European Application No. 01918453.0.
International Search Report dated Jun. 12, 2001 from related PCT Application No. PCT/US01/07447 2 pgs.
International Preliminary Examination Report dated Dec. 23, 2004 for PCT/US01/07447.
EP Supplementary Search Report dated Oct. 13, 2006 from related EP Application No. 02775968.7.
EP Office Action dated Aug. 23, 2007 from related EP Application No. 02775968.7.
International Search Report dated Feb. 6, 2003 from related PCT Application No. PCT/US02/30286, 7 pgs.
Australian Office Action mailed Dec. 1, 2008 in Application No. 2008200148.
U.S. Notice of Allowance dated Oct. 7, 2009 issued in U.S. Appl. No. 10/040,239.
U.S. Notice of Allowance dated Feb. 1, 2010 issued in U.S. Appl. No. 10/040,239.
U.S. Notice of Allowance dated Jun. 28, 2010 issued in U.S. Appl. No. 10/040,239.
U.S. Notice of Allowance dated Dec. 22, 2010 issued in U.S. Appl. No. 10/040,239.
U.S. Notice of Allowance dated Oct. 9, 2009 issued in U.S. Appl. No. 11/933,057.
U.S. Notice of Allowance dated Apr. 13, 2010 issued in U.S. Appl. No. 11/933,057.
U.S. Notice of Allowance dated Nov. 30, 2010 issued in U.S. Appl. No. 11/933,057.
U.S. Notice of Allowance dated Nov. 18, 2009 issued in U.S. Appl. No. 11/120,908.
U.S. Notice of Allowance dated Apr. 13, 2010 issued in U.S. Appl. No. 11/120,908.
U.S. Notice of Allowance dated Aug. 18, 2010 issued in U.S. Appl. No. 11/120,908.
U.S. Advisory Action dated Oct. 12, 2006 issued in U.S. Appl. No. 10/308,845.
U.S. Notice of Allowance dated Jan. 13, 2010 issued in U.S. Appl. No. 11/077,526.
U.S. Notice of Allowance dated Mar. 29, 2010 issued in U.S. Appl. No. 11/077,526.
Australian Statement of Grounds and Particulars dated Apr. 30, 2009 issued in AU2002331912.
Australian Notice of Withdrawal of Opposition dated Aug. 13, 2009 issued in AU2002331912.
PCT International Preliminary Examination Report dated Sep. 4, 2003 issued in PCT/US02/30782.
PCT International Preliminary Report on Patentability dated Jun. 29, 2010 issued in PCT/US2008/087809.
Australian Statement of Grounds and Particulars dated Apr. 3, 2009 in Support of Notice of Opposition filed in AU2002327737.
Australian Notice of Withdrawal of Opposition dated Aug. 20, 2009 filed in AU2002327737.
PCT International Preliminary Examination Report dated Sep. 4, 2003 issued in PCT/US02/30610.
Australian Office Action dated May 6, 2010, issued in AU2009200160.
Australian Office Action No. 1 dated Feb. 20, 2009, issued in AU2003293029.
PCT International Search Report dated Apr. 23, 2004 issued in WO2004-051588.
Russian Office Action dated May 19, 2008, issued in RU2005118989.

(56) References Cited

OTHER PUBLICATIONS

Second Chinese Office Action dated Nov. 6, 2009 issued in CN200680015915.3.
PCT International Search Report and Written Opinion from International Application No. PCT/US2006/007951, Jul. 10, 2006, 10 pages.
U.S. Office Action dated May 31, 2011 issued in U.S. Appl. No. 11/933,918.
U.S. Notice of Allowance dated Mar. 22, 2011 issued in U.S. Appl. No. 11/933,057.
U.S. Office Action dated Mar. 4, 2011, U.S. Appl. No. 12/135,981.
Canadian Office Action dated Jun. 9, 2011, Application No. 2,461,938.
U.S. Notice of Allowance dated Oct. 3, 2007 issued in U.S. Appl. No. 10/040,239.
U.S. Final Office Action dated Oct. 19, 2011 issued in U.S. Appl. No. 11/933,918.
U.S. Notice of Allowance dated May 18, 2012 issued in U.S. Appl. No. 11/933,918.
U.S. Office Action (Miscellaneous Communication) dated Jul. 20, 2012 issued in U.S. Appl. No. 11/933,918.
U.S. Notice of Allowance dated Oct. 21, 2010 issued in U.S. Appl. No. 11/120,908.
U.S. Notice of Allowance dated Oct. 11, 2011 issued in U.S. Appl. No. 12/135,981.
Australian Office Action dated May 10, 2010 issued in AU2009200411.
Canadian Office Action dated Apr. 2, 2012 issued in Application No. 2,461,938.
Canadian Examination Report dated Jun. 9, 2011 issued in CA 2,461,937.
Canadian Examination Report dated Apr. 16, 2012 issued in CA 2,461,937.
Russian Office Action—Resolution (notice of grant) dated Nov. 21, 2008 issued in RU2005118989.
Australian Examiner's first report dated Sep. 1, 2011 issued in AU Application No. 2010202256.
Canadian Examination Report dated Feb. 3, 2012 issued in CA 2,498,155.
RU Resolution on Grant dated Sep. 26, 2007 issued in RU 2005106850/09.

\* cited by examiner

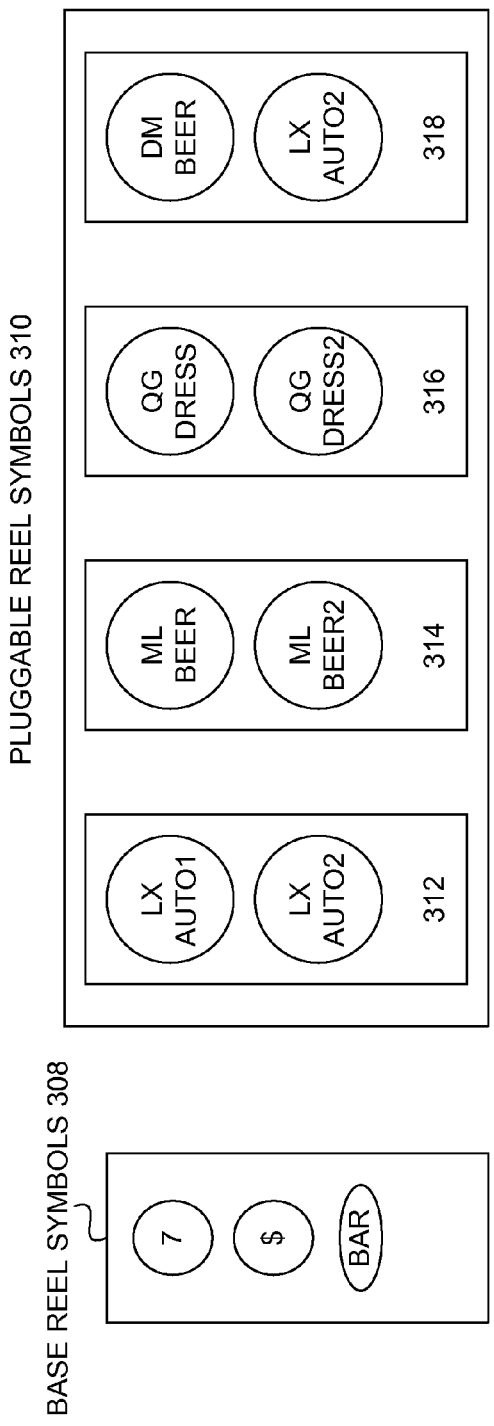
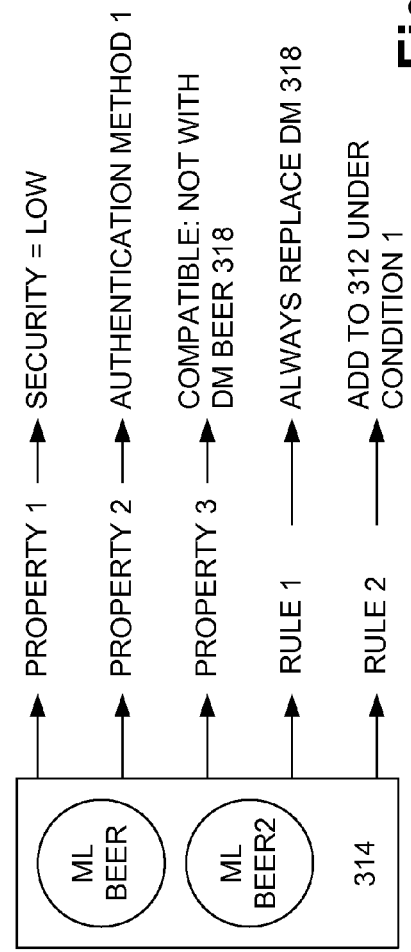
Figure 3B
Figure 3C

PLUGGABLE MODULAR GAMING MODIFIERS AND CONFIGURATION TEMPLATES FOR GAMING ENVIRONMENTS

CROSS-REFERENCE TO RELATED APPLICATIONS

This application is a continuation-in-part of and claims priority to the co-pending U.S. patent application Ser. No. 10/040,239, entitled "GAME DEVELOPMENT ARCHITECTURE THAT DECOUPLES THE GAME LOGIC FROM THE GRAPHICS LOGIC," filed on Jan. 3, 2002, which claims priority to the U.S. Provisional Patent Application No. 60/325,965, entitled "GAME DEVELOPMENT ARCHITECTURE THAT DECOUPLES THE GAME LOGIC FROM THE GRAPHICS LOGIC," filed on Sep. 28, 2001, all of which are hereby incorporated herein by reference in their entirety and for all purposes.

This application is also a continuation-in-part of and claims priority to the co-pending U.S. patent application Ser. No. 11/542,361, entitled "METHOD AND APPARATUS FOR MANAGING GAMING MACHINE CODE DOWNLOADS," filed on Oct. 2, 2006, which is a continuation of U.S. Pat. No. 7,131,909, filed on Sep. 10, 2002, all of which are hereby incorporated herein by reference in their entirety and for all purposes.

BACKGROUND OF THE INVENTION

In computer science and software engineering, the process by which a computer or virtual computer carries out the instructions of a computer program (or program) is referred to as "execution." The term "run" can be used almost synonymously as execution. A related meaning of both "to run" and "to execute" can refer to the act of starting a computer program.

Typically, execution of a computer program requires storing it into memory. The process or act of loading the computer program into memory for execution can be referred to as "loading." Loading can be accomplished by using a loading component (or "loader"). In a computer operating system, a loader can be a component that locates a given computer program (e.g., an application program, part of the operating system itself) from a storage device (e.g., hard disk) and loads it into main storage (e.g., Random Access Memory) for execution.

An application program can be comprised of many individual application program components. As such, those skilled in the art readily appreciate that execution of an application program could require loading many individual application components into memory for execution of the application program. Modern gaming environments provide an example of a computing environment where execution of a gaming application program (e.g., a game) can require loading many individual gaming application program components (or gaming components) into the memory of a gaming machine (unit or device) for execution to, for example, effectively provide a game (e.g., video poker game) to one or more individuals (players) for play in a gaming environment that may be subject to a number gaming regulations. To further elaborate, gaming machines are briefly discussed below.

Typically, a gaming machine utilizes a master controller to effectively control various combinations of devices that allow a player to play a game on the gaming machine and also encourage game play on the gaming machine. A game played on a gaming machine usually requires a player to input money or indicia of credit into the gaming machine, indicate a wager amount, and initiate playing a game of chance. These steps require the gaming machine to control input devices, such as bill validators and coin acceptors, to accept money into the gaming machine and recognize user inputs from devices, including key pads, button pads, card readers, and ticket readers, to determine the wager amount, and initiate game play. After game play has been initiated, the gaming machine determines the outcome of the game, presents the game outcome to the player and may dispense an award of some type depending on the outcome of the game. The operations described above may be carried out on the gaming machine when the gaming machine is operating as a "stand alone" unit and/or linked in a network of some type to a group of gaming machines.

As technology in the gaming industry progresses, more and more gaming services are being provided to gaming machines via communication networks that link groups of gaming machines to a remote computer, such as a host server (or server), that provides one or more gaming services. As an example, gaming services that may be provided by a remote computer to a gaming machine via a communication network of some type include player tracking, accounting, cashless award ticketing, lottery, progressive games, and bonus games or prizes. These services and features are provided in addition to the games that are available for play on the gaming machines. This type of environment is often referred to as a sever-based gaming environment.

SUMMARY OF THE INVENTION

Broadly speaking, the invention pertains to frameworks for providing modular computer program code and automated configuration of server-based gaming environments. It will be appreciated that modular computer program code can be divided into a plurality of gaming modules. Furthermore, each gaming module can include a plurality of gaming sub-modules, and so on. In accordance with one aspect of the invention, one or more "pluggable" modular gaming modifier can be provided for the modular computer program code. It will be appreciated that "pluggable" modular gaming modifier can modify and enhance one or more properties and/or behavior of the modular computer program code. Moreover, the pluggable modular gaming modifier can modify and/or enhance the modular computer program code without requiring the replacement of the entire computer program code. Typically, the pluggable modular gaming modifier can be added to or replace one or more gaming modules or sub-modules, thereby requiring less time and effort for effectively modifying game presentation in gaming environments.

In accordance with another aspect of the invention, configuration data can be generated and stored so that it can be used to configure gaming machines. It will be appreciated that configuration data can include one or more configuration templates that effectively provide the information needed to configure one or more gaming machines. The configurations template can be organized in accordance with general and specific categories. The general categories can, for example, include: content-based configuration templates that effectively identify the gaming content to be configured, machine-based (or location-based) configuration effectively identifying the gaming machines that are to be configured, time-based configuration templates that can identify various times or time periods (e.g., every Friday between 7 pm to 11 am), condition-based (or event-based) configuration templates that effectively identify various conditions and/or events (e.g., if the gaming machine has been in use for more than 4 hours today, if the gaming machine has generated a determined amount of revenue today), and so on. In one embodiment, the content-based configuration templates are generated based on gaming modules and/or sub-modules provided for modular computer program code for a game. As such, a content-based configuration template can effectively include and/or identify one or more modules that can be used to configure gaming machines. It should also be noted that content-based gaming modifiers can also include and/or effectively identify one or more pluggable modular or sub-modular gaming modifiers. It will also be appreciated that the configuration templates can be provided as "pluggable" configuration templates capable of being effectively combined with each other to form a configuration template that includes the features provided by a plurality of configuration templates.

The invention can be implemented in numerous ways, including a method, an apparatus, a computer readable medium, and a computing device. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 3B depicts reel symbols also shown in FIG. 3A in greater detail in accordance with one embodiment of the invention.

FIG. 3C depicts the pluggable reel symbols (or modifier) in accordance with one embodiment of the invention.

DETAILED DESCRIPTION OF THE INVENTION

Figure 1:
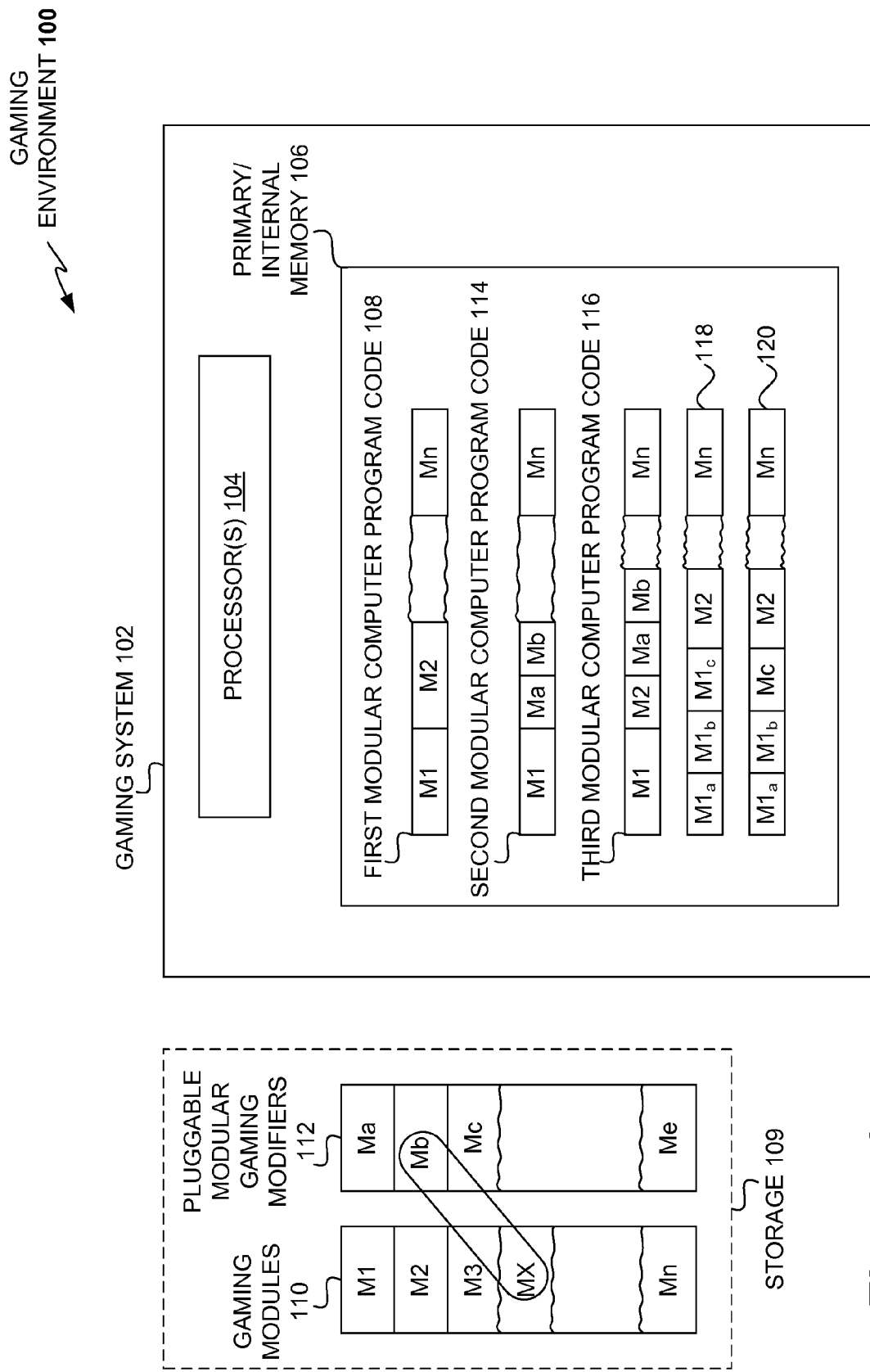
FIG. 1 depicts a gaming environment in accordance with one embodiment of the invention.

As noted in the background section, server-based gaming systems have been recently developed. In server-based gaming, a server can effectively provide the gaming content and settings for a number of gaming machines individually. The server can be effectively used to configure even gaming machine individuals to change the content and setting of each gaming machine one by one. What can be changed, for example, includes: denomination, game content, theme, sound, graphics, and bonusing. To change the content or setting, the server can, for example, send a message to the designated gaming machine. Conventionally, each gaming machine is configured individually. This means that for each gaming machine configuration, information (or configuration data) has to be defined and provided individually. For example, if a casino wishes to change the theme for two hundred (200) machines and change the sound setting for four hundred (400) of the gaming machines it owns, numerous tasks have to be performed. More particularly, an authorized user (e.g., administrator, operator) needs to perform two hundred (200) separate tasks to change the theme for the two hundred (200) gaming machines and four hundred (400) additional tasks to change the sound for the gaming machines. It is apparent that configuring the gaming machines using conventional techniques can be a highly time-consuming and labor intensive process requiring identifying each of the gaming machines individually so that it can be configured manually one by one. It is also apparent that manually configuring the gaming machine is error prone where, for example, by incorrectly typing a machine ID or selecting the wrong machine, an operator may cause an unintended change which is hard to detect resulting in harm and serious problems. Furthermore, as the number of gaming machines increase in server-based gaming, manually configuring each machine becomes more and more unmanageable.

In view of the foregoing, improved techniques for configuring server-based gaming systems are needed. More generally, a framework for presenting and modifying gaming content and settings is needed.

The invention pertains to frameworks for providing modular computer program code and automated configuration of server-based gaming environments. It will be appreciated that modular computer program code can be divided into a plurality of gaming modules. Furthermore, each gaming module can include a plurality of gaming sub-modules, and so on. In accordance with one aspect of the invention, one or more "pluggable" modular gaming modifier can be provided for the modular computer program code. It will be appreciated that "pluggable" modular gaming modifier can modify and enhance one or more properties and/or behavior of the modular computer program code. Moreover, the pluggable modular gaming modifier can modify and/or enhance the modular computer program code without requiring the replacement of the entire computer program code. Typically, the pluggable modular gaming modifier can be added to or replace one or more gaming modules or sub-modules, thereby requiring less time and effort for effectively modifying game presentation in gaming environments.

with another aspect of the invention, configuration data can be generated and stored so that it can be used to configure gaming machines. It will be appreciated that configuration data can include one or more configuration templates that effectively provide the information needed to configure one or more gaming machines. The configurations template can be organized in accordance with general and specific categories. The general categories can, for example, include: content-based configuration templates that effectively identify the gaming content to be configured, machine-based (or location-based) configuration effectively identifying the gaming machines that are to be configured, time-based configuration templates that can identify various times or time periods (e.g., every Friday between 7 pm to 11 am), condition-based (or event-based) configuration templates that effectively identify various conditions and/or events (e.g., if the gaming machine has been in use for more than 4 hours today, if the gaming machine has generated a determined amount of revenue today), and so on. In one embodiment, the content-based configuration templates are generated based on gaming modules and/or sub-modules provided for modular computer program code for a game. As such, a content-based configuration template can effectively include and/or identify one or more modules that can be used to configure gaming machines. It should also be noted that content-based gaming modifiers can also include and/or effectively identify one or more pluggable modular or sub-modular gaming modifiers. It will also be appreciated that the configuration templates can be provided as "pluggable" configuration templates capable of being effectively combined with each other to form a configuration template that includes the features provided by a plurality of configuration templates.

Embodiments of these aspects of the invention are discussed below with reference to FIGS. 1-13. However, those skilled in the art will readily appreciate that the detailed description given herein with respect to these figures is for explanatory purposes as the invention extends beyond these limited embodiments.

FIG. 1 depicts a gaming environment 100 in accordance with one embodiment of the invention. Referring to FIG. 1, the gaming system 102 effectively provides one or more games for playing in the gaming environment 100. The gaming system 102 includes one or more processor(s) 104 and primary/internal memory 106. It will be appreciated that the gaming system 102 can, for example, be a gaming server or an individual gaming machine configured to provide various gaming services including one or more games for play in the gaming environment 100. The one or more processors 104 can be configured and/or are operable to execute a first modular computer program code 108 for a game of chance. As shown in FIG. 1, the first modular computer program code 108 includes a plurality of gaming modules $M_1$-$M_n$. Moreover, it will be appreciated that the first modular computer program code 108 is configured to receive one or more other gaming modules that can serve as pluggable modular gaming modifiers. Generally, a pluggable modular gaming modifier can be integrated with and/or replace one or more of the modules $M_1$-$M_n$. It should be noted that a gaming module can generally serve as a pluggable modular gaming modifier. As such, each of the gaming modules $M_1$-$M_n$ can, for example, serves as a pluggable modular gaming modifier for another computer program code. However, it should be noted that generally a gaming module can serve as portable modular gaming modifier and vise versa.

To further elaborate, the plurality of gaming modules ($M_1$-$M_n$) 110 are depicted along with a plurality of gaming modifiers 112 labeled as $M_a$-$M_e$. Again, it should be noted that a gaming module (e.g., Mx) can also serve as a pluggable modular gaming modifier (e.g., $M_b$) and vice versa. Referring to FIG. 1, a second modular computer program code 114 is stored in the primary/internal memory 106 and can be executed by the one or more processors 104 to provide a game of chance. The second modular computer program code 114 can, for example, represent the first modular computer program code 108 after the second gaming module M2 has been effectively replaced by the pluggable modular gaming modifiers $M_a$ and $M_b$. It will be appreciated that the pluggable modular gaming modifiers $M_a$ and $M_b$ can effectively modify and/or enhance one or more properties and/or characteristics of the first modular computer program code 108 to effectively yield a modified version of the first modular computer program code 108.

In general, a combination of gaming modules 110 stored at a storage 109 can effectively provide modular computer program code for a game of chance. Moreover, one or more pluggable modular gaming modifiers 112 can be added to a combination of the gaming modules 110 and/or replace one or more of the gaming modules 112. This allows constructing computer code for a game using one and/or more gaming modules (110) and further provides the ability to modify the behavior and/or characteristics of the game by effectively plugging in one or more pluggable modular gaming modifiers (112) into the computer program code.

Referring to FIG. 1, a third modular computer program code 116 is depicted where pluggable modular gaming modifiers $M_a$ and $M_b$ are added to the first modular computer program code 108. As will be discussed in greater detail below, the compatibility of a pluggable modular gaming modifier and one or more gaming modules can be checked before integrating the pluggable modular gaming modifier with the one or more gaming modules. In addition, authenticity of a pluggable modular gaming modifier and a gaming module can be verified before combining them together and/or other gaming modules or pluggable modular gaming modifiers. Further, the number of times a particular gaming module and/or a pluggable modular gaming modifier is loaded and/or executed can be determined and stored for subsequent use for various gaming and/or gaming related activities.

It should also be noted that one or more of the gaming modules M1-Mn can include one or more sub-modules. By way of example, the first gaming module M1 can include three (3) gaming sub-modules $M1_a$, $M1_b$ and $M1_c$. Referring to FIG. 1, the gaming sub-modules $M1_a$, $M1_b$ and $M1_c$ are depicted as a part of the modular computer program code 118 which can be another representation of the first modular computer program code 108. FIG. 1 also depicts computer program code 120 where the gaming sub-module $M1_c$ is effectively replaced by pluggable modular gaming modifier Mc. In view of the foregoing, it will be appreciated that the pluggable modular gaming modifiers 112 can be associated with and/or provided as a replacement or compliment for various gaming modules and sub-modules in order to effectively change the characteristics and/or behavior of a game in a dynamic manner by effectively plugging in or out individual gaming modules or modifiers into existing computer program code.

Figure 2A:
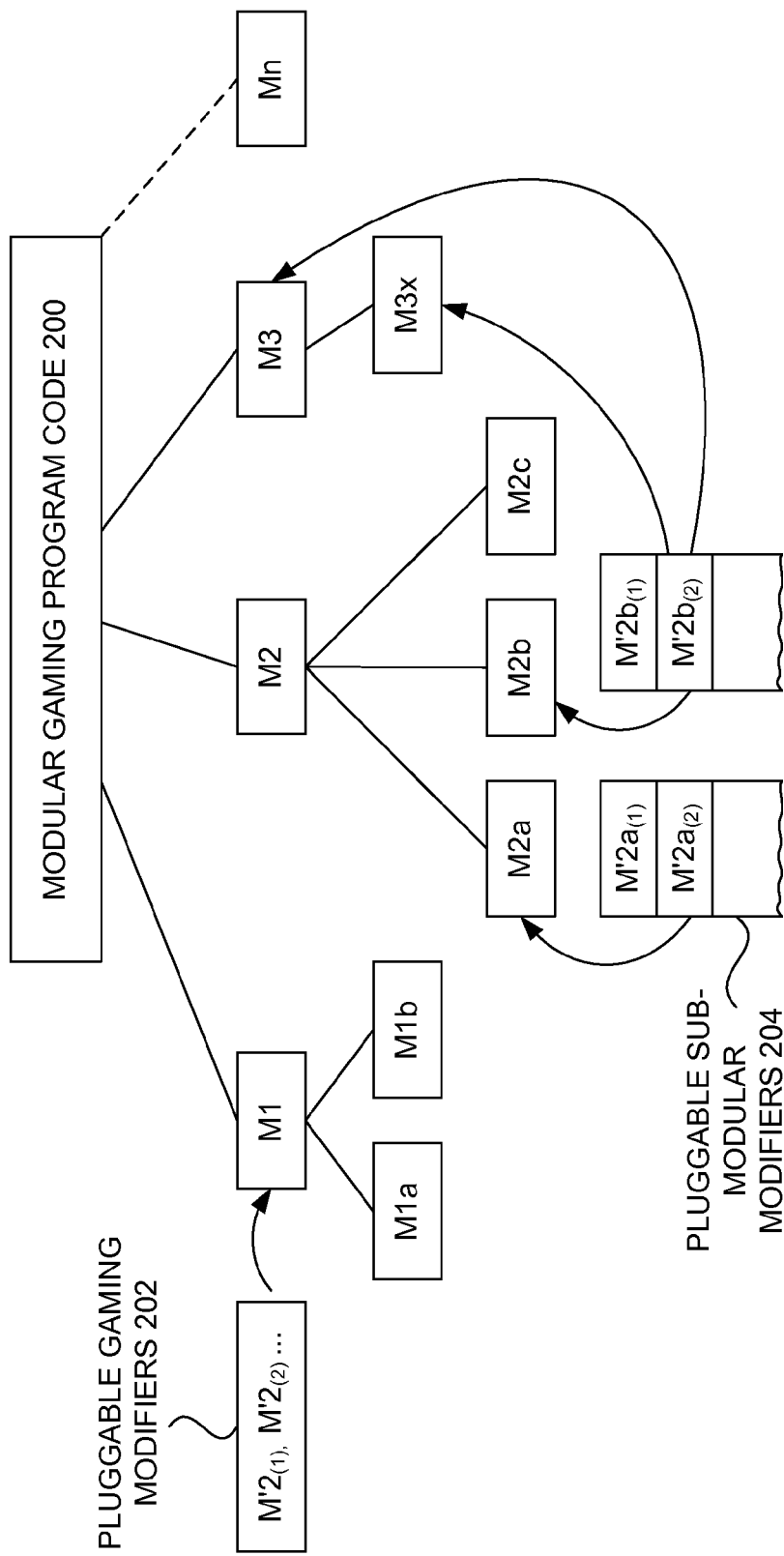
FIG. 2A depicts modular gaming program code in accordance with one embodiment of the invention.

FIG. 2A depicts modular gaming program code 200 in accordance with one embodiment of the invention. Referring to FIG. 2A, the modular gaming program code 200 includes a plurality of modules $M_1$-$M_n$. The modules $M_1$-$M_n$ can, for example, represent base and/or default gaming modules for providing basic and/or default functionality (behavior or characteristics) for the modular gaming program code 200. As suggested by FIG. 2A, each of the gaming modules $M_1$-$M_n$ can be further sub divided into sub-modules, and so on. Similar to the gaming modules, the sub-modules can provide basic or default functionality for a game. Referring to FIG. 2A, for each of the gaming modules $M_1$-$M_n$, a set of pluggable gaming modifiers can be provided to, among other things, effectively enhance and/or replace the functionality provided by each one of gaming modules $M_1$-$M_n$. For example, for the gaming module M1, a set of pluggable modifier 202 can be provided. Similarly, a set of pluggable sub-modifiers 204 can be provided for the sub-module $M2_a$, and so on. It will be appreciated that various combinations of pluggable gaming modifiers and/or sub-modifiers can be used to effectively change and/or enhance the gaming program code 200 provided by the gaming modules $M_1$-$M_n$. To further elaborate, a few exemplary combinations are shown in FIG. 2B.

Those skilled in the art will appreciate that a pluggable gaming modifier can, for example, be implemented as a child object of a parent object in accordance with the principles of object oriented programming. As such, pluggable gaming modifiers 202 can, for example, be child objects with respect to the gaming module M1 which can be considered a parent object. Similarly, the pluggable gaming sub-module modifiers $M'2_{a(1)}$ and $M'2_{a(2)}$ can, for example, represent child object program code (or child objects) of the gaming sub-module $M2_a$ which can effectively be implemented as parent object oriented program code (or a parent object). As such, pluggable gaming modular or sub-modular modifiers can inherit the properties of their respective parent modules and sub-modules. However, it will be appreciated that the pluggable gaming modular and sub-modular modifiers can exhibit ubiquitous behavior where they can effectively be used in combination and/or replace modules and sub-modules not related to them in a parent-child relationship. Referring to FIG. 2A, although pluggable gaming sub-module modifier $M'2_{b(2)}$ can be implemented as child to the module $M2_b$, it could also be compatible with the gaming module M3 and/or sub-module $M3_x$ which are not in a parent-child relationship with the gaming sub-modular modifier $M'2_{b(2)}$.

Figure 2B:
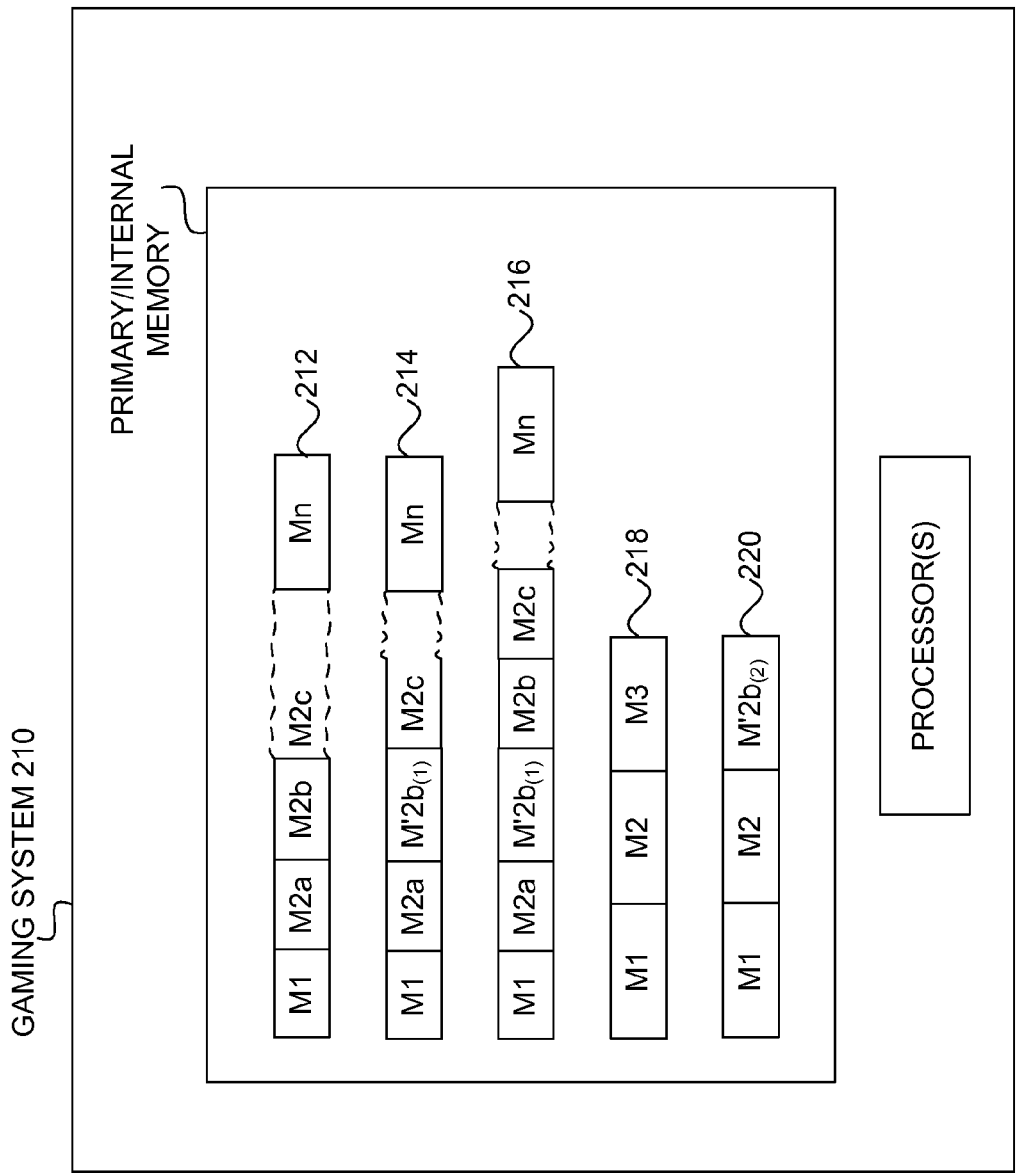
FIG. 2B depicts a gaming system in accordance with one embodiment of the invention.

Referring now to FIG. 2B, a gaming system 210 is depicted in accordance with one embodiment of the invention. The gaming system 210 is configured and/or operable to execute base modular (or default) gaming program code 212 including one or more base gaming modules $M_1$-$M_n$. It should be noted that one or more of the gaming modules $M_1$-$M_n$ can be a plurality of gaming sub-modules. For example, the gaming sub-modules $M2_a$, $M2_b$, and $M2_c$ can collectively represent a gaming module M2 of modular gaming program code 212.

The gaming system 210 can also execute a modified version of the modular gaming program 212, namely, modified modular gaming program code 214. It should be noted that the gaming sub-module $M2_b$ of the modular gaming program code 212 is replaced by a pluggable sub-modifier $M'2_{b(1)}$. As another example, the gaming system 210 can be configured to execute another modified modular gaming system 216 where the pluggable sub-modifier $M'2_{b(1)}$ is added to the gaming sub-modules $M2_a$, $M2_b$ and $M2_c$.

Referring back to FIG. 2B, a base modular gaming program code 218 including modules M1, M2 and M3. A modified version of the base modular gaming program code 218 is depicted as gaming program code 220 provided by effectively replacing the third gaming module (M3) with a pluggable sub-modular modifier $M'2_{b(2)}$. Again, it should be noted that the pluggable sub-modular modifier $M'2_{b(2)}$ does not need to be in a relationship with the third module (M3).

Figure 3A:
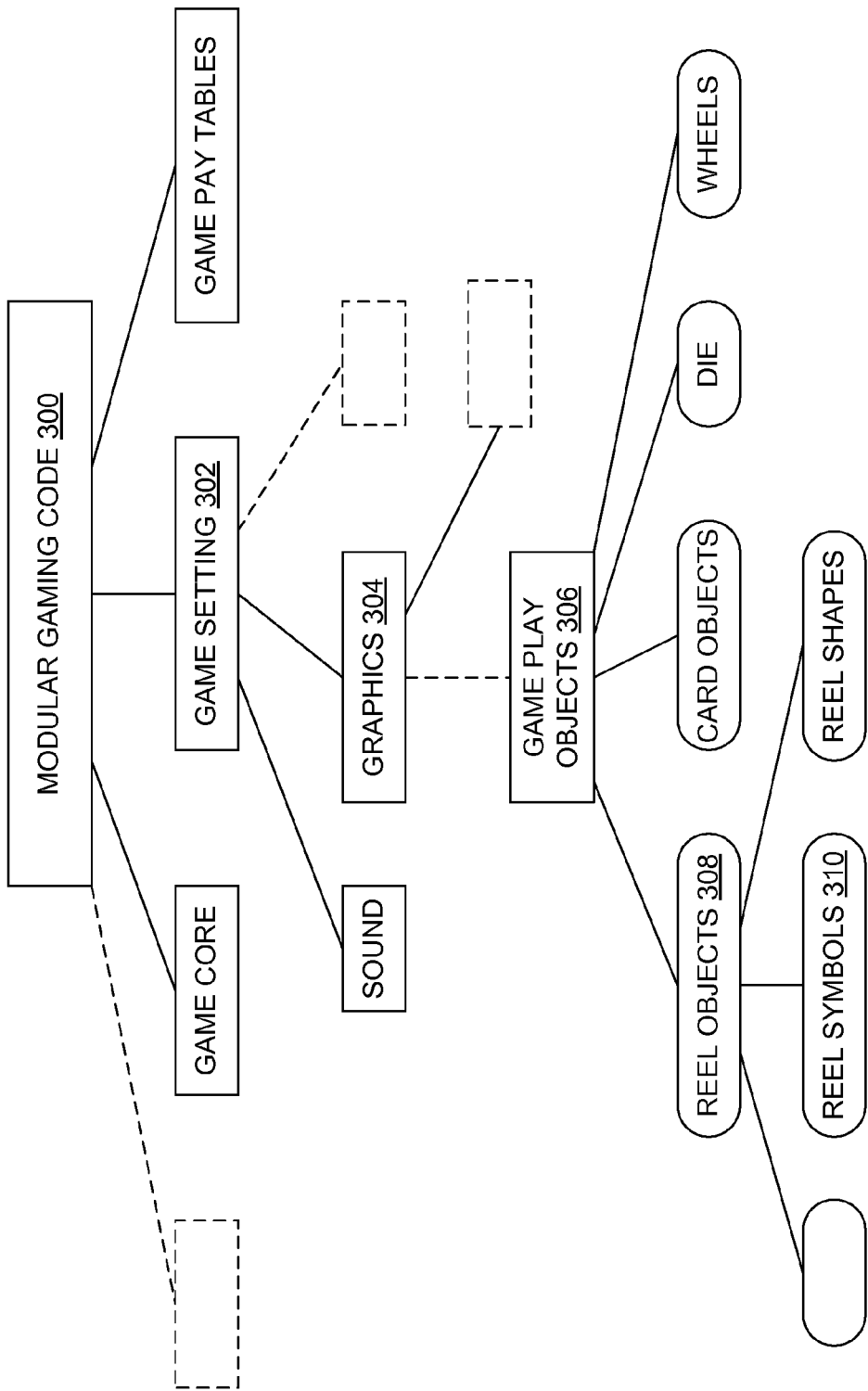
FIG. 3A depicts an exemplary modular gaming code in accordance with one embodiment of the invention.

FIG. 3A depicts an exemplary modular gaming code 300 in accordance with one embodiment of the invention. It will be appreciated that the modular gaming code 300 can be effectively divided into several gaming modules. Referring to FIG. 3A, a few exemplary gaming modules including a game setting module 302 are depicted. As shown in FIG. 3A, the game setting module 302 can be further sub-divided into a plurality of sub-modules including a graphics gaming sub-module 304. In addition, the graphics gaming sub-module 304 can be divided into several other gaming sub-modules including a game play objects sub-module 306 and so on. The game play objects 306 can, for example, represent various graphical objects that are used for one or more games of chance. As such, the game play objects 306 can, for example, include reel objects 308 for reel-based games. The reel objects 308 can be further sub-divided into reel symbols, reel shapes, sizes and so on. It will be appreciated that for each of the modules and/or sub-modules depicted in FIG. 3A, a set of pluggable gaming modules and/or sub-module modifiers can be provided. By way of example, the reel symbols 310 can be provided as a set of base, parent and/or default symbols used for reel-based games.

To further elaborate, FIG. 3B depicts reel symbols 308 also shown in FIG. 3A in greater detail in accordance with one embodiment of the invention. Referring to FIG. 3B, a set of base (parent or default) reel symbols are depicted. It will be appreciated that the set of base reel symbols 308 can be provided as a default graphics for playing one or more reel base games. FIG. 3B also depicts a set of pluggable reel symbol 310 which can be provided as modular and/or sub-modular modifiers for the base reel symbols 308. As such, the first set of pluggable reel symbol 312 can, for example, be added or replace one or more of the base symbols depicted in the set of base reel symbols 308. In other words, one or more symbols of the pluggable reel symbols 312 can be either added to and/or replace one or more of the base symbol 308 for a game. By way of example, the pluggable reel symbols 312 can represent the symbols for luxury cars which can be provided as an addition or as an alternative to the default symbols of the base reel symbols 308. Similarly, the other sets of pluggable reel symbols 314, 316 and 318 can represent other symbols related to other entities (e.g., symbols for various beers, cars, clothing, etc.).

It should be noted that various relationships can be defined for the pluggable reel symbols 312, 314, 316 and 318. For example, the pluggable reel symbols 314 and 318 can be defined to be compatible (or incompatible) with each other. Further, security operations (e.g., authentication) may be performed before allowing the base reel symbols 308 to be modified and/or replaced. In order to allow security operations (e.g., authentication), each of the pluggable reel symbols can have several properties assigned to them. These properties can also be used to define and/or directly define the relationships between pluggable reel symbols 312.

To further elaborate, FIG. 3C depicts the pluggable reel symbols (or modifier) 314 in accordance with one embodiment of the invention. Referring to FIG. 3C, the pluggable reel symbols (or modifier) 314 is depicted with three properties. The first property (property 1) defines the security level to be low. As such, relatively lower security measures can be taken with respect to authentication and/or authorization operations in connection with the pluggable reel symbols (or modifier) 314. The second property (property 2) is configured to define the authentication method that can be used for authentication purposes. The third property (property 3) can effectively declare that the pluggable reel modifier 314 is not compatible with another pluggable modifier, namely, the pluggable reel symbols (or modifier) 318 also depicted in FIG. 3B. As will be appreciated by those skilled in the art, additional properties may be defined. It should be noted that a modular gaming code can be organized in accordance with several categories and criteria.

Figure 3D:
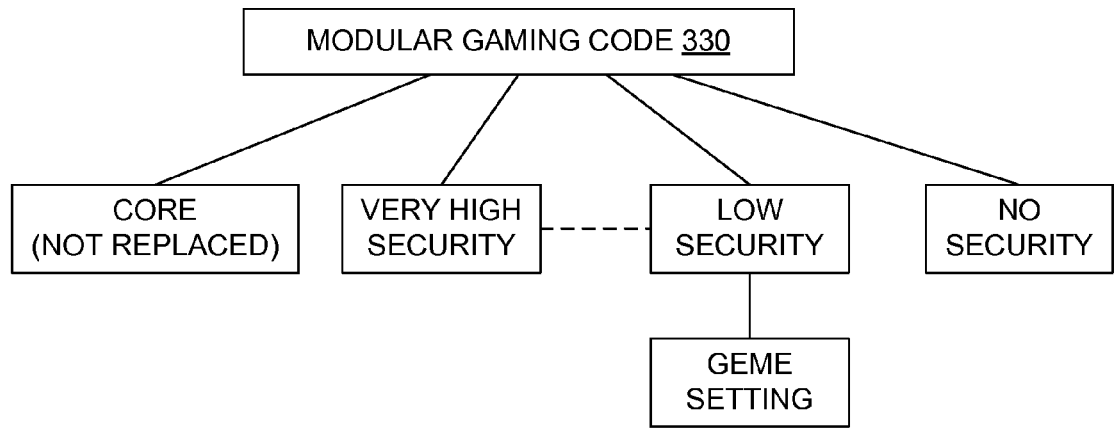
FIG. 3D depicts modular gaming code organized in accordance with another embodiment of the invention.

To further elaborate, FIG. 3D depicts modular gaming code 330 organized in accordance with another embodiment of the invention. Referring to FIG. 3D, the modular gaming code 330 is divided in accordance with various levels of security associated with the modular gaming components. By way of example, a top level security (or core) may be defined as a level where the gaming modules and sub-modules cannot be modified or replaced. Other levels of security can range from no security to very high security. Those skilled in the art will appreciate that for each level of security a set of security measures can be defined and enforced. By way of example, a gaming setting category may be defined for which low security measures and be taken. This category can, for example, include gaming modules that do not affect the game logic and/or need not to be approved by regulatory bodies.

Figure 3E:
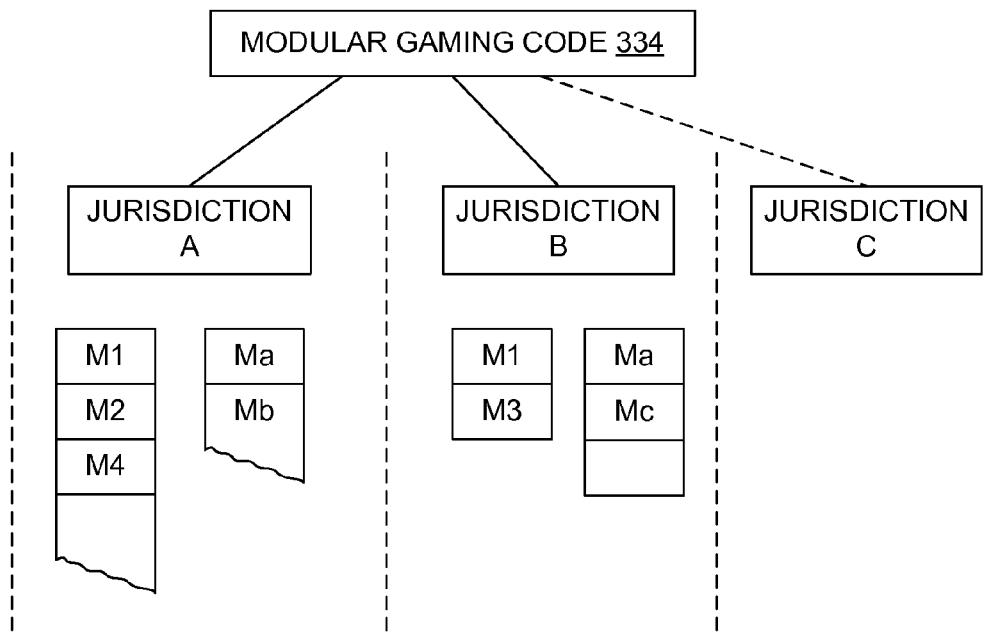
FIG. 3E depicts a modular gaming code organized in accordance with another embodiment of the invention.

FIG. 3E depicts a modular gaming code 334 organized in accordance with another embodiment of the invention. Referring to FIG. 3E, the modular gaming code 334 is divided in accordance with the jurisdiction (or geographical area) where the game is to be played.

Figure 4:
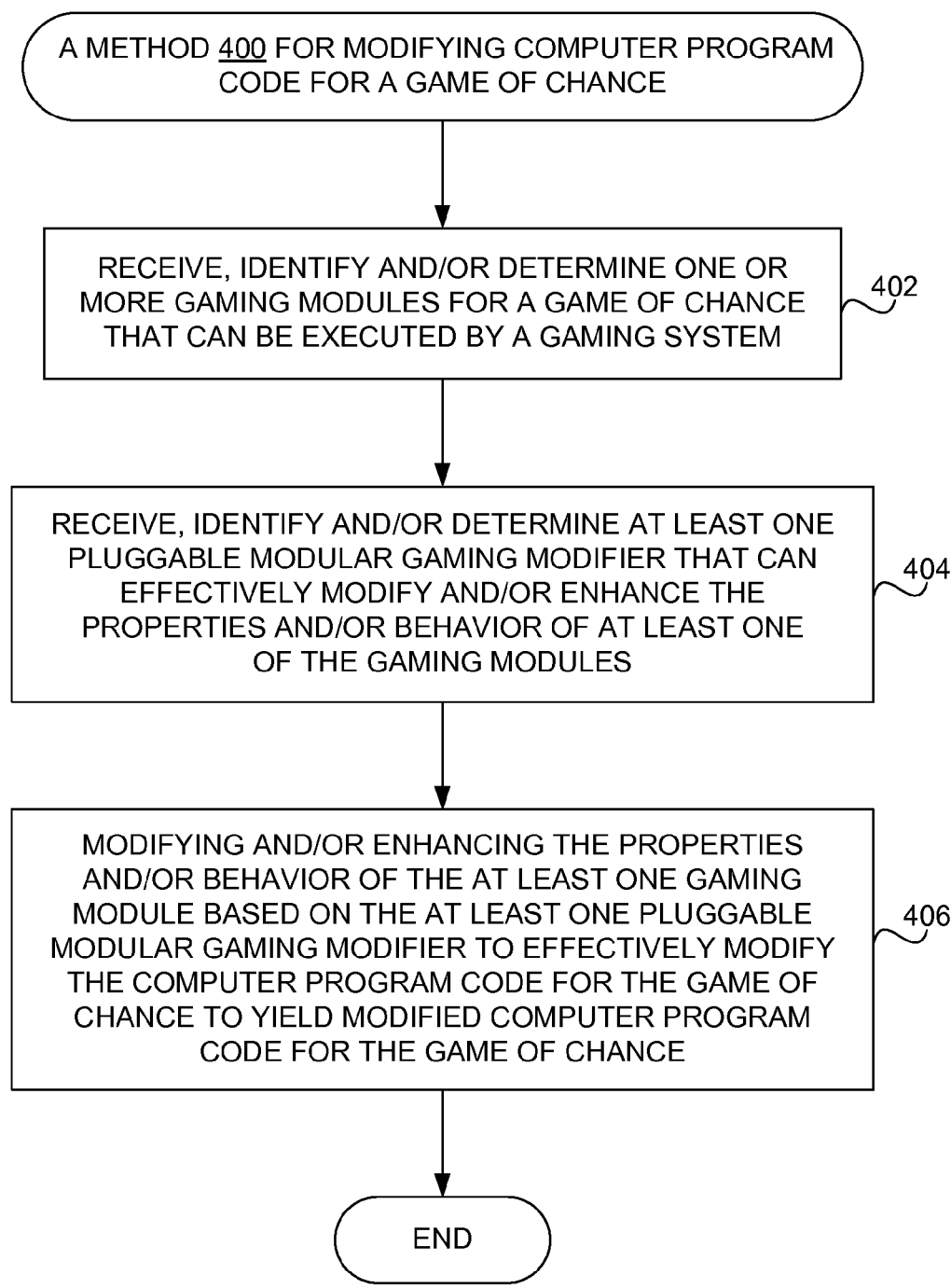
FIG. 4 depicts a method for modifying computer program code for a game of chance in accordance with one embodiment of the invention.

FIG. 4 depicts a method 400 for modifying computer program code for a game of chance in accordance with one embodiment of the invention. The method 400 can, for example, be used by the gaming system 102 depicted in FIG. 1. Initially, one or more gaming modules for a game of chance are received, identified or determined (402). It should be noted that one or more gaming modules are part of the computer program code for a game of chance and the computer program code can be executed by gaming system effectively provide the game of chance. Next, at least one pluggable modular gaming modifier is received, identified and/or determined (404). It should be noted that a pluggable modular gaming modifier can effectively modify and/or enhance the properties and/or behavior of at least one of the gaming modules of the game of chance, thereby modifying and/or enhancing the properties and/or behavior of the computer code for the game of chance to yield a modified computer program code for the game of chance. Accordingly, the properties and/or behavior of the at least one gaming module is modified and/or enhanced (406) based on the one or more pluggable modular gaming modifiers to effectively modify the computer program code for the game of chance to yield a modified computer program code for the game of chance. It will be appreciated that the modified computer program code can, for example, provide a variation and/or different configuration for the game of chance.

Figure 5:
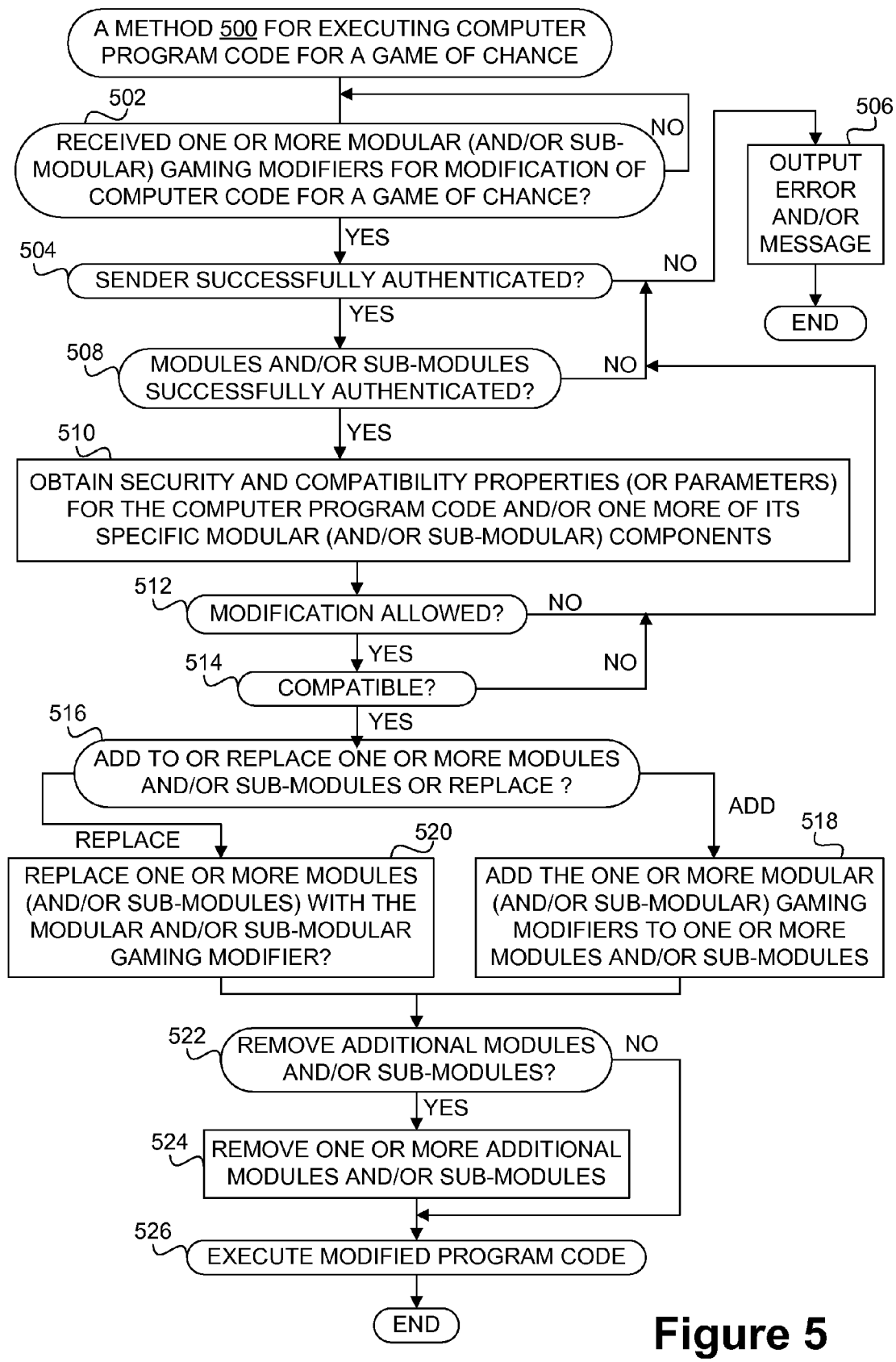
FIG. 5 depicts a method for executing computer program code for a game of chance in accordance with one embodiment of the invention.

FIG. 5 depicts a method 500 for executing computer program code for a game of chance in accordance with one embodiment of the invention. The method 500 can, for example, be used by a gaming machine that communicates with a gaming server. The gaming server can effectively provide (e.g., download) gaming modules. The game server can also provide modular and/or sub-modular modifiers that can effectively change and/or replace one or more of the gaming modules. Referring to FIG. 5, one or more modular or sub-modular gaming modifiers are received (502). It should be noted that the modular or sub-modular gaming modifiers can effectively modify computer program code for a game of chance. Next, the entity that transmitted or sent to the one or more modular or sub-modular gaming modifiers is authenticated (504). As noted above, a gaming server can, for example, transmit the modular or sub-modular gaming modifiers to a gaming machine. If the sender is not successfully authenticated, an error and/or message can be output (506) and the method 500 ends. However, if the sender is successfully authenticated (504), the modules or sub-modules can be authenticated. Accordingly, it is determined (508) whether the modules or sub-modules can be successfully authenticated. If it is determined (508) that the modules cannot be successfully authenticated, an error and/or message can be output (506). On the other hand, if the modules are successfully authenticated, security and/or compatibility properties (or parameters) for the computer program code and/or one or more of its specific modular and/or sub-modular components are obtained (510). It should be noted that the authentication of the entities and/or modules and/or sub-modules can be performed mutually between the two entities. In other words, the sender can also authenticate the identity of the receiver and the modules can effectively be mutually authenticated (e.g., a modular, a modular gaming modifier can authenticate one or more gaming modules and vice versa).

In any case, after obtaining (510) security and compatibility properties, it is determined (512) based on the one or more security properties whether modification to the computer program code and/or one or more of its specific modular and/or sub-modular components are allowed (512). It will be appreciated that the gaming modifiers and modules can, for example, be implemented to effectively identify a set of associated gaming modules and/or sub-modules. Furthermore, the computer program code as a whole and/or its modules and sub-modules can have properties indicating whether they can be modified or not. Accordingly, if it is determined (512) that modification is not allowed, an error and/or message can be output (506) and the method 500 ends. However, if it is determined (512) that modification is allowed, it is determined (514) whether the one or more modular and/or sub-modular gaming modifiers are compatible with the computer program code as a whole and/or one or more particular modules or sub-modules designated to be modified by the one or more modular and/or sub-modular gaming modifiers. If it is determined (514) that a modular gaming modifier is not compatible, an error and/or message can be output (506) and the method 500 ends. However, if it is determined (514) that the one or more modular and/or sub-modular gaming modifiers are compatible with the computer program code and/or one or more specific gaming modules and/or sub-modules, it is determined (516) whether to add the one or more modular and/or sub-modular gaming modifiers to the computer program code by adding them to one or more specific gaming modules or sub-modules, or whether to effectively replace one or more gaming modules and/or sub-modules of the computer program code by the one or more modular gaming modifiers. Accordingly, based on this determination (516), one or more modular and/or sub-modular gaming modifiers can be added (518) to one or more gaming modules and/or sub-modules, or one or more gaming modules and/or sub-modules of the computer program code can be replaced by the one or more modular and/or sub-modular gaming modifiers.

Thereafter, it is determined (522) whether to remove one or more additional gaming modules and/or sub-modules from the computer program code. It will be appreciated that this determination (522) can, for example, be made in cases when a first gaming modifier has been added to an associated first gaming module of the computer program code. However, there is a need to remove one or more other gaming modules and/or sub-modules from the computer program code to achieve compatibility. Accordingly, if it is determined (522) to remove one or more additional modules and/or sub-modules, one or more modules and/or sub-modules are removed (524) from the computer program code. Finally, the modified computer program code is executed (526) and the method 500 ends.

Figure 6:
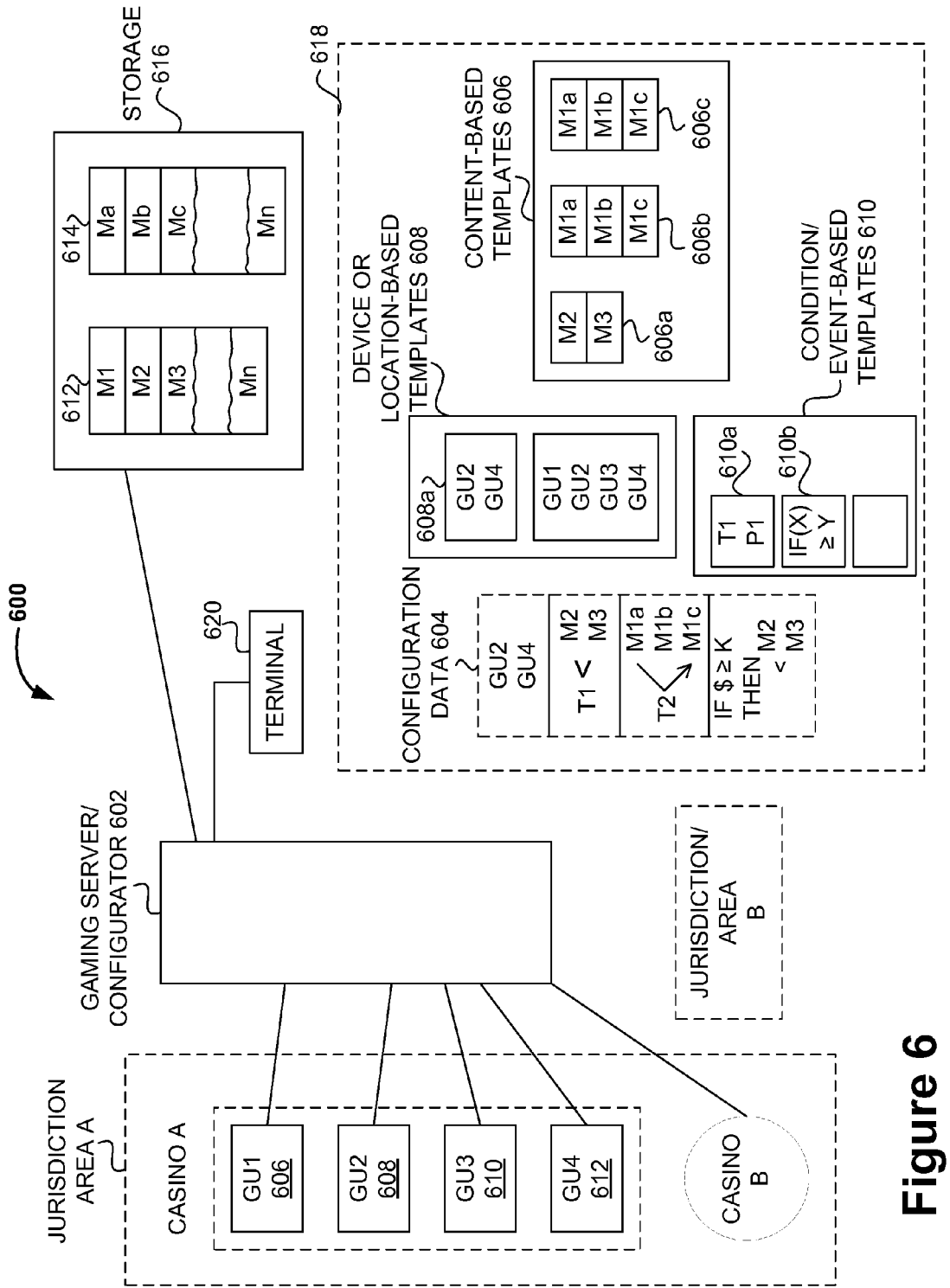
FIG. 6 depicts a gaming environment in accordance with one embodiment of the invention.

It will be appreciated that modular computer program code and modular modifiers can be used to effectively provide configuration data for configuring gaming machines in order to provide one or more game of chance in a gaming environment. To further elaborate, FIG. 6 depicts a gaming environment 600 in accordance with one embodiment of the invention. Referring to FIG. 6, a gaming server (or configurator) 602 effectively uses configuration data 604 to configure the various gaming machines 606, 608, 610 and 612 provided in the gaming environment 600. It will be appreciated that the configuration data 604 can be generated based on various gaming configuration templates provided for the gaming environment 600. The configuration templates can be organized into categories. Referring to FIG. 6, content-based templates 606, device or location-based templates 608 and condition/event-based templates 610 are depicted for the gaming environment 600 as exemplary template categories. The content-based templates 606 can effectively include and/or identify various gaming modules and sub-modules 612, as well as pluggable modular and sub-modular gaming modifiers 614 stored in the storage 616.

Referring to FIG. 6, a content-based template 606a can, for example, include and/or identify gaming modules M2 and M3 for a game of chance. In other words, the content-based template 606 can be used to configure the gaming machines 606, 608, 610 and 612 with the content of the gaming modules M2 and M3. Another content-based template 606b can, for example, include and/or identify the gaming sub-modules $M1_a$ and $M1_b$ and the modular gaming modifier Mc as the content for configuring one or more gaming machines in the gaming environment 600. It will be appreciated that the device/location-based template 608 can effectively identify one or more devices (e.g., gaming machines) to be configured using one or more templates (e.g., content-based templates 606). For example, device/location-based template 608a which effectively identify gaming machines 608 and 612 can be combined with the content-based template 606a in order to configure the gaming machines 608 and 612 with the content of the gaming modules M2 and M3. Similarly, another device/location-based template (not shown) can, for example, identify the entire casino B or jurisdiction area A for configuration. As another category of templates, the condition/event-based templates 610 can, for example, identify particular time T1 and/or time periods P1 in a template 610a or express a condition and/or a rule in a template 610b. It should be noted that various configuration templates can be combined to effectively generate configuration data for configuring various devices of the gaming machine 600. In other words, the configuration data 604 can be comprised of the combination of various configuration templates. By way of example, template 608a can be selected to effectively identify gaming machines 608 and 612 for configuration. In addition, content-based templates 606a and 606c can be used with one or more condition/event-based templates 610 to, for example, to express that the content of modules M2 and M3 is to be configured at time T1 and the content provided in template 606c (M1a, M1b and M1c) to be configured at time T2, and so on. The configuration data 604 can also provide conditions and rules that can, for example, state that if the revenue generated within a certain amount of time is greater than a certain value then other contents (M2, M5) should be used to configure the gaming machines 608 and 612. Those skilled in the art will appreciate that a monitor or terminal 620 can allow a person (e.g., a system administrator) to define and store various configuration templates 606, 608 and 610. The terminal 620 can also be used to retrieve, select and/or view the configuration templates in order to generate configuration data based on one or more configuration templates. The configuration data can be subsequently used to configure one or more devices (e.g., gaming machines 606, 608, 610 and 612) in the gaming environment 600.

Those skilled in the art will appreciate that the occurrence of an event or condition can effectively cause configuring one or more devices in the gaming environment 600. In other words, the occurrence of an event or condition can cause configuring one or more gaming devices based on one or more configuration templates.

Figure 7:
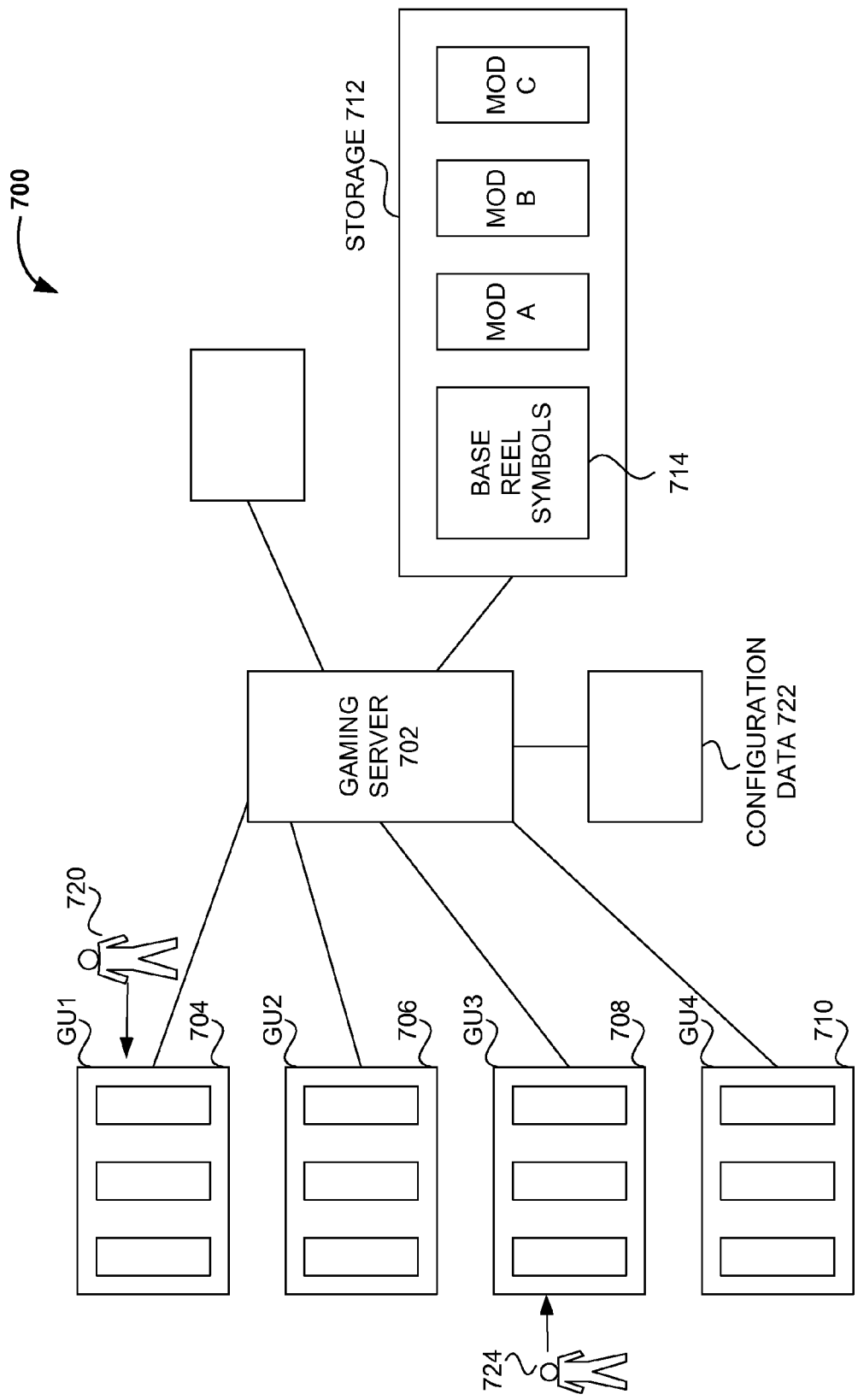
FIG. 7 depicts a gaming environment in accordance with another embodiment of the invention.

To further elaborate, FIG. 7 depicts a gaming environment 700 in accordance with another embodiment of the invention. Referring to FIG. 7, the gaming server 702 can configure gaming machines 704, 706, 708 and 710 using modular gaming data stored in the storage 712. Initially, the gaming machines can, for example, be configured to provide a reel-based game with a set of default (or base) reel symbols. The base reel symbols 714 stored in storage 712 can, for example, be made directly accessible to the gaming server 702. Additionally, pluggable modular and/or sub-modular gaming modifiers (MODa, MODb and MODc) stored in the storage 712 can be obtained by the gaming server 702. As noted above, the gaming modifiers can be used to effectively replace and/or enhance the base reel symbols 714. Such modification and/or enhancement can, for example, be initiated as a result of an event or a request initiated by a user. Referring to FIG. 7, a player 720 may be identified via a player tracking device or similar mechanisms. The player 720 can effectively cause the gaming server 702 to configure the gaming machine 720 with one or more gaming modifiers MODa, MODb and MODc in order to replace or enhance the default (or base) symbols for the reel-based game presented on the gaming machine 724. As such, when the player 720 is identified on any of the gaming machines 704, 706, 708 and 710, the gaming server 702 can initiate downloading of one or more gaming modifiers A, B and C for a particular gaming machine. It should be noted that the gaming server 702 can also effectively schedule the downloading of the gaming modifiers based on configuration data 722. By way of example, the gaming server 702 can be effectively scheduled to download the gaming modifiers during a particular time period (e.g., between 7-11 pm) on one or more gaming machines. However, it is possible to allow a player 724 to effectively overwrite the scheduled downloads so that the base reel symbols 714 and/or a particular set of symbols preferred by player 724 is caused to be downloaded by the server 702 to the gaming machine 708.

Figure 8:
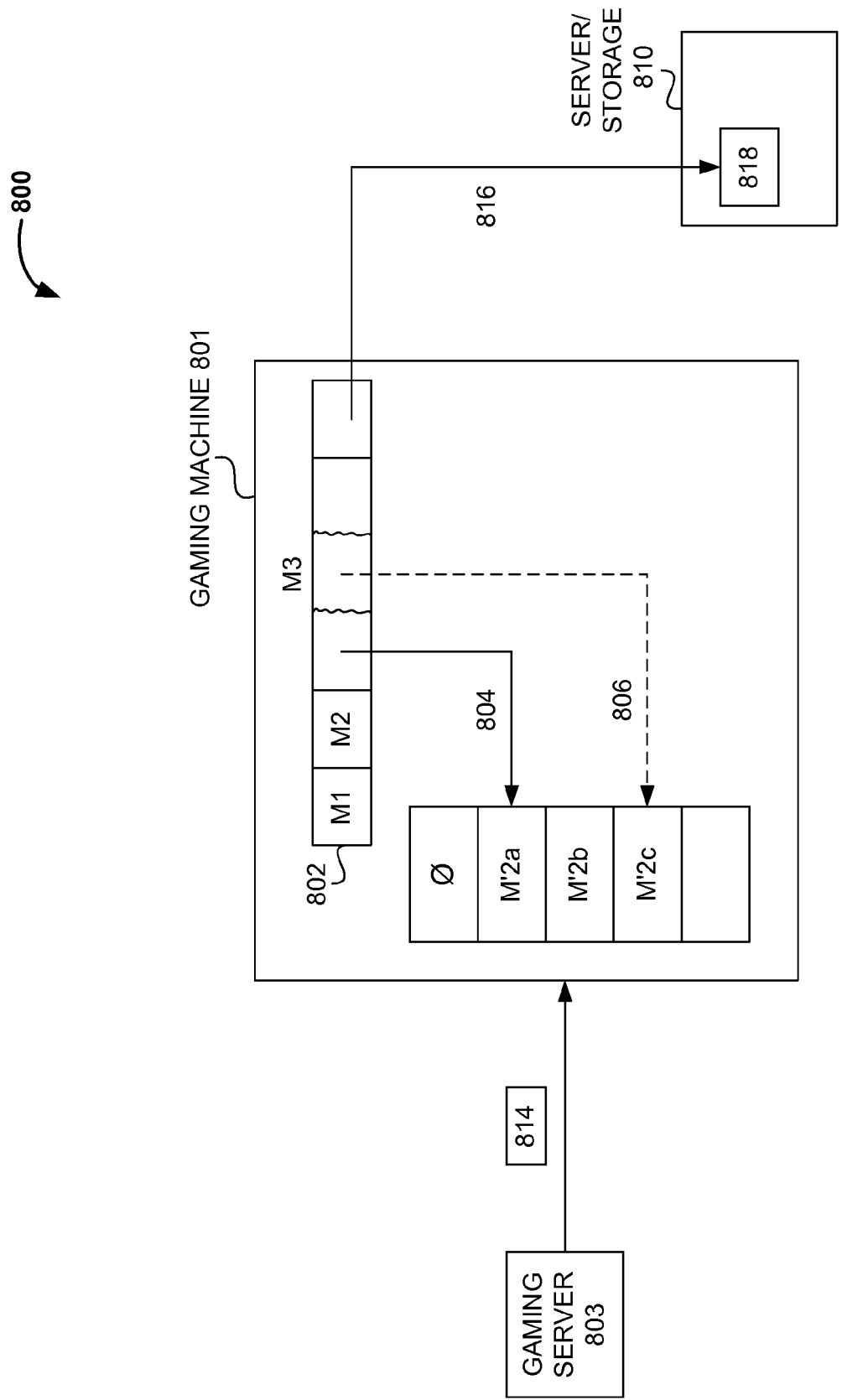
FIG. 8 depicts a gaming environment in accordance with another embodiment of the invention.

Those skilled in the art will appreciate that various techniques and mechanisms can be used to effectively download gaming modules and modifiers into a gaming machine. To further elaborate, FIG. 8 depicts a gaming environment 800 in accordance with another embodiment of the invention. Referring to FIG. 8, a gaming machine 801 can effectively store computer program code 802 for a game of chance in memory. The gaming server 803 can effectively change the configuration of the computer program code 802 by using software hooks (or "hooks") provided for the computer program code 802. By way of example, one or more references 804 and 806 associated with the gaming module M3 can be set to the content for sub-modular gaming modifiers M'2a and M'2c to replace and/or enhance the module M2. As such, the gaming machine 801 can use one or more modifiers if and when they are made available instead of using the base or default modules. It should be noted that the gaming server 803 can be implemented to provide the gaming machine 801 with the location (e.g., address) where gaming modifiers can be obtained. By way of example, where different graphics (e.g., base reel symbols) are to be used and security is not a major concern, various alternative reel symbols can be stored in another server/storage 810 and made available to the gaming machine 801. As such, the gaming server 803 can, for example set a reference 816 to gaming modifier 818 stored in the server/storage 810. As another example, the gaming server 803 can provide the gaming machine 801 with instructions 814 for loading and/or unloading various gaming modules and modifiers from its internal memory and/or server/storage 810.

Those skilled in the art will also appreciate using object oriented programming concepts downloads where a parent (base) game code objects could be modified through the use of child object inheritance. This modification can, for example, occur when certain default features or characteristics may not be optimal for a particular player. When the player is identified through a player tracking card or other means, the identifying event can prompt the download of one or more child code objects to create the optimal gaming experience for a particular player by modifying one or more properties or characteristics of the game or other information presented. The properties or characteristics can, for example, include: theme background, personalities, advertisements, marketing, Color, and sound. Those skilled in the art a gaming modular modifier can, for example, be provided as a child object that includes script objects (e.g., Macromedia Flash object codes). As such, script objects can be designated to replace and/or enhance base (or default) functionality. Base (parent or default) game code can, for example, provide coded "hooks" designed to use child script objects when present. When a child script object is not present, the game code defaults to the base (or default) game functionality. Designated Memory locations in a gaming machine can store child script objects for use by base game code.

In addition, a Code Management Interface (CMI) can facilitate a method for identifying compatibility so that, for example, such that a known set of gaming machine components can be acknowledged prior to the authorization of downloading a child script object. The CMI can also facilitate providing a set of configurable parameters allowing a user to define what child script objects get downloaded. These parameters can, for example, be associated with when objects get downloaded, where the objects get downloaded, and how long the objects are used. In one embodiment, start and stop dates are used so that an object cannot be used prior to the start date or after the stop date. In another embodiment, a naming scheme determines what object should be used on occasions when more than one objects exist on a gaming machine. In yet another embodiment, child script objects are assigned a priority so that when two child objects exist the base game code will look at the priority level to determine which object to use. The CMI can also facilitate providing meters used to track play on gaming machines. In one embodiment a meter would be defined to track the number of times a child script object is executed to provide casino operators a basis for remuneration when child code scripts are used for promotions and/or marketing of third party products. The child code scripts could be designed to be triggered by an event. The event can, for example, be related to advertising or marketing. In addition, the event could prompt an interactive communication with a player to further facilitate game customization for a particular player.

Those skilled in the art will know that a CMI can include a database as a repository of all code objects with version controls and inventory management of active and idle licenses. The repository functions can, for example, include an inventory management that provides reports detailing the inventory of all code objects for versioning, quantity, start/stop dates, naming and compatibility conventions, etc. The CMI can facilitate versioning and licensing code by tracking code objects based on, for example, version numbers, license numbers, and compatibility. Reports and alerts can also be provided, for example, to identify incompatibility, expiration of license and so on. As noted above, security can be provided by mutual authentication between parent code objects and child code objects. Similarly, compatibility can be determined. As such, if a child code object is not compatible with a particular parent object the user should be prompted prior to download.

The CMI can also include an administrative interface providing various functions including the following: the ability to schedule downloads to accommodate operational and systems constraints, operational messages that can, for example, be delivered by a casino at scheduled intervals, the ability to trigger a download based on an event such as a promotional offering or player specific event to deliver code objects for rewards, complementary offerings and/or promotional function downloads, the ability to prioritize and/or override downloads that may conflict with other scheduled downloads or interfere with another download (e.g., large download). The administrative interface can also facilitate downloads associated with a player known to a casino, or based on demographic characteristics for newly carded players. In one embodiment, a personal digital assistant can be downloaded to a gaming machine when a player is identified. In addition to general functionalities (e.g., scheduling tasks), the personal digital assistant can, for example, provide contact information for key property personnel to established customer service relationships for that particular player, stored game characteristics, etc.

It should be noted that invention can utilize a traditional polled gaming machine as well as a Server Based Gaming Machine where base game, secondary game and peripheral code is downloaded to achieve functionality. A gaming machine could also include a mobile gaming device where games are loaded into a memory or thin client code is used to facilitate game play from the host. Other possible variations of a gaming machine could include but should not be limited to a group gaming device where any number of players may be playing using a number of different interface devices or an in-room gaming device where players can access game play through a display (e.g., television monitor). Downloads can be made to a secondary device (e.g., a player tracking unit). The secondary device can also be a device communicating with a gaming machine. In addition, a tertiary device could be included where the tertiary device is a component of the secondary device. In the case of a player tracking unit the tertiary device can, for example, be a card reader/hybrid card reader, display panel, ticket printer, audio system, etc. In one embodiment, a player tracking unit can be used as a transport mechanism to facilitate required flash code updates. The player tracking unit can utilize a defined memory location to be used as a queue for tertiary device updates.

Downloads can be made via an Intranet or Internet using various technologies including, for example, HTML, Active X, Java, Flash, etc. This allows displaying information and downloads via websites, dynamic feeds based on player preference, kiosk etc. Web-based downloads could also be used to facilitate the synchronization of game code across multiple properties. In addition to downloading, Macromedia Flash objects and similar technologies can be stored and run from a server location. The ability to do so can, for example, be defined by certain security parameters set to allow cross-domain scripting. That is, one can control whether the current code object can use content that is defined by a particular URL. The security definitions allow specifying which remote objects can be used based on, for example, the jurisdiction where a machine is located.

Benefits of the invention include reduced network traffic due to the fact that child objects are likely to be smaller than the parent objects. The invention also allows providing additional information and the ability to modify them as needed. By way of example, child objects could be developed as a partnership with a vendor/advertiser to provide product branding while game play is occurring.

Figure 9:
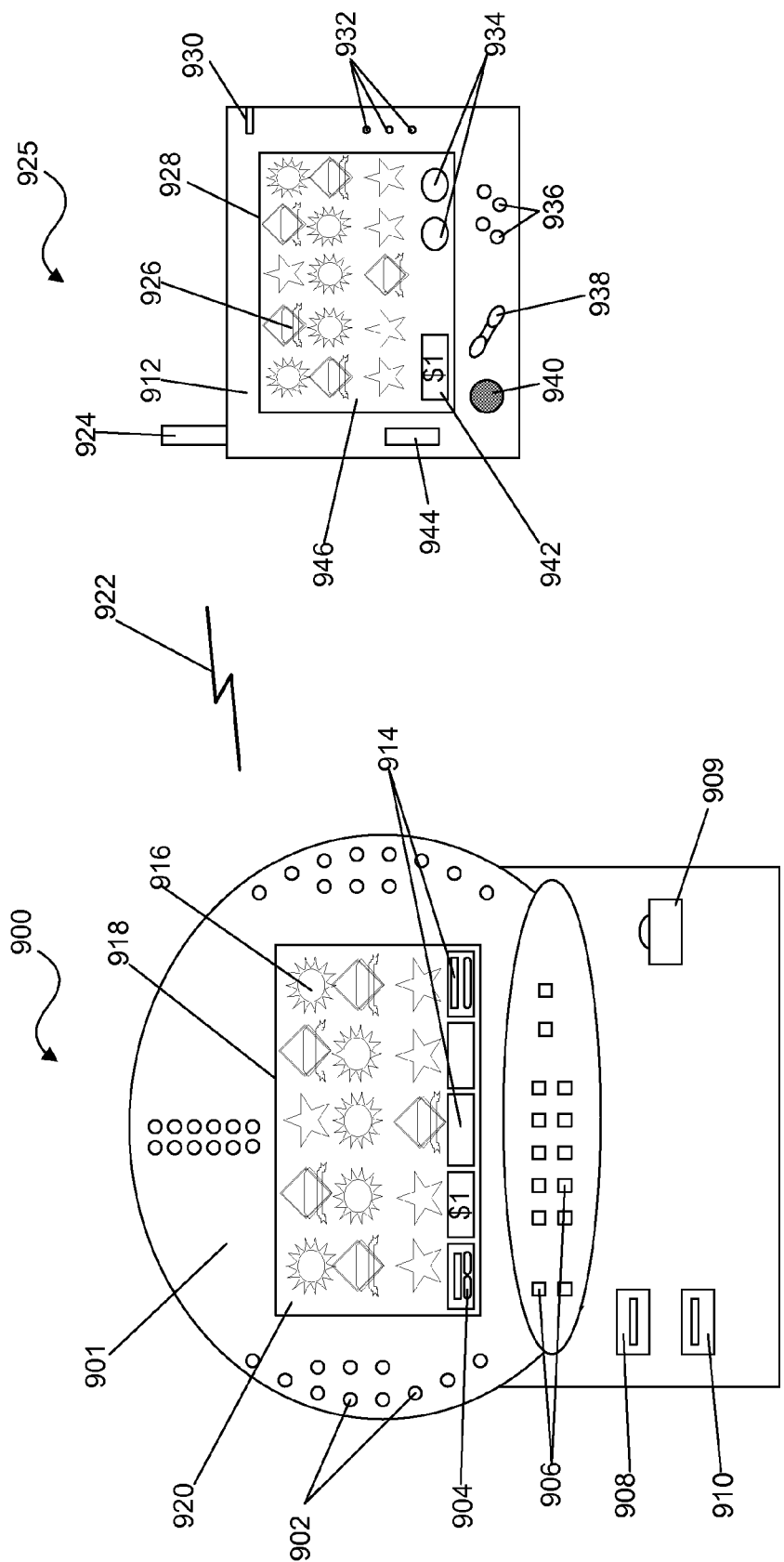
FIG. 9 is block diagram of a gaming machine in communication with a wireless game player.

It should be noted that a wireless gaming device can be used to play a game in a gaming environment that uses the authentication techniques of the invention. FIG. 9 is block diagram of a gaming machine 900 in communication with a wireless game player 925. The wireless game player 925 is used as a remote extension to extend the game playing capabilities of gaming machine 900. Game outcomes for games of chance generated using licensed and regulated gaming software executed on the gaming machine 900 may be presented on the wireless game player 925 at remote locations from the gaming machine 900. Thus, a game generated on a gaming machine 900 may be presented on a display 918 located on the main cabinet 901 of the gaming machine and played using input mechanisms located on the main cabinet of the gaming machine. In addition, the game generated on the gaming machine may be presented on a display 928 located on a wireless game player in communication with the gaming machine and played with input mechanisms located on the wireless game player.

As an example, a game 916 may be presented on a display 918 located on gaming machine 900. The game 916 may be played using input mechanisms, such as input buttons 906 or touch screen interface buttons 904. The touch screen interface buttons 904 are activated using a touch screen 720 located over the display 918 of the gaming machine 900. Further, a game 926 may be presented on display 928 located on the wireless game player 925. The game 926 may be played using input mechanisms located on the wireless game player 925, such as 938 and 936 or touch screen interface buttons 934. The touch screen interface buttons 934 are activated using the touch screen 946 located over the display 928.

The game logic for a game presented on display 918 or display 928 is stored within the main cabinet 901 of the gaming machine 900. The game logic, which is typically regulated gaming software, is executed by a master gaming controller located within the main cabinet 901 of the gaming machine 900. A particular game executed by the master gaming controller may be presented on display 918 or, when the wireless game player 925 is activated, on display 928. When the same game is presented on display 918 or on display 928, the graphical presentations of the game may vary between the displays because of hardware differences. For instance, display 918 may by larger than display 928 allowing for higher resolution graphical output on display 918 as compared to display 928.

While playing a game 926 on the portable wireless game player 925, a player may move throughout the areas of a casino where wireless game play is enabled. For instance, a player may be able to play the game 926 with the wireless game player 925 in a restaurant, a keno parlor or a sports book. The player's position does not have to remain static while playing the game 926 on the wireless game player 925 and the player may be actively moving while games are played on the wireless game player 925.

When a game is played on the wireless game player of the present invention, such as 925, all random number generation (RNG) events, game outcomes, meter information, game related information, and all cash transactions are generated and maintained in the licensed (controlled) gaming machine (e.g. 900), and not the wireless game device. Thus, the wireless game player 925 may be considered a remote extension of the gaming machine's 900 display and input mechanisms. With a gaming machine with a remote extension, the gaming machine may operate in both a local mode and a remote mode. In the local operational mode, game play is presented using the display and input mechanisms located on the gaming machine. In the remote operational model, game play is presented using the display and input mechanisms located on the wireless game player. These two operational modes are described as follows.

During local game play on a gaming machine, a player may input money or indicia of credit into the gaming machine, indicate a wager amount, and initiate a game play. For example, to play the slot game 916 on gaming machine 900, a player may deposit money or indicia of credit using the bill validator 908, the card reader 910 or the coin acceptor 909. Status information 914 for the game, such as a game denomination and available credits may be displayed on display 918. Next, using input buttons 906 and touch screen interface buttons 904, the player may make a wager and initiate the game. The gaming machine determines a game outcome and then presents the game outcome to player on the display 918. For instance, after a slot game has been initiated, the video gaming machine calculates the final position of the reels (e.g. the game outcome), the reels on display 918 spin and then stop at pre-determined position. Based on the pre-determined outcome calculated by the master gaming controller, an award may be presented to the player. As another example, after a card game has been initiated, the video gaming machine 900 calculates a sequence of cards to be dealt to the player and card hands are dealt on the display 918. During the card game play, the player may use input mechanisms on the gaming machine 900 to hold or discard cards. After the card game is complete, an award may be presented to the game player.

The games presented on the gaming machine 900 may be enhanced by additional features. Light patterns, such as from lights 902, and sounds may be generated on the gaming machine 900 to enhance the game outcome presentation. In addition, during certain game events, a bonus game may be presented to the game player.

During remote game play on a gaming machine using a wireless game player such as 925, a player may input money or indicia of credit into the gaming machine, activate a wireless game player, indicate a wager amount on the wireless game player and initiate a game play on the wireless game player. For example, to play the slot game 926 on gaming machine 900 using the wireless game player 925, a wireless game play session is requested by the player. A wireless game play session may include one or more game plays on a wireless game player 925 connected to the gaming machine 900 via a wireless communication link 922. The wireless game play session request by the player may be made using an input mechanisms located on the gaming machine.

Prior to beginning, the wireless game play session, a player may be required to deposit money or indicia of credit to in the gaming machine in communication with the wireless game player. The deposited credits may be used during the wireless game play session. For instance, using the bill validator 908, the card reader 910 or the coin acceptor 909 located on the gaming machine 900, the player may provide an initial amount of credits to be used for a wireless game play session using the wireless game player 925. During game play on the wireless game player, a player wagers a certain amount of credits per game. Depending on the outcome of a particular game, the number of credits available for game play may be decreased or may be increased.

After a game player has used all of their credits during a wireless game play session and the player desires to continue the wireless game play session, the player may be required to return to the gaming machine to add additional credits. In other embodiments (See FIG. 11), a card reader or other input device may be attached to the wireless game player 925 and used to add credits to the gaming machine 900. For instance, a player may be able to enter a credit card number or debit card number and transfer funds to the gaming machine to be used as game credits via a touch screen interface on the wireless game player 925. Further, the wireless game player may include a card reader for scanning a magnetic strip on the debit card or credit card.

After establishing game credits on the gaming machine, the wireless game player 925 is activated. In some embodiments, authentication and verification of the user of the wireless game player is performed. For example, to enforce age restrictions imposed by a jurisdiction, the user may be verified and authenticated to use the game player. The wireless game player may have a biometric sensor (not shown) such as a fingerprint sensor. As part of the authentication process, the player may be asked to place their finger on the sensor located on located on the wireless game player. The fingerprint image is sent back to the controller in the machine for comparison. As another example, the wireless game player may include a smart-card reader that reads biometric smart cards (cards having a built-in fingerprint sensor). The smart card has all the personal information of the casino guest. Thus, the authentication could occur directly at the wireless game player. A description of a finger print reader as an identification device is provided in U.S. Pat. No. 6,488,585, which is incorporated herein in its entirety and for all purposes. Other types of verification methods such as a PIN number or a password may be used separately or in combination with biometric identification methods. Other biometric identification methods that may be used with the present invention include but are not limited to feature identification using a camera, retinal pattern identification using a retinal scanner, voice pattern identification input using a microphone and hand-writing recognition using a hand writing input pad.

For security, the wireless game player has an encrypted serial number (code), which is used to verify and authenticate the wireless game player. For additional security, an electronic key may be used with the device. With an electronic key system, the wireless game player device cannot be activated until the key is inserted into a receptacle on the game player. In addition, the wireless game player may have a small GPS (Global Positioning System) device to verify location of the device. Position verification may be used to insure the wireless game player is used only in legal gaming areas of the casino and to track lost or stolen devices. When the gaming machine detects that the wireless game player is in a restricted area, it may discontinue communications with the wireless game player. Further, the wireless game player may have an RF capacitive device built into the wireless game player. RF capacitive devices are often used in retail stores to prevent theft. When the wireless game player is passed through a protected doorway, an alarm may be sounded even when the power is off to the wireless game player. Other security features may be used on the wireless game player and are not limited to electronic keys, GPS sensors or RF capacitive devices described above. Verification and authentication may be required to start every wireless game play session. Further, there may be a non-play time limit. Once this time is exceeded, a verification and authentication cycle or process must be performed. The verification and authentication cycle may be performed for the player and the wireless game player, for only the player or for only the wireless game player. As another example, authentication and verification may be required after a certain number of games played on the gaming device or may be even be required at random intervals. When verification and authentication requirements are not satisfied during a wireless game play session, the game play session will typically be terminated.

In one embodiment, after the wireless game player is activated 925, the input mechanisms, such as the touch screen 920 and the input buttons 906, built into the gaming machine 900 are deactivated and a wireless game play session may begin. The display 918 on the gaming machine 901 may display an "out of order" message, an "operator" message or the display 918 may be blank to indicate the gaming machine is unavailable for game play. During remote game play on the wireless game player 925, gaming information necessary to present the game on the wireless game player, such as a graphical presentation of game outcome and meter information, is generated on the gaming machine 900 are transmitted to the wireless game player via wireless communication 922. The mathematical methods used to generate the game outcomes remain on the gaming machine 900. Further, gaming information required by the gaming machine 900 to the determine the game outcome, such as signals from input mechanisms located on the wireless game player, are transmitted from the wireless game player 925 to the gaming machine 900 via wireless communication 922.

During game play on the wireless game player 925, status information 942 for the game 926, such as a game denomination and available credits may be displayed on display 928. The status information 942 and the game 926 displayed on the wireless game player 925 may appear similar to what is displayed on the gaming machine 901 but is not necessarily identical to what is displayed on the gaming machine 900. Next, using input buttons, such 934, 936 and 938, the player may make a wager and initiate the game. In one embodiment of the present invention, the touch screen interface buttons 934 may be based on a web-browser interface.

After a game has been initiated on the wireless game player 925, via antenna 924, a wireless communication 922 containing the wager and initiate game inputs is sent to the gaming machine 900. In response, to the wager and the initialization of a game, the gaming machine 900 generates a game outcome including an award and possibly a bonus game. Instructions for displaying the game outcome and bonus game are sent in one or more wireless communications 922 to the wireless game player 925. The one or more wireless communications may be a series of information packets. The format of the information packets will vary according to the wireless communication standard used. Details of a wireless network for providing wireless communications is described with respect to FIG. 12. To illustrate the play of a particular game, a slot game and a card game are described. However, the present invention is not limited to these games as nearly any type of game that can be played on a video gaming machine may also be played on the wireless game player 925. When a slot game 926 has been initiated on the wireless game player 925, the gaming machine 900 calculates the final position of the reels (e.g., the game outcome). The gaming machine may send instruction to the wireless game player to spin the reels on display 928 spin and then stop the reels at a pre-determined position. Based on the final position of the reels calculated by the master gaming controller located on gaming machine 900, an award may be presented to the player. In addition, during certain game events, a bonus game may be presented to the game player as part of the slot game. As another example, after a card game has been initiated on the wireless game player 925, the video gaming machine 900 calculates a sequence of cards to be dealt. The gaming machine 900 sends wireless communications 922 to the wireless game player 925 indicating card hands to be dealt on the display 928. During the card game play, the player may use input mechanisms on the wireless game player 925 to hold or discard cards. After the card game is complete, an award may be presented to the game player. A bonus game may also be incorporated into the card game.

When a customer does not wish to use the wireless game player 925 anymore, the customer can terminate the wireless game play session using the touch screen 946 and deactivate the wireless game player 925. As described above, the wireless game player 925 may automatically terminate a wireless game play session and deactivate itself after a period of inactivity. After roaming with the wireless game player 925, the customer may return to the gaming machine providing the wireless game play session and wish to resume play on the main display of the gaming machine. In this case, the customer may depress a "return" button on the wireless game player 925 and after a verification cycle the player can begin playing at the gaming machine again.

The games presented on the wireless game player 925 may be enhanced by additional features. For instance, light patterns and sounds from the audio output 940 may be generated to enhance the game outcome presentation and add excitement to the games played on the wireless game player 925. Further, the wireless game player may include an audio output interface for connecting headphones. As part of a game outcome presentation, sounds may be transmitted through the audio output interface to headphones worn by the game player.

Details of the wireless game player hardware are now described. The wireless game player 925 is generally a hand-held device. It consists of a housing 912, display 928, touch screen 946, switch panel 944, battery, wireless communication interface, and controller. In one embodiment of the present invention, a modified DT Research WebDT pad (DT Research, Inc., Milpitas, Calif.) is used as a wireless game player. However, the present invention is not limited to the DT research WebDT pad as other hand-held wireless devices such as personal digital assistants (PDA) may also be used.

In one embodiment, the wireless game player may be approximately 10.5×9.5×1.0 inches in size, weigh 3 pounds and use a 10.4 inch color LCD touch screen display. Typically, an 8 inch to 10.4 inch display provides a sufficient viewing area without reducing the size of the character fonts to a point where they are unreadable by most players. The touch screen (sensor) 746 is overlaid on the displayable surface of the LCD 928. Other display technologies can be used instead of LCD, plus some display technologies will incorporate a built-in touch screen (internal vs. external). To activate the touch screen 946, a stylus 930 may be used, but most people will use their fingers.

Audio is available via the small built-in speaker 940 or an external headset. Lighting schemes, such as arrays of LEDs, may be added to the wireless game player 925 to provide visual effects and to communicate status information to a game player. Status information, such as a battery level and connection status, may be provided by the status lights 932. The layout and number of the input buttons, including 938 and 936, is variable. In FIG. 9, the configuration of the input buttons on the gaming machine 900 and wireless game player are different. In one embodiment of the present invention, the input buttons on the wireless game player 925 may be configured in a manner similar to input buttons located on the gaming machine. Further, other devices on the wireless game player, such as the audio output 940, the status lights 932, the antenna 924 and the on/off switch 944 may be located at other locations on the housing 912 depending on the design of the wireless game player.

In one embodiment, the battery will last five hours between charging. Charging of the wireless game player may be accomplished by setting the wireless game player in a special storage cradle. The cradles may be in the form of storage bins located in a special area, located at the gaming machine or built as holders located on a desk, counter or table. For instance, a storage cradle for charging the wireless game player may be located in a keno parlor, restaurant tables or sports book. When the wireless game player is placed in a storage cradle it may used while being charged.

The wireless game player 925 can, for example, use an IEEE 802.11b compliant wireless interface. It is a 2.4 Ghz Direct Sequence Spread Spectrum radio system. It has a range of up to 330 ft (inside) from any access point. The data rate is 11 Mbps. IEEE 802.11b is a commonly used radio standard. Other exemplary wireless standards that may be used include IEEE 802.11a, IEEE 802.11x, hyperlan/2, Bluetooth, IrDA, and HomeRF.

In the example above, local gaming and remote gaming on gaming machine 900 has been described in a mutually exclusive manner. Therefore, when local gaming is enabled, remote gaming is disabled and when remote gaming is enabled, local gaming is disabled. However, the present invention is not so limited. Gaming machines that support only remote gaming and not local gaming may be used with the present invention. These gaming machines (see FIG. 12) may be located away from the casino floor. Further, a gaming machine may support simultaneously a plurality of remote gaming devices for game play and not just a single remote gaming device. Finally, gaming machine may be used that simultaneously provide both remote game play and local game play. For instance, one game player may use a gaming machine for local play while another game player is using a wireless game player connected to the gaming machine to play remotely.

Figure 10:
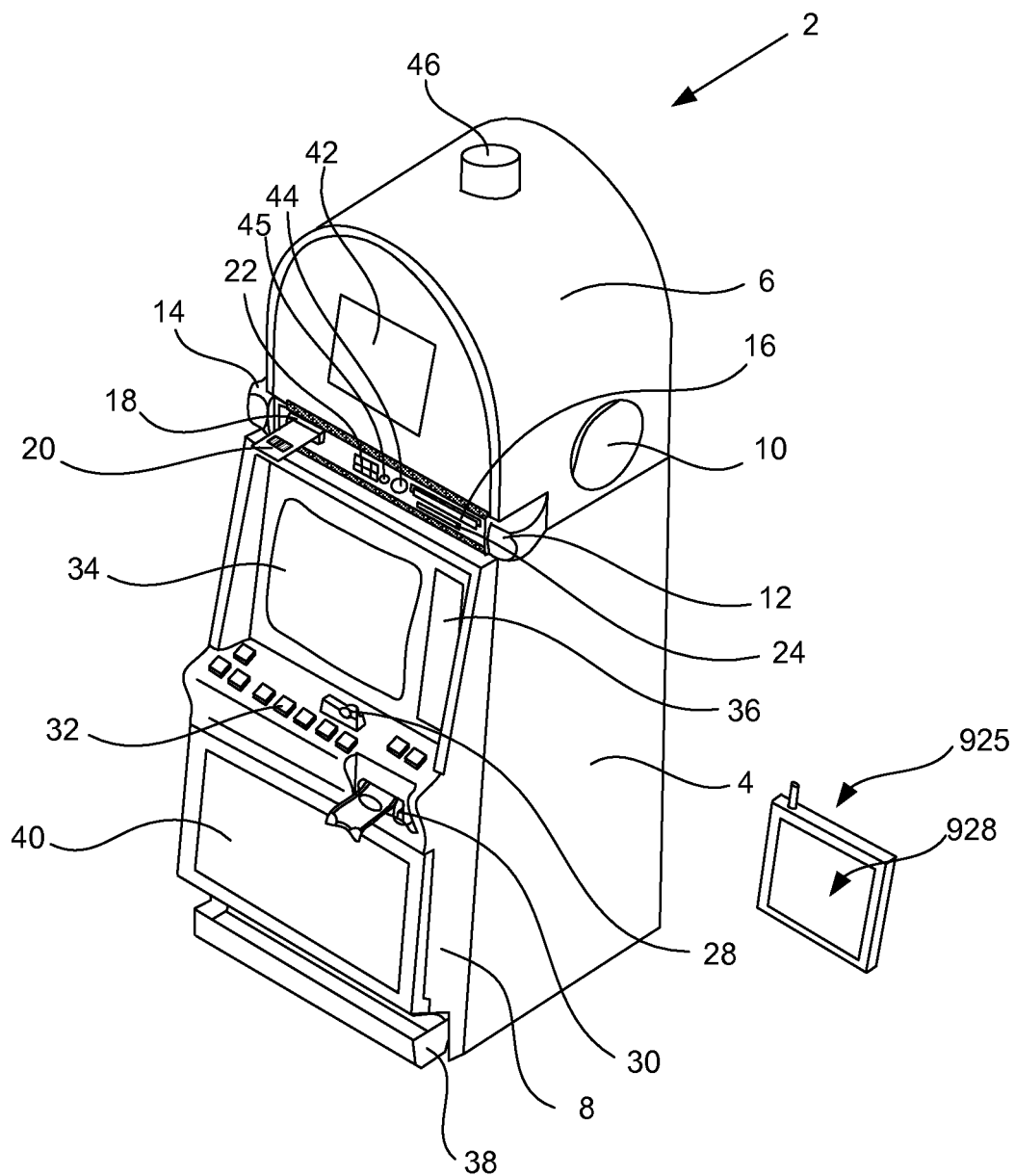
FIG. 10, another video gaming machine suitable for use with the present invention is shown.

In FIG. 10, another video gaming machine 2 suitable for use with the present invention is shown. Referring to FIG. 10, more details of a gaming machine as well as additional gaming services that may be provided with a gaming machine providing remote game play sessions are described. For instance, player tracking services may be provided on gaming machines of the present invention and player tracking points may be accumulated during a wireless game play session. Further, using a player tracking device located on a gaming machine, a player may be able to request a wireless game player for use in a wireless game play session.

Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The main display monitor 34 will typically be a cathode ray tube, high resolution flat-panel LCD, or other conventional electronically controlled video monitor. The gaming machine 2 includes a top box 6, which sits on top of the main cabinet 4. A second display monitor 42 may be provided in the top box. The second display monitor may also be a cathode ray tube, high resolution flat-panel LCD or other conventional electronically controlled video monitor. In addition, the gaming machine 2 is designed to communicate to the wireless game player 925 with display 928. The wireless game player 925 effectively provides a remote extension to gaming machine 2.

Figure 11:
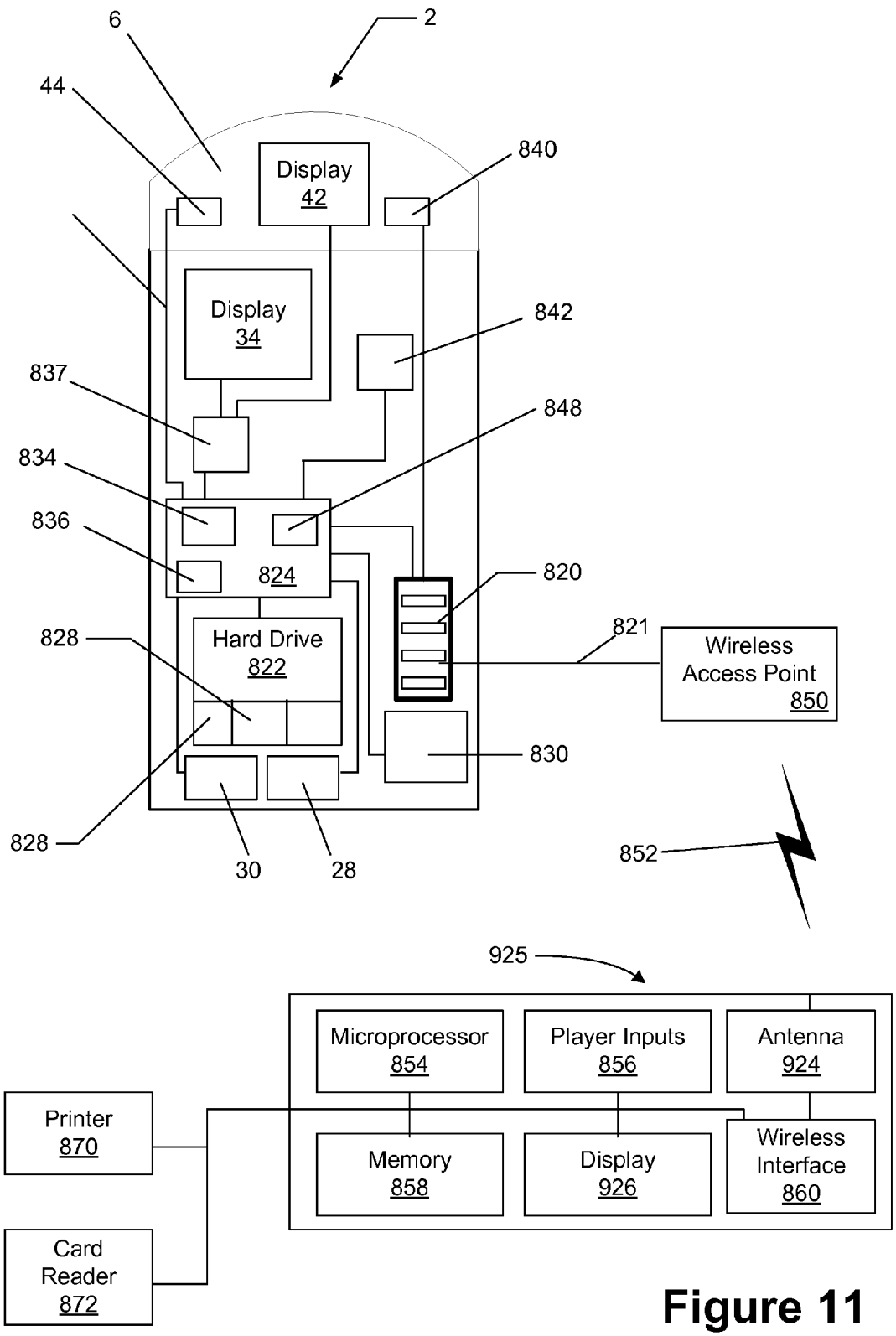
FIG. 11 is a block diagram of the internal components of a gaming machine and a wireless game player.

Typically, after a player has initiated a game on the gaming machine, one purpose of the main display monitor 34, the second display monitor 42 or the remote display 928 is the visual display of a game outcome presentation, including bonus games, controlled by a master gaming controller 924 (FIG. 11). Also, the main display monitor 34, the second display monitor 42 and the remote display 928 may also be utilized to display entertainment content independent of the game outcome presentation. For example, broadcast events, including television programming, may be provided to the main display monitor 34, the secondary display monitor 42 or the remote display 928. The broadcasts events may be sent to the gaming machine 2 via a cable link or other suitable link from outside of the gaming machine. All or some subset of the programming provided by a television broadcaster may be displayed as entertainment content on one or more of the video displays.

Television programming content of particular interest to casino operators and game players may include, for example, sporting events, talk shows, game shows, soap operas, advertisements, situation comedies, etc. In addition, broadcasts of competitive events on which the player can wager may be displayed. For example, dog racing or horse racing events may be displayed as content on the remote display 928. In such events, typically, there is a rather long down time between races. During this period, the player may play the wireless game player 925 connected to the gaming machine. Also, the television programming entertainment content may be displayed while a player is engaged in playing a game on the wireless game player 925 or between games. Similarly, the entertainment content may include information available on the Internet, including the World Wide Web, for more technologically sophisticated players.

Returning to the gaming machine in FIG. 10, the information panel 36 may be a back-lit, silk screened glass panel with lettering to indicate general game information including, for example, the number of coins played. The bill validator 30, player-input switches 32, video display monitor 34, and information panel are devices used to play a game on the game machine 2 including the wireless game player 925. The devices are controlled by a master gaming controller (see FIG. 11), housed inside the main cabinet 4 of the machine 2. Many possible games, including traditional mechanical slot games, video slot games, video poker, video pachinko, multiple hand poker games, video pai-gow poker, video black jack, video keno, video bingo, video roulette, video craps, video card games and general games of chance, may be provided with gaming machines of this invention. These games may be played using the wireless game player 925.

General games of chance refer to games where a player makes a wager on an outcome of the game. The outcome of the game of chance may be affected by one or more decisions may be the player. For instance, in a video card game, the player may hold or discard cards which affects the outcome of the game.

The top box 6 houses a number of devices, which may be used to add features to a game being played on the gaming machine 2, including speakers 10, 12, 14, a ticket printer 18 which may print bar-coded tickets 20, a key pad 22, a florescent display 16, a camera 45, microphone 44 and a card reader 24 for entering a magnetic striped cards. The speakers may be used to project sound effects as part of a game outcome presentation. The keypad 22, the florescent display 16 and the card reader 24 may be used for to enter and display player tracking information. As another example, the player may enter playing tracking information and identification information using the card reader 24 and the main video display 34 where the main video display may be used as a touch screen to enter information. Player tracking information may be entered into the gaming machine before a player initiates a game on the gaming machine. Typically, the player's incentive to enter player tracking information into the gaming machine 2 is potential rewards related to the amount of a player's game play.

The top box also includes a candle 46. The candle is a light that may be activated by the master gaming controller on the gaming machine. In one embodiment, an antenna (not shown) may be installed in the candle. The antenna may be used to provide wireless game play sessions to one or more wireless game players in communication with the gaming machine 2 via the antenna.

In addition to enabling player tracking services, the key pad 22, the florescent display 16 and the card reader 24 may be used to enter identification information that enables a player to access entertainment content or receive personal messages on the gaming machine independent of a game play and game outcome presentation on the gaming machine 2. For example, a player may enter a personal identification number into the gaming machine 2 using the key pad 22 that allows the player to receive entertainment content such as viewing a movie or a broadcast event. As another example, after entering the personal identification number, the player may be allowed to receive a personal message indicating a table is ready at a restaurant in the casino or to receive a personal message containing information on a sporting event such as a score of personal interest to the player utilizing the gaming machine.

In one embodiment of the present invention, the player tracking services and related gaming service described above may be provided via a touch screen interface on the wireless game player 925. For instance, the wireless game player 925 may include a card reader for reading a player tracking card and player tracking identification information may be provided via a touch screen interface on the wireless game player. Further, the player may be able to access player tracking information using the wireless game player 925.

In addition to the devices described above, the top box 6 may contain different or additional devices than shown in the FIG. 10. For example, the top box may contain a bonus wheel or a back-lit silk screened panel which may be used to add bonus features to the game being played on the gaming machine. During a game, these devices are controlled and powered, in part, by circuitry (not shown) housed within the main cabinet 4 of the machine 2. Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video, while others are designed for bar tables and have displays that face upwards. As another example, a game may be generated in on a host computer and may be displayed on a remote terminal or a remote computer. The remote computer may be connected to the host computer via a network of some type such as the Internet. Those of skill in the art will understand that the present invention, as described below, can be deployed on most any gaming machine now available or hereafter developed.

Returning to the example of FIG. 10, when a user selects a gaming machine 2, he or she inserts cash through the coin acceptor 28 or bill validator 30. Additionally, the bill validator may accept a printed ticket voucher which may be accepted by the bill validator 30 as an indicia of credit. Once cash has been accepted by the gaming machine, it may be used to play a game on the gaming machine. Typically, the player may use all or part of the cash entered into the gaming machine to make a wager on a game play. Depending on the amount of the wager on a game or for a fee, a player may be able to access various entertainment content sources for a length of time. For example, a wager on a game above a certain threshold amount may enable a player to watch a broadcast event or to access the World Wide Web for up to 5 minutes after each wager on the gaming machine 2. In addition, cash or indicia of credit entered into the gaming machine may be used to purchase entertainment content independent of a wager made on a game on the gaming machine. For example, for a 10 dollar fee, a player may view a movie on the gaming machine. While watching the movie on the gaming machine, the player may play games on the gaming machine 2 or the wireless game player 925 or just watch the movie.

During the course of a game, a player may be required to make a number of decisions which affect the outcome of the game. For example, a player may vary his or her wager, select a prize, or make game-time decisions which affect the game play. These choices may be selected using the player-input switches 32, the main video display screen 34 or using some other device which enables a player to input information into the gaming machine including a key pad, a touch screen, a mouse, a joy stick, a microphone and a track ball.

When a game is not being played on the gaming machine or during particular game operational modes, the player may select an entertainment content source using the above mentioned inputs where the entertainment content is independent of a game being played on the gaming machine. The entertainment content source may include, for instance, a CD player, an FM/AM tuner, a VHS player, a DVD player, a TV tuner, a musical jukebox, a video jukebox, a computer, a server and a media software application. It will be appreciated, however, that any information source may be utilized. Entertainment content from these sources may be selected and displayed on the wireless game player 925. For instance, a player may listen to music from the FM/AM tuner via headphones connected to the wireless game player.

Before playing a game, a player may select the video jukebox, which may contain a DVD player loaded with many DVDs, as the entertainment content source and preview a movie on at least one of the display screens on the gaming machine 2. The DVDs may be stored on the gaming machine 2 or in a central location separate from the gaming machine. The visual display of the output from the video jukebox may be viewed by the player on the main video display screen 34, the secondary video display screen 42 or the remote display 928. The sound for the movie may be projected by the speakers 10, 12 and 14 on the gaming machine or a player may listen to the movie through headphones. As described above, the wireless game player 925 may include an interface for audio output such as a headphone jack.

The game player may also use the player input switches 32, keypad 22, and other input devices to control a feature of the entertainment content. For example, when the entertainment content is a movie, the player input switches 32 and keypad may be operated to fast forward, stop or pause the movie. When the entertainment content is accessing the World Wide Web through a web-browser, the player input switches 32 and keypad may be used to operate the web-browser. Input switches, as described with respect to FIG. 9, on the wireless game player 925 may also be used to control these functions.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, throbbing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. When a player is using the wireless game player 925, credits available during the wireless game play session are stored on the gaming machine. To redeem credits, for instance to receive a printed ticket voucher, the player may have to return to the gaming machine 900 or a printing station supporting communications with the wireless game player 925. In some embodiments of the present invention, a player may be able to electronically transfer credits to a remote account accessible by the player.

FIG. 11 is a block diagram of the internal components of a gaming machine 2 and a wireless game player 925. Components that appear in FIGS. 9 and 10 are identified by common reference numerals. A master gaming controller 824 controls the operation of the various gaming devices and the game presentation on the gaming machine 2. In the present invention, the wireless game player 925 is one of the gaming devices the master gaming controller 824 controls. The master gaming controller 824 may communicate with the wireless game player 925 via a wireless communication link 852. The wireless communication link may use a wireless communication standard such as but not limited to IEEE 802.11a, IEEE 802.11b, IEEE 802.11x (e.g. another IEEE 802.11 standard such as 802.11c or 802.11e), hyperlan/2, Bluetooth, and HomeRF.

As described above, in the present invention, the gaming machine may operate in a local operational mode where a game is presented on a local display screen, such as 34 or 42, a remote operational mode where a game is presented on the wireless game player 925 or combinations thereof. When the gaming machine 2 is in a local operational mode, using a game code and graphic libraries stored on the gaming machine 2, the master gaming controller 824 generates a game presentation which is presented on the displays 34 and 42. The game presentation is typically a sequence of frames updated at a rate of 60 Hz (60 frames/sec). For instance, for a video slot game, the game presentation may include a sequence of frames of slot reels with a number of symbols in different positions. When the sequence of frames is presented, the slot reels appear to be spinning to a player playing a game on the gaming machine. The final game presentation frames in the sequence of the game presentation frames are the final position of the reels. Based upon the final position of the reels on the video display 34, a player is able to visually determine the outcome of the game.

Each frame in sequence of frames in a game presentation is temporarily stored in a video memory 836 located on the master gaming controller 824 or alternatively on the video controller 837. The gaming machine 2 may also include a video card (not shown) with a separate memory and processor for performing graphic functions on the gaming machine. Typically, the video memory 836 includes 1 or more frame buffers that store frame data that is sent by the video controller 837 to the display 34 or the display 42. The frame buffer is in video memory directly addressable by the video controller. The video memory and video controller may be incorporated into a video card which is connected to the processor board containing the master gaming controller 824. The frame buffer may consist of RAM, VRAM, SRAM, SDRAM, etc.

The frame data stored in the frame buffer provides pixel data (image data) specifying the pixels displayed on the display screen. In one embodiment, the video memory includes 3 frame buffers. The master gaming controller 824, according to the game code, may generate each frame in one of the frame buffers by updating the graphical components of the previous frame stored in the buffer. Thus, when only a minor change is made to the frame compared to a previous frame, only the portion of the frame that has changed from the previous frame stored in the frame buffer is updated. For example, in one position of the screen, a 2 of hearts may be substituted for a king of spades. This minimizes the amount of data that must be transferred for any given frame. The graphical component updates to one frame in the sequence of frames (e.g. a fresh card drawn in a video poker game) in the game presentation may be performed using various graphic libraries stored on the gaming machine. This approach is typically employed for the rendering of 2-D graphics. For 3-D graphics, the entire screen is typically regenerated for each frame.

Pre-recorded frames stored on the gaming machine may be displayed using video "streaming". In video streaming, a sequence of pre-recorded frames stored on the gaming machine is streamed through frame buffer on the video controller 837 to one or more of the displays. For instance, a frame corresponding to a movie stored on the game partition 828 of the hard drive 822, on a CD-ROM or some other storage device may streamed to the displays 34 and 42 as part of game presentation. Thus, the game presentation may include frames graphically rendered in real-time using the graphics libraries stored on the gaming machine as well as pre-rendered frames stored on the gaming machine 2.

When the gaming machine is in a remote operational mode and a game is presented on a display 926 of the mobile wireless game player 925, video frame data may be directly streamed from gaming machine 2 via the wireless interface 848 and wireless access point 850 to the wireless game player 925 via wireless interface 860. The video frame data may be stored in a memory 858 on the wireless game player 958 and then displayed on the display 925. The video frames sent to the wireless game player may be reduced in resolution and compressed to reduce the communication band-with necessary to transmit the video frames to the wireless game player 925.

In another embodiment, the video frames to present a game of chance may be rendered locally on the wireless game player 925. Graphical programs that allow a game to be rendered on the wireless game player may be stored in memory 858. For instance, the memory 858 may store a graphical program to render a slot game or a graphical program to render a card game. The memory 858 may store graphical programs for one or more games. For instance, the memory 858 may store graphical routines for a plurality of games supported by gaming machine 2. In one embodiment, the wireless game player 925 may be configured to allow different graphical programs for presenting different games to be downloaded into memory 858.

In other embodiments, the wireless gaming device may include a detachable memory and interface for the detachable memory. The detachable memory may store graphical applications for one or more games. Thus, to enable a particular game, a detachable memory storing graphical applications for the particular game may be inserted in the detachable memory interface on the wireless game player 925. The detachable memory may be in the form of read-only cartridges and may include a locking mechanism that prevents removal of the cartridge by the player. Thus, only authorized gaming personnel may be able to change a cartridge in the wireless game player.

The wireless game player may include a video card (not shown) to aid in the rendering process. The video card may include one or more graphical processing units that are used to render images to the display 926. The video card may be used to render 2-D graphics and 3-D graphics on the wireless game player 925. Graphical processing may also be performed by microprocessor 854 including 2-D and 3-D graphical rendering. Some images may be pre-rendered and stored on the wireless game player 925 and activated by a small string of commands from the gaming machine 2. Animations, such as reel rotation for a slot game, may be performed by routines on the wireless game player 925.

When the game graphics are rendered locally on the wireless game player 925, all of the game logic necessary to present the game of chance still resides on the gaming machine 2. Any switch or touch input necessary for game play on the wireless game player 925 (e.g., making a wager, initiating a game, holding cards, drawing cards, etc.) is transmitted 2 from the wireless game player 925 to the gaming machine 2. The gaming machine 2 executes gaming logic associated with the switch or touch inputs and sends the result back to the wireless game player 925. The wireless game player 925 verifies information sent from the gaming machine. In general, communication between the gaming machine 2 and the wireless game player 925 is encrypted. For any screen image or input involving the outcome of the game or betting, an additional level of transmit and receive data verification may be used by the wireless game player 925 and the gaming machine 2 to ensure the correct information is displayed on the wireless game player 925.

For illustrative purposes only, a series of commands between the gaming machine 2 and the wireless game player is described. The present invention is not limited to the commands described in this example. In response to input from player inputs 856 located on the wireless game player 925, the master gaming controller 824 may send a series of instructions to the wireless game player 925 that allow the game of chance to be rendered on display 926 of the wireless game player 925. The master gaming controller may also send instructions controlling audio output and other gaming devices on the wireless game player 925. For instance, for a slot game, the master gaming controller 824 may calculate symbol position, reel position, start and stop rotation for a number of reels. Then, the master gaming controller 825 may send one or more messages via the wireless communication link 852 to the wireless game player 925 with instructions such as 1) "render reels spinning", 2) "render reel 1 at position A", 3) "render reel 2 at position B", 4) "render reel 3 at position C", 5) "output audio B", 6) "display light pattern A," etc. The instructions may be processed and implemented by the microprocessor 854 using graphical software stored on the wireless game player 925.

In one embodiment, the wireless game player may be connected to a number of peripheral devices such as a printer 870 or a card reader 872. The printer 870 and the card reader 872 may communication with the wireless game player via a wire communication protocol such as serial, parallel, USB, Firewire or IEEE 1394. The peripheral devices, such as 870 and 872, may be controlled by the microprocessor 854 according to inputs received by the wireless game player and may also be controlled by the master gaming controller 824 on the gaming machine 2.

For gaming machines, an important function is the ability to store and re-display historical game play information. The game history provided by the game history information assists in settling disputes concerning the results of game play. A dispute may occur, for instance, when a player believes an award for a game outcome was not properly credited to him by the gaming machine. The dispute may arise for a number of reasons including a malfunction of the gaming machine, a power outage causing the gaming machine to reinitialize itself and a misinterpretation of the game outcome by the player. In the case of a dispute, an attendant typically arrives at the gaming machine and places the gaming machine in a game history mode. In the game history mode, important game history information about the game in dispute can be retrieved from a non-volatile storage on the gaming machine and displayed in some manner to a display on the gaming machine. The game history information is used to reconcile the dispute.

During the game presentation, the master gaming controller 824 may select and capture certain frames to provide a game history. These decisions are made in accordance with particular game code executed by controller 824. The captured frames may be incorporated into game history frames. Typically, one or more frames critical to the game presentation are captured. For instance, in a video slot game presentation, a game presentation frame displaying the final position of the reels is captured. In a video blackjack game, a frame corresponding to the initial cards of the player and dealer, frames corresponding to intermediate hands of the player and dealer and a frame corresponding to the final hands of the player and the dealer may be selected and captured as specified by the master gaming controller. Details of frame capture for game history applications are provided in U.S. Pat. No. 6,863,608, which is incorporated herein in its entirety and for all purposes.

In general, the gaming machine 2 maintains transaction logs of all events and game play. In some embodiments, as described above, the gaming machine may generate and store video frames as a game history record. The video frames may correspond to gaming information displayed on the wireless game player 925. During a wireless game play session, when the wireless game player 925 stops responding to the gaming machine 2, the game presented on the wireless game player 925 stops. The wireless game player 925 may stop responding to the gaming machine 2 because the wireless game player 925 is out-of-area reception, a battery level is low on the wireless game player, a power failure on the gaming machine 2 and other factors. To continue an interrupted game, the wireless game player 925 may ping the gaming machine 2 to reestablish communications and start the verification and authentication cycle as previously described. In the case of a dispute, the player may have to return to the gaming machine 2 so that game history records on the gaming machine can be accessed.

Figure 12:
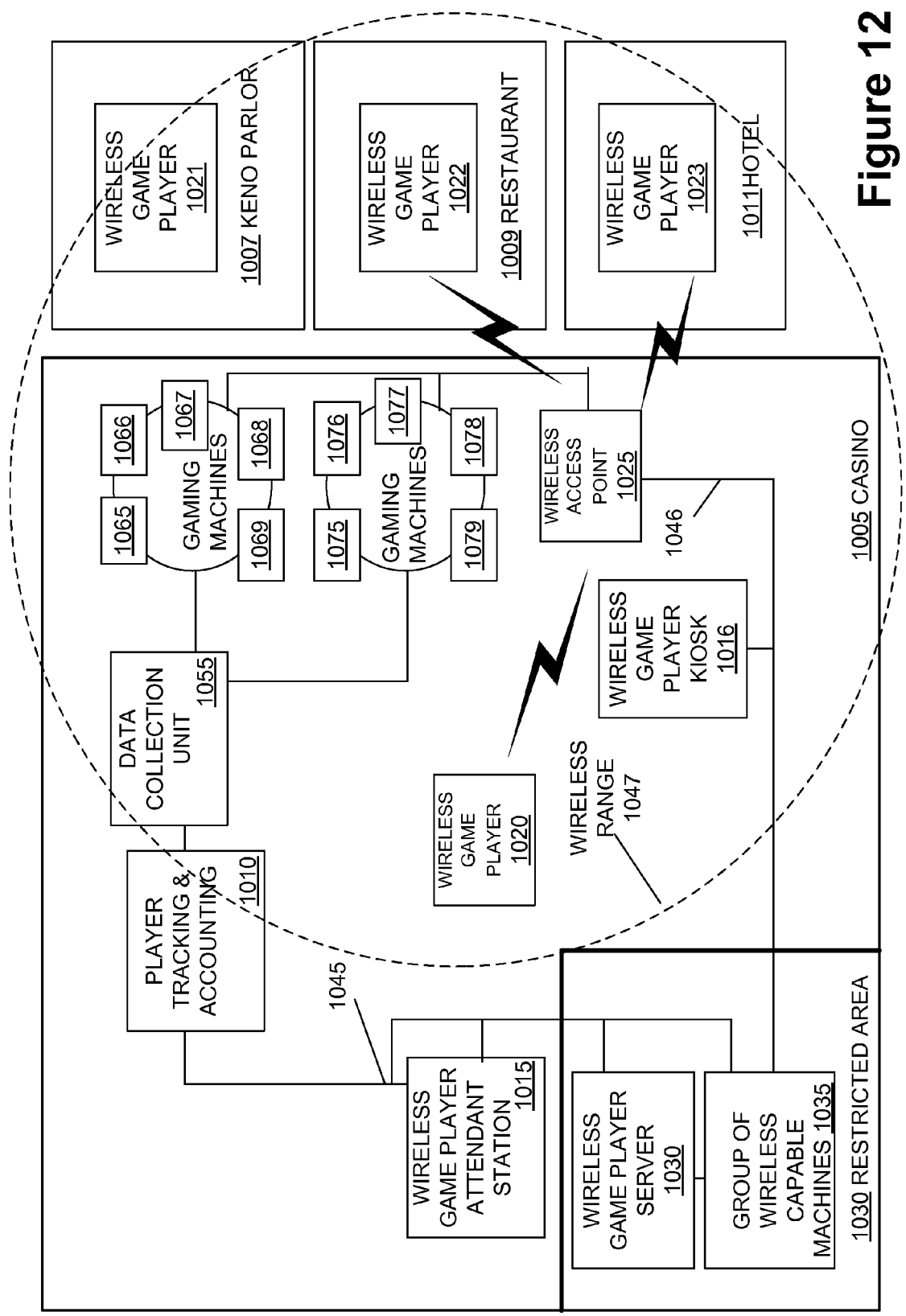
FIG. 12 is a block diagram of a network of gaming machines and wireless game players.

FIG. 12 is a block diagram of a network of gaming machines and wireless game players. Gaming machines 1065, 1066, 1067, 1068, 1069, 1075, 1076, 1077, 1078 and 1079, located in a floor area of casino 1005, support wireless game play and are connected to a wireless access point 1025. The gaming machines 1065, 1066, 1067, 1068, 1069, 1075, 1076, 1077, 1078 and 1079 are also connected to a player tracking system 1010 via a data collection unit 1055. Thus, game play on a wireless game player, such as 1020, in communication with one of the gaming machines on the casino floor may generate player tracking points. Further, a player using a game player, such as 1020, may be able to utilize services traditionally offered through player tracking devices on gaming machines such as a drink request. To provide the player tracking services, a player tracking service interface may be displayed on the touch screen of the wireless game player. Details of player tracking services and other gaming services that may be provided through a wireless game player of the present invention are described in U.S. Application No. 6,908,387, which is incorporated herein in its entirety and for all purposes.

The gaming machines located on the casino floor may also be connected to other remote servers such as but not limited to cashless system servers, progressive game servers, bonus game servers, prize servers, Internet, an entertainment content server, a concierge service server and a money transfer server and the like. Game services offered by the remote servers connected to the gaming machines may also be offered on wireless game players such as 1020. For instance, a game player may participate in a progressive game using the wireless game player 1020. In another example, a game player may be able to perform a cashless transaction enabled by a cashless system, such as the EZPAY™ cashless system (IGT, Reno Nev.), using a wireless game player.

In one embodiment, the gaming machines 1065, 1066, 1067, 1068, 1069, 1075, 1076, 1077, 1078 and 1079 connected to the access point 1025 are each provided with a wireless game player, such as 1020, 1021, 1022 and 1023. The gaming machines use a common wireless access point 1025. In this case, the access point device is also a multi-port switch. So, each machine has an Ethernet connection to the access point 1025.

In another embodiment of the present invention, an antenna may be built into a candle located on top of a gaming machine or some other location in the gaming machine. The antenna may be used as a wireless access point for wireless game play on one or more gaming machines. As an example, an antenna may be installed in the candle of gaming machine 1067 to be used as a wireless access point for wireless game play on gaming machines 1065, 1066, 1067, 1068 and 1069. A single gaming machine with an antenna may be used as part of a larger network of gaming devices providing wireless game play or may be used independently of a larger network. The antenna can, for example, be provided in accordance with the techniques described in the U.S. Pat. No. 5,605,506, entitled "CANDLE ANTENNA."

To obtain a wireless game player on one of the gaming machines on the casino floor, a player may request a wireless game player via a service call on the gaming machine such as through the player tracking system. The request may go to a remote location, such as a terminal at a wireless game player attendant station 1015 and an attendant may then bring a wireless game player to the gaming machine where the request for wireless game play has been made. The request may be routed to the attendant station 1015 via the wireless game player server 1030. When a wireless game player server 1030 is not used, the request may be sent directly to the attendant station 1015. As another example, when a request for wireless game play is made, a light on the gaming machine such as the candle on top of the gaming machine may be activated. In this case, a passing attendant may bring the game player a wireless game player. In yet another embodiment, a player may make a request for a wireless game player on a terminal at a wireless game player kiosk 1016.

Prior to enabling the network connection for the wireless game play, a person or a system program may determine the customer is eligible to use the wireless game player and verify their eligibility. For instance, most gaming jurisdictions include age eligibility rules which must be obeyed. As another example, eligibility to use a wireless game player may be based upon a player's value to a casino such as a status in a player tracking club. When authentication is required, the information is loaded from the system (could be a smart-card reader on the gaming machine) or a message appears on the gaming machine instructing the customer to provide information. For example, the gaming machines could have a fingerprint sensor located on the front panel or another biometric device. When required, the gaming machine could instruct the customer that it needs a fingerprint image or other biometric information before the customer may use the wireless game player. Information obtained through biometric sensors located on the gaming machine may be compared with information contained in a customer's biometric file. In some embodiments, the biometric information file may be downloaded to the gaming machine from a remote server and the biometric comparison may be performed on the gaming machine, the gaming machine may send biometric information to a remote server where the biometric comparison is performed, or combinations thereof.

In some instances, gaming machines supporting wireless game players may be located in a high-roller area (e.g., very valued customers) and the machines may have a specially designed stand where the wireless game players are stored. The wireless game players may be enabled by an attendant or may automatically be enabled when the casino customer inserts their player-tracking card into the gaming machine (special customer). As with the gaming machines located on the casino floor, the player-tracking system or some other remote gaming device may download the customer's biometric file to the gaming machine or the gaming machines could have a fingerprint sensor located on the front panel. When required, the gaming machine may instruct the customer that it needs a fingerprint image before the customer use the wireless game player.

To establish remote operations on the wireless game player, the gaming machine may ping the wireless game player with a series of communications. In one embodiment, once this operation is completed, the game play is transferred to the wireless game player. The screen of the gaming machines may go black (perhaps with an out-of-service message) and all customer cash and switch controls are locked out (nobody can use them). The master gaming controller on the gaming machine will continue to play the games, perform all the outcome determination and cash transaction (bets & credits), and maintains all the meter information. However, all the front panel and display data is channeled to the wireless game player. In one embodiment, when the gaming machines credit balance reaches zero, the customer is required to return to the gaming machine and insert more money. To enter more money, first, the local gaming machine controls are activated by the player or an attendant. In jurisdictions where the customer can use a debit or smart card to add money to a gaming machine, a card reader (smart card) connected to the wireless game player may be used to perform this function. In general, during a wireless game play session, the gaming machine communicates continuously with the wireless game player. In one embodiment, a web browser is used to display input switch commands. The displayed information on the wireless game player may come over from the gaming machine as HTML page information. Therefore, the wireless game player may use web-based transactions.

Additional details of a wireless game play network are described in the following paragraphs. The wireless game play network is shown in FIG. 12 is only one example of many possible embodiments of the present invention. The gaming machines and other gaming devices supporting wireless game play on wireless game players comprise a wireless game play network. The wireless game play network may be a part of a larger system network. The larger system network may provide the capability for a large number of gaming machines throughout a casino to be on the same wireless game play network. High-gain antennas and repeaters may be used to expand the range of the wireless game players allowing them to work in all areas of a casino/hotel complex, including hotels rooms and pool area. Racetracks, large bingo parlors and special outdoor events may also be covered within the wireless game play network allowing wireless game play in these areas.

The wireless game play network may also include wired access points that allow a wireless game player to be plugged directly into the network. For example, a wireless game player may include an Ethernet connector that may be directly plugged into the network segment 1046. The direct network connectors may be provided with cradles used to charge the wireless game player. The charging cradles may be located at many locations within the wireless game play network.

In FIG. 12, the range of the wireless access point 1025 is denoted by a circle 1047 used in the wireless game play network. Many such access points may be used in a wireless game play network depending upon the network topography. For instance, due the size of a particular casino and the area covered by a single access point, there could be other access points used as repeaters located throughout the casino and hotel. In addition, the wireless access point could also be connected to an existing network. After receiving an active wireless game player, a player may use the wireless game player in the areas of casino 1005 within the circle 1047. Further, the player may use the wireless game player, if approved by a local gaming jurisdiction, in the areas of a keno parlor 1007, a restaurant 1009, and a hotel 1011, which are within the circle 1047. While using the wireless game player, a player may wander to different locations within circle 1047 such as from the casino 1005 to the restaurant 1009.

In general, wireless game play in the wireless game play network is enabled by gaming devices executing licensed and regulated gaming software. However, the gaming devices supporting wireless game play are not limited gaming machines, such as 1065, 1066, 1067, 1068, 1069, 1075, 1076, 1077, 1078 and 1079 located on a casino floor. Special wireless-only gaming machines 1035 mounted in racks or containers connected to a wireless gaming network may be used to support wireless game play using wireless game players. The wireless-only gaming machines 1035 may not offer local game play. For instance, the wireless-only gaming machines 1035 may not include display screens. However, the wireless-only gaming machines are still regulated and licensed in a manner similar to traditional gaming machines. As another example, a wireless game player server 1030 with multiple processors may be used to support simultaneous game play on a plurality of wireless game players. The wireless-only gaming machines 1035 and the wireless game play server 1030 may be located in a restricted area 1030 of the casino 1005 and may not be generally accessible to game players.

The wireless-only gaming machines 1035 and wireless game play server 1030 are connected the wireless access point 1025 via a connection 1046. The wireless-only gaming machines 1035 and wireless game play server are also in communication with a wireless game player attendant station 1015 and the player tracking and accounting server 1010 via network connection 1045. The wireless-only gaming machine and wireless game player server 1030 may also be connected to other remote gaming devices such as progressive servers, cashless system servers, bonus servers, prize servers and the like.

When using a wireless-only gaming machine, the customer may use a kiosk, such as 1016 or a cashier to enter cash and provide authentication information for a wireless game play session using a wireless game player. Then, the customer may be assigned a wireless game player, such as 1020, 1021, 1022 and 1023, in communication with one of the wireless-only gaming machines 1035 or the wireless game play server 1030. Once authenticated and verified, the customer may select a game and begin playing the wireless game player. There may be wireless game play cradles in the keno parlor 1022, restaurant 1009 or Sports Book areas, allowing the customer to play their favorite casino machine game and at the same time make keno or Sports Book bets or eat. In addition, the wireless game play cradles may be used to charge batteries on the wireless game player and may also be used to provide an additional network access point such as through a wire connection provided on the cradle. The wireless game player may also be used for Sports Book and Keno betting. Thus, a player may watch a horserace or see the results of a certain event on the display of the wireless game player.

Finally, the wireless game player may also be used for other activities besides gaming. For example, because of the authentication and verification (security) features, the wireless game player could be safe way to conduct monetary transactions such as electronic funds transfers. As another example, the wireless game player may be used for video teleconferencing to visually connect to a casino host or to provide instant messaging services. In addition, when the wireless game player supports web-based browsers and the wireless game play network includes Internet access, the wireless game player may be used to obtain any web-based services available over the Internet.

Figure 13:
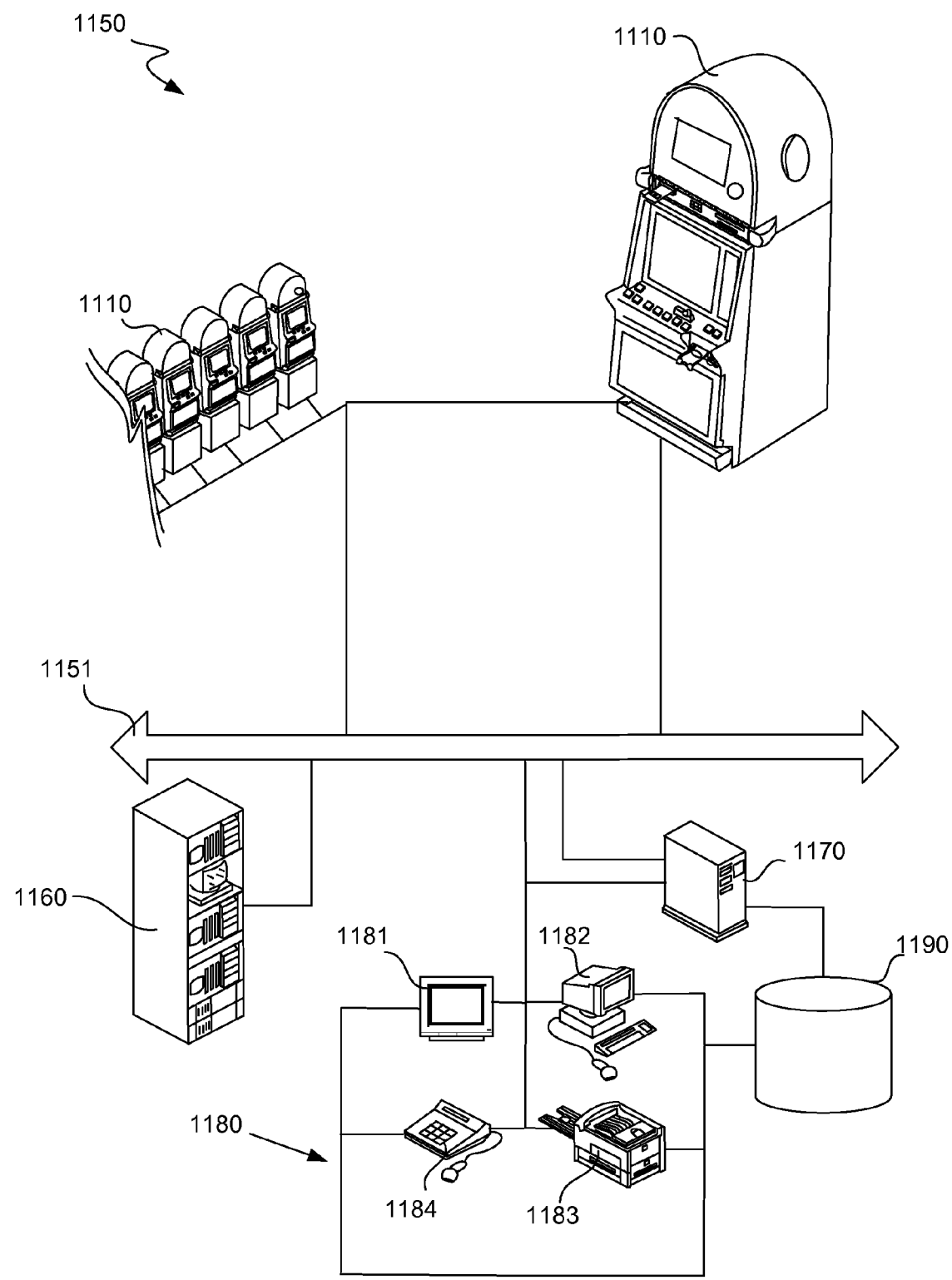
FIG. 13, an exemplary network infrastructure for providing a gaming system having one or more gaming machines is illustrated in block diagram format.

Referring now to FIG. 13, an exemplary network infrastructure for providing a gaming system having one or more gaming machines is illustrated in block diagram format. Exemplary gaming system 1150 has one or more gaming machines, various communication items, and a number of host-side components and devices adapted for use within a gaming environment. As shown, one or more gaming machines 1110 adapted for use in gaming system 1150 can be in a plurality of locations, such as in banks on a casino floor or standing alone at a smaller non-gaming establishment, as desired. Common bus 1151 can connect one or more gaming machines or devices to a number of networked devices on the gaming system 1150, such as, for example, a general-purpose server 1160, one or more special-purpose servers 1170, a sub-network of peripheral devices 1180, and/or a database 1190.

A general-purpose server 1160 may be one that is already present within a casino or other establishment for one or more other purposes beyond any monitoring or administering involving gaming machines. Functions for such a general-purpose server can include other general and game specific accounting functions, payroll functions, general Internet and e-mail capabilities, switchboard communications, and reservations and other hotel and restaurant operations, as well as other assorted general establishment record keeping and operations. In some cases, specific gaming related functions such as cashless gaming, downloadable gaming, player tracking, remote game administration, video or other data transmission, or other types of functions may also be associated with or performed by such a general-purpose server. For example, such a server may contain various programs related to cashless gaming administration, player tracking operations, specific player account administration, remote game play administration, remote game player verification, remote gaming administration, downloadable gaming administration, and/or visual image or video data storage, transfer and distribution, and may also be linked to one or more gaming machines, in some cases forming a network that includes all or many of the gaming devices and/or machines within the establishment. Communications can then be exchanged from each adapted gaming machine to one or more related programs or modules on the general-purpose server.

In one embodiment, gaming system 1150 contains one or more special-purpose servers that can be used for various functions relating to the provision of cashless gaming and gaming machine administration and operation under the present methods and systems. Such a special-purpose server or servers could include, for example, a cashless gaming server, a player verification server, a general game server, a downloadable games server, a specialized accounting server, and/or a visual image or video distribution server, among others. Of course, these functions may all be combined onto a single specialized server. Such additional special-purpose servers are desirable for a variety of reasons, such as, for example, to lessen the burden on an existing general-purpose server or to isolate or wall off some or all gaming machine administration and operations data and functions from the general-purpose server and thereby increase security and limit the possible modes of access to such operations and information.

Alternatively, exemplary gaming system 1150 can be isolated from any other network at the establishment, such that a general-purpose server 1160 is essentially impractical and unnecessary. Under either embodiment of an isolated or shared network, one or more of the special-purpose servers are preferably connected to sub-network 1180, which might be, for example, a cashier station or terminal. Peripheral devices in this sub-network may include, for example, one or more video displays 1181, one or more user terminals 1182, one or more printers 1183, and one or more other input devices 1184, such as a ticket validator or other security identifier, among others. Similarly, under either embodiment of an isolated or shared network, at least the specialized server 1170 or another similar component within a general-purpose server 1160 also preferably includes a connection to a database or other suitable storage medium 1190. Database 1190 is preferably adapted to store many or all files containing pertinent data or information regarding cashless instruments such as tickets, among other potential items. Files, data and other information on database 1190 can be stored for backup purposes, and are preferably accessible at one or more system locations, such as at a general-purpose server 1160, a special purpose server 1170 and/or a cashier station or other sub-network location 1180, as desired.

While gaming system 1150 can be a system that is specially designed and created new for use in a casino or gaming establishment, it is also possible that many items in this system can be taken or adopted from an existing gaming system. For example, gaming system 1150 could represent an existing cashless gaming system to which one or more of the inventive components or program modules are added. In addition to new hardware, new functionality via new software, modules, updates or otherwise can be provided to an existing database 1190, specialized server 1170 and/or general-purpose server 1160, as desired. In this manner, the methods and systems of the present invention may be practiced at reduced costs by gaming operators that already have existing gaming systems, such as an existing EZ Pay® or other cashless gaming system, by simply modifying the existing system. Other modifications to an existing system may also be necessary, as might be readily appreciated.

The various aspects, features, embodiments or implementations of the invention described above can be used alone or in various combinations.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A gaming system comprising:
    a gaming machine;
    a storage device;
    a gaming server comprising a memory and one or more processors, wherein the gaming server is in communication with the gaming machine, and the storage device;
    wherein the one or more processors are configured to:
        execute a first modular computer program code for a game of chance to provide said game of chance for playing on the gaming machine, wherein said first modular computer program code is stored in the memory, wherein said first modular computer program code for said game of chance includes a plurality of gaming modules;
        receive, from the storage device, at least one pluggable modular gaming modifier that can be integrated with and replace one or more of said plurality of gaming modules of said first modular computer program code located in the memory, wherein said at least one pluggable modular gaming modifiers can effectively modify and enhance one or more properties and behavior of said first modular computer program code alone or in combination with other pluggable modular gaming modifiers in different combinations to yield a modified modular computer program code for said game of chance;
        determine that said at least one pluggable modular gaming modifier is compatible with said first modular computer program code based on security information and compatibility properties of said at least one pluggable modular gaming modifier;
        modify said first modular computer program code to yield said modified modular computer program code for said game of chance by (i) replacing one of said plurality of gaming modules with said at least one pluggable modular gaming modifier to incorporate properties and behavior of said at least one pluggable modular gaming modifier into said game of chance and (ii) determining whether one or more of said plurality of gaming modules are to be removed from the first module computer program based on compatibility properties of said at least one pluggable modular gaming modifier; and
        execute said modified modular computer program code for said game of chance to provide a modified and enhanced version of said game of chance for playing on the gaming machine.

2. The gaming system of claim 1, where said least one pluggable modular gaming modifier can be added to said at least one gaming module.

3. The gaming system of claim 1, wherein at least one of said plurality of gaming modules serves as a base gaming module and said least one pluggable modular gaming modifier modifies and enhances one or more properties and behavior of said base gaming module.

4. The gaming system of claim 3,
    wherein said base gaming module is implemented as a parent, and wherein as a child of said parent said at least one pluggable modular gaming modifier can inherit one or more properties or behavior of said base gaming module.

5. The gaming system of claim 3, wherein said at least one pluggable modular gaming modifier is stored in a designated memory location of the storage device in a manner that indicates that said at least one pluggable modular gaming modifier is to replace and enhance said base gaming module.

6. The gaming system of claim 1, wherein said at least one pluggable modular gaming modifier can modify and enhance one or more of the following for the game of chance and information presented in association and connection with said game of chance:
    theme, background, advertising information, marketing information, colors, sounds, logos, look and feel, gaming preferences, player preferences, music, promotions, and bonus games.

7. The gaming system of claim 1, wherein at least two of said plurality of gaming modules communicate via one or more application program interfaces.

8. The gaming system of claim 1, wherein said plurality of gaming modules include a gaming operating system module, a game flow software module, and a game presentation software module.

9. The gaming system of claim 1, wherein said one or more processors are further configured to:
    receive said at least one pluggable modular gaming modifier from an entity;
    determine the authenticity of said entity.

10. The gaming system of claim 1, wherein said one or more processors are further configured to:
    determine the authenticity of said at least one pluggable modular gaming modifier.

11. The gaming system of claim 1, wherein said at least one pluggable modular gaming modifier and at least one of said plurality of gaming modules are configured to mutually authenticate each other.

12. The gaming system of claim 1, wherein said one or more processors arc further configured to:
    track the number of times said pluggable modular gaming modifier and gaming modules are loaded and executed by said gaming system.

13. The gaming system of claim 1,
    wherein at least one of said plurality of gaming modules includes a plurality of gaming sub-modules, and
    wherein said at least one pluggable modular gaming modifier can replace one or more of said plurality of gaming sub-modules.

14. The gaming system of claim 1,
    wherein at least one of said plurality of gaming modules includes a plurality of gaming sub-modules, and
    wherein said at least one pluggable modular gaming modifier includes a pluggable sub-modular modifier that can be added to said plurality of gaming sub-modules or replace at least one of said plurality of gaming sub-modules.

15. The gaming system of claim 1, wherein said gaming system includes a gaming machine configured and operable to execute said first modular computer program code for said game of chance and said modified modular computer program code.

16. The gaming system of claim 15, wherein said at least one pluggable modular gaming modifier is downloaded by a gaming server to said gaming machine.

17. The gaming system of claim 1, wherein said gaming server that effectively serves the gaming machine.

18. The gaming system of claim 16, wherein said gaming server is configured and operable to execute said first modular computer program code for said game of chance on behalf of said gaming machine.

19. The gaming system of claim 17, wherein gaming machine is configured and operable to execute said computer program code for said game of chance independently or jointly with said gaming server.

20. The gaming system of claim 1, wherein said plurality of gaming modules is divided according to the jurisdiction where said game of chance is to be played.

21. The gaming system of claim 1,
wherein the security information includes a security level and identifies an authentication method to use to authenticate said at least one pluggable modular gaming modifier; and
wherein the compatibility properties identifies whether said at least one pluggable modular gaming modifier is compatible with one or more of said plurality of gaming modules.

22. A gaming server comprising:
a memory; and
one or more processors, wherein said one or more processors are configured to:
identify a first modular computer program code for a game of chance to provide said game of chance for playing on a gaming machine in communication with the gaming server, wherein said first modular computer program code is stored in the memory, wherein said first modular computer program code for said game of chance is includes a plurality of gaming modules;
identify at least one pluggable modular gaming modifier that can be integrated with and replace one or more of said plurality of gaming modules located in the memory, wherein the at least one pluggable modular gaming modifier is located on a storage device, wherein said at least one pluggable modular gaming modifier can modify and enhance one or more properties and behavior of said first modular computer program code alone or in combination with other pluggable modular gaming modifiers in different combinations to yield a modified modular computer program code for said game of chance;
determine that said at least one pluggable modular gaming modifier is compatible with said first modular computer program code based on security information and compatibility properties of said at least one pluggable modular gaming modifier;
modify said first modular computer program code to yield said modified modular computer program code for said game of chance by replacing one of said plurality of gaming modules with said at least one pluggable modular gaming modifier to incorporate properties and behavior of said at least one pluggable modular gaming modifier into said game of chance; and
provide said modified modular computer program for said game of chance to said gaming machine to provide a modified version of said game of chance for play on said gaming machine.

23. A gaming device comprising:
a memory;
a display; and
a master gaming controller;
wherein said master gaming controller is configured to:
obtain, from a gaming server, a first modular computer program code for a game of chance to provide said game of chance for playing on said gaming device, wherein said first modular computer program code for said game of chance includes a plurality of gaming modules;
store said first modular computer program code in the memory;
execute said first modular computer program code;
obtain, from a storage device, at least one pluggable modular gaming modifier that can be integrated with and replace one or more of said plurality of gaming modules, wherein said at least one pluggable modular gaming modifier can modify and enhance one or more properties and behavior of said first modular computer program code alone or in combination with other pluggable modular gaming modifiers in different combinations to yield a modified modular computer program code for said game of chance such that said modified modular computer program code incorporates the features of multiple pluggable gaming modifiers into said game of chance;
determine that said at least one pluggable modular gaming modifier is compatible with said first modular computer program code stored in the memory based on security information and compatibility properties of said at least one pluggable modular gaming modifier;
modify said first modular computer program code to yield said modified modular computer program code for said game of chance by replacing one of said plurality of gaming modules of said first modular computer program code with said at least one pluggable modular gaming modifier to incorporate properties and behavior of said at least one pluggable modular gaming modifier into said game of chance; and
execute said modified modular computer program code.

24. A computer-implemented method for generating configuration data for configuring one or more gaming machines to provide one or more games of chance for play in a gaming environment, said computer-implemented method comprising:
selecting, by one or more processors, one or more gaming modules from a set of gaming modules that collectively represent modular computer program code for a game of chance, wherein the modular computer program code is stored in a memory, wherein said modular computer program code is configured to receive at least one pluggable modular gaming modifier that can be integrated with and replace one or more of said gaming modules, wherein said at least one pluggable modular gaming modifier can modify and enhance one or more properties and behavior of said modular computer program code alone or in combination with other pluggable modular gaming modifiers in different combinations to provide a modified modular computer program code for said game of chance such that said modified modular computer program code incorporates the features of multiple pluggable gaming modifiers into said game of chance, wherein the at least one pluggable modular gaming modifier is stored in a storage device in communication with said one or more processors;

storing, by the one or more processors is the memory, a first gaming configuration template that includes and/or effectively identifies said one or more selected gaming modules, wherein said first gaming configuration template can be used to generate configuration data to configure said one or more gaming machines for execution of said one or more selected gaming modules;

selecting, by the one or more processors, one or more gaming machines in said gaming environment for configuration;

storing, by the one or more processors, a second gaming configuration template that identifies said one or more selected gaming machines to be configured; and combining, by the one or more processors, said first and second gaming configuration templates in order to generate a combined gaming configuration template that can be used to configure said one or more selected gaming machines to execute said one or more selected gaming modules.

25. A computer-implemented method as recited in claim 24, wherein said first gaming configuration template is a pluggable configuration template that can be combined with one or more other pluggable configuration templates in order to generate another gaming configuration template or further configuration data for configuring said one or more of gaming machines.

26. A computer-implemented method as recited in claim 24, further comprising:
selecting one or more conditions in said gaming environment for configuration; and
storing a third gaming configuration template that identifies said selected one or more conditions, wherein said third gaming configuration template can be used to configure said one or more gaming machines when said one or more conditions occur.

27. A computer-implemented method 26, wherein said one or more conditions include one or more of the following:
a gaming condition,
time,
presence of one or more gaming modules, and
identifying a player.

28. A computer-implemented method of modifying computer program code that can be executed on a gaming system to provide a game of chance, said computer-implemented method comprising:
receiving, by one or more processors, a plurality of gaming modules that collectively represent computer program code for a game of chance that can be executed by said gaming system, wherein said plurality of gaming modules are stored in a memory;
receiving, by said one or more processors from a storage device, at least one pluggable modular gaming modifier that can modify and replace and enhance the properties and behavior of at least one of said plurality gaming modules, said pluggable modular gaming modifier being capable of being combined with other pluggable modular gaming modifiers in different combinations to yield a modified modular computer program code for said game of chance such that said modified modular computer program code incorporates the features of multiple pluggable gaming modifiers into said game of chance;
determining, by said one or more processors, that said at least one pluggable modular gaming modifier is compatible with said computer program code based on security information and compatibility properties of said at least one pluggable modular gaming modifier;
modifying and enhancing, by said one or more processors, the properties and behavior of said at least one gaming module based on said at least one pluggable modular gaming modifier to modify said computer program code for said game of chance to yield modified computer program code for said game of chance, thereby allowing said modified game of chance to be executed by said gaming system.

29. A computer-implemented method as recited in claim 28, wherein said modifying and enhancing the properties and behavior of said at least one gaming module comprises one or more of the following:
adding said at least one pluggable modular gaming modifier to at least one gaming module;
adding said at least one pluggable modular gaming modifier to one or more sub-modules of at least one gaming module;
replacing said least one gaming module by at least one pluggable modular gaming modifier; and
replacing one or more sub-modules of at least one gaming module by said at least one pluggable modular gaming modifier.

30. A computer-implemented method as recited in claim 29, wherein said computer-implemented method further comprises:
executing said modified game of chance.

31. A computer-implemented method as recited in claim 29, wherein said computer-implemented further comprises:
determining whether to modify at least one gaming module; and
modifying said at least one gaming module when said determining determines to modify said at least one gaming module.

32. A computer-implemented method as recited in claim 31, wherein said determining comprises one or more of the following:
determining whether a gaming event has occurred;
determining whether an scheduled task has occurred;
determining whether a particular player has been identified;
determining whether one or more gaming modules are available; and
determining whether one or more gaming modules are loaded on one or more gaming machines.

33. A computer-implemented method as recited in claim 29, wherein said computer-implemented further comprises one or more of the following:
authenticating said at one pluggable modular gaming modifier;
authenticating said at one pluggable modular gaming modifier by said computing system;
authenticating said at one pluggable modular gaming modifier by an entity that effectively receives said pluggable modular gaming modifier;
authenticating an entity that effectively provides said at one pluggable modular gaming modifier for modification of said at least one gaming module;
authenticating said at one pluggable modular gaming modifier by at least one gaming module;
authenticating at least one gaming module;
authenticating at least one gaming module by said computing system; and authenticating at least one gaming module by an entity that effectively provides said pluggable modular gaming modifier.

34. A computer-implemented method as recited in claim 29, wherein said computer-implemented method further comprises:

determining whether said pluggable modular gaming modifier is compatible with at least one gaming module.

35. A non-transitory computer readable medium including computer program code for modifying and enhancing a game of chance that can be executed on a gaming system, the computer program code including instructions to:

receive a plurality of gaming modules that collectively represent computer program code for said game of chance that can be executed by said gaming system;

receive at least one pluggable modular gaming modifier that can modify and replace and enhance the properties and behavior of at least one of said plurality gaming modules capable of being combined with other pluggable modular gaming modifiers in different combinations to yield a modified modular computer program code for said game of chance such that said modified modular computer program code incorporates the features of multiple pluggable gaming modifiers into said game of chance;

determine that said at least one pluggable modular gaming modifier is compatible with said computer program code based on security information and compatibility properties of said at least one pluggable modular gaming modifier;

modify the computer program code to yield said modified computer program code for said game of chance by replacing one of the plurality of gaming modules with the at least one pluggable modular gaming modifier to incorporate properties and behavior of said at least one pluggable modular gaming modifier; and execute the modified computer program code to play said game of chance.

36. A non-transitory computer readable medium including computer program code for modifying and enhancing a game of chance that can be executed on a gaming system, the computer program code including instructions to:

receive a plurality of gaming modules that collectively represent computer program code for said game of chance that can be executed by said gaming system;

receive at least one pluggable modular gaming modifier that can effectively modify and replace and enhance the properties and behavior of at least one of said plurality gaming modules capable of being combined with other pluggable modular gaming modifiers in different combinations to yield a modified modular computer program code for said game of chance such that said modified modular computer program code incorporates the features of multiple pluggable gaming modifiers into said game of chance;

modify the computer program code to provide said modified computer program code for said game of chance by (i) replacing one of the plurality of gaming modules with the at least one pluggable modular gaming modifier to incorporate properties and behavior of the at least one pluggable modular gaming modifier into said game of chance and (ii) determining whether one or more of said plurality of gaming modules are to be removed from the computer program code based on compatibility properties of said at least one pluggable modular gaming modifier; and execute the modified computer program code to play said game of chance.

* * * * *